United States Patent
Korb et al.

(10) Patent No.: US 9,947,128 B2
(45) Date of Patent: Apr. 17, 2018

(54) METHODS FOR IMPROVING ACCURACY, ANALYZING CHANGE DETECTION, AND PERFORMING DATA COMPRESSION FOR MULTIPLE IMAGES

(71) Applicants: Andrew Robert Korb, Rockville, MD (US); Charles Laurence Korb, Potomac, MD (US)

(72) Inventors: Andrew Robert Korb, Rockville, MD (US); Charles Laurence Korb, Potomac, MD (US)

(*) Notice: Subject to any disclaimer, the term of this patent is extended or adjusted under 35 U.S.C. 154(b) by 144 days.

(21) Appl. No.: 14/764,250

(22) PCT Filed: Jan. 29, 2014

(86) PCT No.: PCT/US2014/013641
§ 371 (c)(1),
(2) Date: Jul. 29, 2015

(87) PCT Pub. No.: WO2014/171988
PCT Pub. Date: Oct. 23, 2014

(65) Prior Publication Data
US 2015/0371431 A1    Dec. 24, 2015

Related U.S. Application Data

(60) Provisional application No. 61/757,892, filed on Jan. 29, 2013.

(51) Int. Cl.
*G06K 9/00* (2006.01)
*G06T 15/20* (2011.01)
(Continued)

(52) U.S. Cl.
CPC .......... *G06T 15/20* (2013.01); *G06K 9/00476* (2013.01); *G06K 9/46* (2013.01);
(Continued)

(58) Field of Classification Search
CPC ........ G06K 9/00476; G06K 9/46; G06K 9/52; G06K 9/6215; G06K 9/6298; G06T 15/20;
(Continued)

(56) References Cited

U.S. PATENT DOCUMENTS 5,557,347 A    9/1996    Johnson
5,995,681 A    11/1999    Lee et al.
(Continued)

OTHER PUBLICATIONS

Extended European Search Report from European Patent Office (EPO) in European Patent Appl. No. 14785744.5, dated Jul. 27, 2016.
(Continued)

*Primary Examiner* — Nirav G Patel
(74) *Attorney, Agent, or Firm* — Greenblum & Bernstein, P.L.C.

(57) ABSTRACT

A multi-temporal, multi-angle, automated target exploitation method is provided for processing a large number of images. The system geo-rectifies the images to a three-dimensional surface topography, co-registers groups of the images with fractional pixel accuracy, automates change detection, evaluates the significance of change between the images, and massively compresses imagery sets based on the statistical significance of change. The method improves the resolution, accuracy, and quality of information extracted beyond the capabilities of any single image, and creates registered six-dimensional image datasets appropriate for mathematical treatment using standard multi-variable analysis techniques from vector calculus and linear algebra such as time-series analysis and eigenvector decomposition.

21 Claims, 16 Drawing Sheets

(51) Int. Cl.

| | | |
|---|---|---|
| *G06T 17/05* | (2011.01) | |
| *G06T 9/00* | (2006.01) | |
| *H04N 19/136* | (2014.01) | |
| *G06K 9/46* | (2006.01) | |
| *G06K 9/52* | (2006.01) | |
| *G06K 9/62* | (2006.01) | |
| *G06T 7/33* | (2017.01) | |
| *G06T 7/73* | (2017.01) | |

(52) U.S. Cl.
CPC ............ *G06K 9/52* (2013.01); *G06K 9/6215* (2013.01); *G06T 7/33* (2017.01); *G06T 7/73* (2017.01); *G06T 7/75* (2017.01); *G06T 9/00* (2013.01); *G06T 17/05* (2013.01); *H04N 19/136* (2014.11); *G06K 9/6298* (2013.01); *G06T 2207/10032* (2013.01); *G06T 2207/30181* (2013.01); *G06T 2207/30244* (2013.01); *G06T 2210/56* (2013.01)

(58) Field of Classification Search
CPC ........... G06T 17/05; G06T 2207/10032; G06T 2207/30181; G06T 2207/30244; G06T 2210/56; G06T 7/33; G06T 7/73; G06T 7/75; G06T 9/00; H04N 19/136
See application file for complete search history.

(56) References Cited

U.S. PATENT DOCUMENTS

| | | | |
|---|---|---|---|
| 6,018,349 A | 1/2000 | Szeliski et al. | |
| 6,819,318 B1 | 11/2004 | Geng | |
| 8,120,683 B1 | 2/2012 | Tumer et al. | |
| 8,238,903 B2 | 8/2012 | Korb et al. | |
| 8,360,367 B2 | 1/2013 | Korb et al. | |
| 8,480,036 B2 | 7/2013 | Korb et al. | |
| 9,132,925 B2 | 9/2015 | Korb et al. | |
| 2007/0008312 A1 | 1/2007 | Zhou et al. | |
| 2012/0013711 A1 | 1/2012 | Tamir et al. | |

OTHER PUBLICATIONS

C. Fraser et al., "Bias-compensated RPCs for Sensor Orientation of High-Resolution Satellite Imagery", Photogrammetric Engineering & Remote Sensing, Aug. 1, 2005 (Aug. 1, 2005), pp. 909-915, XP055284004, retrieved from the Internet, URL:http://info.asprs.org/publications/pers/2005journal/august/2005_aug_909-915.pdf [retrieved on Jun. 28, 2016].

Zhen Xiong et al., "Bundle Adjustment With Rational Polynomial Camera Models Based on Generic Method", IEEE Transactions on Geoscience and Remote Sensing, IEEE Service Center, Piscataway, NJ, US, vol. 49, No. 1, Jan. 1, 2011 (Jan. 1, 2011), pp. 190-202, XP011340483.

Jacek Grodecki et al., "Block Adjustment of High-Resolution Satellite Images Described by Rational Polynomials", Photogrammetric Engineering and Remote Sensing, vol. 69, No. 1, Jan. 1, 2003 (Jan. 1, 2003), pp. 59-68, XP055285075.

International Search Report (ISR) in International Pat. Appl. No. PCT/US2014/013641, completed Sep. 9, 2014, dated Oct. 10, 2014.

Written Opinion (WO) of the International Searching Authority in International Pat. Appl. No. PCT/US2014/013641, completed Sep. 9, 2014.

Image Formation on DSM projected at 30 degree elevation

FIG. 15

METHODS FOR IMPROVING ACCURACY, ANALYZING CHANGE DETECTION, AND PERFORMING DATA COMPRESSION FOR MULTIPLE IMAGES

CROSS-REFERENCE TO RELATED APPLICATIONS

The present application claims the benefit of U.S. Provisional Pat. Appl. No. 61/757,892, filed on Jan. 29, 2013, the disclosure of which, including the specification and figures, is incorporated herein by reference in its entirety.

The present application is related to the disclosures of: U.S. Provisional Pat. Appl. No. 61/153,934; U.S. patent application Ser. No. 12/708,482, now U.S. Pat. No. 8,238,903; U.S. patent application Ser. No. 13/544,141, now U.S. Pat. No. 8,480,036; and U.S. patent application Ser. No. 13/544,155, now U.S. Pat. No. 8,360,367. The disclosures of all of these documents, including the specifications and figures, are incorporated herein by reference in their entireties.

BACKGROUND

1. Field of the Disclosure

The present disclose generally relates to the field of orthorectification. More particularly, the present disclosure relates to various systems, methods, and media for performing sensor model refinement of satellite imagery, and for analyzing, evaluating, and compressing satellite imagery.

2. Background Information

Geometric accuracies for space-borne commercial imaging sensors have improved from 10 meters or more for a single stereo pair of images prior to 2008 to approximately 3.4 meters accuracy for GeoEye-1 images and 3.5 to 5 meters accuracy for Worldview-2 images. GeoEye-1, Worldview-2 Skybox-1, and soon Worldview-3 represent the current generation of United States commercial space imaging satellites.

The absolute geolocation, georeference accuracy of Geo-Eye-1 was measured, improved, and reported by GeoEye's Kohm and Mulawa in 2009, 2010, and 2011. The GeoEye-1 accuracies were validated by Fraser from the University of Melbourne in 2011. Mulawa showed that GeoEye-1 intra-image geometric accuracy, e.g., within an image, is +/−1 meter across the 15 kilometer swath. This accuracy was achieved through geometric calibration while on-orbit using repeated measurements at multiple sites in the United States and worldwide. The key finding was that for 64 or so images, the error of the means were ~1 meter in the vertical and horizontal.

Absolute geolocation can be obtained from a large number of images to better than 1 meter absolute, in x, y, and z directions, from the camera model Rational Polynomial Coefficients (RPCs) in the image data without Ground Control Points (GCPs), anywhere in the image. Fraser confirmed GeoEye-1 accuracy measurements, and found that absolute Geolocation error, at 95% probability (2-sigma) of 20 centimeters in x and y directions, and 50 centimeters in z direction is possible with some effort using bias corrected RPCs and a single GCP.

There are multiple other methods for achieving, and slightly exceeding, the accuracies described by Fraser, using error-weighted means, triangulation from distant GCPs, or the implementation of co-registration using bundle adjustment, with correlation and spatially-variable pointing adjustment, also called Field Angle Mapping (FAM).

Leprince et al. provided a technique, and software, for co-registering images to sub-pixel accuracy, and provide bundle adjustment to improve image co-registration and geolocation accuracy. The capability allows co-registration of images to better than 1/50 pixel accuracy, if images are taken from the same angle and if the surface geometry for the scenes are perfectly known.

Mitchell showed in 2009 that GeoEye-1 Satellite stereo-image pairs can be processed to extract Digital Surface Models (DSMs), "processing 50 cm GeoEye-1 stereo satellite photos to 1 m Digital Elevation Models (DSMs) with vertical accuracies of better than 50 cm RMSE, as determined by thousands of ground survey points on mapping projects in Eritrea and Mexico." Korb et al. demonstrated in 2012 that point clouds and DSMs could be extracted in urban areas at 0.8 meter resolution or better, and 0.1-0.2 meter precision from 16 GeoEye-1 images.

Super-resolution processing, a current topic in PhD dissertations in applied math departments, can improve resolution and signal-to-noise (SNR) by combining information from many lower-resolution images with rigorous geometric co-registration. Vandewalle, Su, and Boreman et al. describe that spatial resolution can be improved by three-fold or four-fold, an improvement of 1.58 to 2 National Image Interpretability Rating Scale (NIIRS), where the improved NIIRS=3.32*$\log_{10}$ (resolution improvement).

Boreman's PhD thesis and survey article, under Stevenson at Notre Dame, presented the state of the art of super-resolution processing using multiple images. A three-fold improvement in resolution is expected, but Su provides examples of four-fold improvement in resolution from a small group images.

Most imagery analysis systems work on single two-dimensional (2-D) images. As a result of error in known surface attitude, the difference between true orientation and horizontal, there are large uncertainties and errors in measured bidirectional reflectance distribution function (BRDF) reflectivity and emissivity, resulting from attitude-knowledge-error. Further, some remote sensing problems, such as characterizing material identification and temperature/emissivity, are fundamentally under-determined, e.g., have more unknowns than measurements, which require additional constraints or a priori knowledge, which reduces or limits accuracy obtained from a single image or measurement.

Most change detection algorithms work on 2-D imagery or datasets. As a result, change detection is limited by poor knowledge of surface orientations. The work of Mundy et al. is fundamentally based on use of three-dimensional (3-D) geometry, which can provide additional accuracy for both remote sensing and change detection. Mundy et al. use a Gaussian mixture model that fundamentally limits the accuracy of spectroradiometric exploitation, because the radiometry does not conform to either a Lambertian model or a BRDF-formulation reflectivity model as proposed by Hapke or others. In geometric change detection, the Mundy work is probabilistic, rather than deterministic as proposed herein. Mundy et al. use voxel and/or octree data models. Voxel and octree data models require more data storage space than 2-D images.

REFERENCES

The following references generally relate to improving geolocation accuracy using multiple images: (1) Deilami, K. and Hashim, M. "Very High Resolution Optical Satellites for DSM Generation: A Review," European Journal of Scientific Research, ISSN 1450-216X Vol. 4, No. 4, pp. 542-554

(2011). This paper contains reference information for the geolocation accuracy and precision of most if not all commercial imaging spacecraft, and provides references for geometric camera models; (2) Kohm, K. and Mulawa, D., "On-Orbit Geolocation Accuracy and Image Quality Performance of the GeoEye-1High Resolution Imaging Satellite," Joint Agency Commercial Imagery Evaluation (JACIE) Conference, Fairfax, Va. (2008); (3) Kohm, K., "On-Orbit Geolocation Accuracy and Image Quality Performance of the GeoEye-1 High Resolution Imaging Satellite", Kohm, Joint Agency Commercial Imagery Evaluation (JACIE) (2009); (4) Mulawa, D., "GeoEye-1 Geolocation Assessment and Reporting Update", Joint Agency Commercial Imagery Evaluation (JACIE) (2011); (5) Fraser, C. S. & Ravanbakhsh, M., "Georeferencing From Geoeye-1 Imagery: Early Indications of Metric Performance", University of Melbourne (2009); and (6) Aguilar, Manuel Á., et al, "Geometric Processing of GeoEye-1 Satellite Imagery for Coastal Mapping Applications," Proceedings of the IMProVe 2011, International Conference on Innovative Methods in Product Design, June 15th-17th, Venice, Italy (2011).

The following references generally relate to automatically extracting high resolution digital surface model data from multiple images: (1) Deilami, K. and Hashim, M. "Very High Resolution Optical Satellites for DSM Generation: A Review" European Journal of Scientific Research, ISSN 1450-216X Vol. 49, No. 4, pp. 542-554 (2011); (2) Mitchel G, "Photosat GeoEye-1 Stereo Satellite DSM Comparison to a Lidar DSM over the Garlock Fault in Southeast California" Photosat Corp. (2009); (3) Survey of DSM Extraction Technology ESRI 2011V2; and (4) E Leberl, A. Irschara, T. Pock, P. Meixner, M. Gruber, S. Scholz, and A. Wiechert, "Point Clouds: Lidar versus 3D Vision" PE&RS, (October 2010).

The following references generally relate to co-registering images to sub-pixel accuracy, and bundle adjustment to improve co-registration and geolocation accuracy: (1) Sébastien Leprince, Student Member, IEEE, Sylvain Barbot, Student Member, IEEE, François Ayoub, Jean-Philippe Avouac "Automatic and Precise Orthorectification, Coregistration, and Subpixel Correlation of Satellite Images, Application to Ground Deformation Measurements" IEEE Transactions on Geoscience and Remote Sensing, Vol. 45, No. 6 (June 2007); and (2) "Co-Registration of Optically Sensed Images and Correlation (COSI-Con): an Operational Methodology for Ground Deformation Measurements" CalTech_LEPieeetgrs (2007).

The following references generally relate to the effect, or error, due to image-to-image and band-to-band mis-registration: (1) J. Townsend, C. Justice, C. Gurney, and J. McManus, "The Impact of misregistration on change detection", IEEE Trans. Geosci. Remote Sens., Vol. 30, No. 5, pp. 1054-1060 (September 1992); and (2) X. Dai and S. Khorram, "Effects of image Misregistration on the accuracy of remotely sensed change detection IEEE Trans. Geosci. Remote Sens., Vol. 36, No. 5, pp. 1566-1577 (September 1998).

The following references generally relate to geometric change detection: (1) Pollard T. and Mundy J., "Change Detection in a 3-DWorld," IEEE (2007); (2) Crispell D., Mundy J., Taubin G "A Variable-Resolution Probabilistic Three-Dimensional Model for Change Detection," IEEE Transactions on Geoscience and Remote Sensing (2011); and (3) Pollard T, Eden I, Mundy J, Cooper D "A Volumetric Approach to Change Detection in Satellite Images" Photogrammetric Engineering & Remote Sensing, Vol. 76, No. 7, pp. 817-831 (July 2010).

The following references generally relate to super-resolution processing to improve resolution and signal-to-noise ratio from multiple images: (1) Super-Resolution from Image SequencesReview_Boreman_NotreDame98; (2) Borman, "Topics In Multiframe Superresolution Restoration" Ph.D. Notre Dame (2004); (3) Vandewalle, "Super-Resolution from Unregistered Aliased Images" Ph.D., Lusanne PolyTech (2006); and (4) Su "Introduction to Image Super-resolution" (2004).

SUMMARY OF THE DISCLOSURE

The present disclosure, through one or more of its various aspects, embodiments, and/or specific features or sub-components, provides, inter alia, various systems, methods, media, and programs for optimizing and improving image processing, image analysis, image evaluation, and image compression. The present disclosure co-registers images to a georeferenced scene topography, then combines the images to improve accuracy, resolution, and signal-to-noise ratio. The present disclosure rigorously compares the geometric and spectro-radiometric measurements between images at the pixel or sub-pixel level. Rigorous analysis of the differences between images, identifying each region with significant changes, and segmenting the changed regions enables data compression in the processing, transmission, and storage of images and enables extraction of scene information from the entire library of images of the scene.

The multi-image processing techniques of the present disclosure provide accurate information about the surface orientation for every facet within a scene, three-dimensional information about adjacent surfaces, and a priori estimates of background surface properties. These pieces of information have not been previously available and this new data will improve estimation of surface composition by reducing uncertainties in extracted target surface properties and eliminating false positive identifications. The present disclosure provides novel techniques for identifying surface materials from remote sensing measurements that are described to perform supervised and unsupervised classification using empirical measurements of the bi-directional scatter distribution function (BSDF) or BRDF functions, rather than empirical measurements using Lambertian reflectance assumptions.

The present disclosure further describes image and data compression techniques that can be applied to any data sets, independent of platform, reducing the image and data volume by a compression ratio that is variable and is controlled with a statistical criterion over a range from 1 to arbitrarily large values.

According to a non-limiting embodiment of the present disclosure, a system for analyzing and improving accuracies of two-dimensional images and for forming three-dimensional images from two-dimensional images is provided. The system includes a processor and a memory. The memory includes a plurality of two-dimensional images and instructions. The two-dimensional images each include a same target area and are acquired at same or different times and at different collection angles. The instructions are configured to be executed by the processor and cause the processor to execute operations. The operations include identifying or correlating a plurality of target features in the target area of each of the two-dimensional images, and determining, independently for each of the two-dimensional images and based on image pointing parameters, a three-dimensional geolocation position of each of the target features. The operations further include calculating a weighted average or a least squares fitting of the three-dimensional geolocation position of each of the target features using the two-dimensional images, and adjusting, variably across each of the two-dimensional images, the image pointing parameters by providing a least squares adjustment of the image pointing parameters to minimize a geolocation difference between the three-dimensional geolocation position of each of the target features in each of the two-dimensional images and the weighted average or the least squares fitting of the three-dimensional geolocation position of the target feature across the two-dimensional images. The operations further include projecting each of the two-dimensional images onto a georeferenced three-dimensional surface model of the target area based on results of the adjusting to form georeferenced three-dimensional images from the plurality of two-dimensional images.

According to one aspect of the present disclosure, the image pointing parameters of each of the two-dimensional images is adjusted independently over different sections of the target area.

According to another aspect of the present disclosure, the image pointing parameters are further configured to be adjusted, variably across each of the two-dimensional images, by providing a least squares adjustment of the image pointing parameters to minimize a geolocation difference between a three-dimensional geolocation position of one or more ground control points in each of the two-dimensional images and a known or externally-measured three-dimensional geolocation position for each of the ground control points.

According to yet another aspect of the present disclosure, the image pointing parameters are further configured to be adjusted, variably across each of the two-dimensional images, by extending predetermined ground control points which are not located in the target area into the target area, or by using ground control points which are not located in the target area for processing in the target area.

According to still another aspect of the present disclosure, the image pointing parameters are configured to be adjusted, variably across each of the two-dimensional images, by extending the predetermined ground control points into the target area and using triangulation methods, including triangulation with at least two rays in a series of triangles as one non-limiting example.

According to an additional aspect of the present disclosure, the image pointing parameters are configured to be adjusted, variably across each of the two-dimensional images, by collecting strips of imagery from the predetermined ground control points to the target area, depending on further segregating errors into bias errors and other errors, which can then be removed or reduced, by subtraction of the bias errors from one or more ground control points, in one non-limiting example of error reduction methods.

According to yet another aspect of the present disclosure, the image pointing parameters comprise polynomial coefficients which may be defined as rational polynomial coefficients of a rational polynomial coefficient model (RPC model), rigorous projection model parameters for a rigorous projection model (RPM), or replacement model parameters for a replacement sensor model (RSM), and other types of pointing models not limited by this incomplete list.

According to still another aspect of the present disclosure, the three-dimensional geolocation position of each of the target features in each of the two-dimensional images comprises three mutually orthogonal coordinates, which may be a latitude coordinate, a longitude coordinate, and a height coordinate. In this regard, in the calculating of the weighted average, a weight factor of each of the two-dimensional images contribution to each of the three mutually orthogonal coordinates, e.g., the latitude coordinate, the longitude coordinate, and the height coordinate, is the image error, in each coordinate, squared and divided by a sum of squared errors for all of the two-dimensional images, in each coordinate.

According to an additional aspect of the present disclosure, the operations further include identifying, during at least one of the determining and the adjusting, regions in any of the two-dimensional images in which a difference between the three-dimensional geolocation position of one of the target features and the weighted average satisfies a predetermined condition. The operations also include excluding, during at least one of the calculating and the projecting, the regions of any of the two-dimensional images in which the predetermined condition is satisfied from at least one of the weighted average and the georeferenced three-dimensional surface model to exclude an anomalous difference.

According to another aspect of the present disclosure, the operations further include receiving at least one additional two-dimensional image being of a lower geometric accuracy than the two-dimensional images, determining whether the surface topography of the georeferenced three-dimensional images has changed, assigning an error weighting of zero to the georeferenced three-dimensional images when the surface topography has not changed, and field angle mapping the second two-dimensional image onto the georeferenced three-dimensional surface model to georectify the second two-dimensional image to substantially same accuracy as the georeferenced three-dimensional surface model.

According to yet another aspect of the present disclosure, the operations include co-registering each of the georeferenced three-dimensional images formed from the two-dimensional images to the georeferenced digital surface model base layer, correlating the target features from each of the two-dimensional images, based on predetermined criteria, criteria calculated from images and image statistics, or a posteriori considerations, to provide a georeferenced image stack of the georeferenced three-dimensional images, co-registered in three-dimensions.

According to still another aspect of the present disclosure, the operations include: computing a change between essentially identical areas in each of the georeferenced three-dimensional images in the georeferenced image stack; measuring an uncertainty of the change between the identical areas of the georeferenced three-dimensional images in the georeference image stack in association with the change; parsing the identical areas of the georeferenced three-dimensional images for significant areas in which a ratio of the change to the uncertainty satisfies the predetermined criteria, the criteria calculated from the images and image statistics, or the a posteriori considerations; and processing, transmitting, and storing information on only the significant areas in which the ratio of the change to the uncertainty satisfies the predetermined criteria, the criteria calculated from the images and image statistics, or the a posteriori considerations.

According to an additional aspect of the present disclosure, the operations include: computing a change between areas of a current three-dimensional image and essentially identical areas of the georeferenced three-dimensional images in the georeferenced image stack; measuring an uncertainty of the change between the areas of the current three-dimensional image and the identical areas of the georeferenced three-dimensional images in the georeference image stack; and variably compressing data of the current three-dimensional image for each of the areas in accordance with a ratio of the change and the uncertainty for each of the areas.

According to another aspect of the present disclosure, the data of the current three-dimensional image for each of the areas is prioritized for variable compression in accordance with the ratio of the change to the uncertainty for each of the areas. In this regard, the data is variably compressed in accordance with a degree of compression needed by the system. Moreover, the variable compression is a dynamically-controlled system where a compression ratio is controlled to be greater than or equal to a ratio of a data rate from a sensor and data storage to an available communication rate, for each spacecraft communication channel to optimally process, communicate, and store information with a highest significance in a prioritized order, so that communication channels can downlink data directly from a satellite to Users in a field that is highly significant in prioritized order, some of the communication channels being limited in bandwidth and some being broadband channels.

According to an additional aspect of the present disclosure, the variable compression system is applied onboard a spacecraft, aircraft, ship, or other portable sensor system platform and provides variable and dynamic compression that reduces a downlink communication rate needed to communicate any particular level of information flow. The variable compression system enables sensor system designs to realize a throughput advantage, wherein the sensor detector plane is designed to incorporate larger numbers of detector arrays and elements designed to collect and measure photons collected by a telescope. This increases a sensor resolution, not limited by a low signal-to-noise ratio, increases the signal-to-noise ratio and an area collection rate, and reduces a cost per unit area collected by the sensor system by either a ratio of an increase in the number of detectors, a square-root of the ratio of the increase in the number of the detectors, or a value in between, representing two or three orders of magnitude improvement in the cost per unit area and an area collection rate capacity.

According to still another aspect of the present disclosure, the operations include: computing a change between areas of a current three-dimensional image and essentially identical areas of the georeferenced three-dimensional images in the georeferenced image stack; and variably compressing data of the current three-dimensional image for the areas in accordance with one of: a difference between the change of each of the areas and an average change of the areas; and a ratio of the change of each of the areas to a statistical or calculated measure of a measured variability of the areas.

According to an additional aspect of the present disclosure, the system further includes a variable and dynamically controlled data compression onboard sensor system platform that improves a data rate at which sensor systems collect measurement information, and enables new sensor designs to take advantage of a throughput advantage in focal plane designs. In this regard, onboard detector arrays are increased in size to cover an entire image plane receiving signal, increasing size.

According to another aspect of the present disclosure, each of the two-dimensional images comprises a stereo pair of images, and the three-dimensional geolocation position of the target feature in each of the two-dimensional images is determined for each stereo pair of images by measuring three orthogonal reference coordinates, which could include a latitude coordinate, a longitude coordinate, and a height coordinate, of the target feature.

According to yet another aspect of the present disclosure, the three-dimensional geolocation position is determined using the image pointing parameters without tie points or ground control points.

According to another aspect of the present disclosure, the system further includes a satellite in which the processor and the memory are provided, angular resolution of the two-dimensional images is in a scale on the order of nanoradians, and the accuracy of the adjustment of the image pointing parameters is in a scale on the order of nanoradians.

According to another non-limiting embodiment of the present disclosure, a method for forming three-dimensional images from two-dimensional images is provided. The method stores a plurality of two-dimensional images in a memory. The two-dimensional images each including a same target area and being acquired at different times and at different collection angles. The method identifies a plurality of target features in the target area of each of the two-dimensional images, and determines, independently for each of the two-dimensional images and based on image pointing parameters a three-dimensional geolocation position for each of the target features. A processor calculates a weighted average of the three-dimensional geolocation position for each of the target features using the two-dimensional images, and the image pointing parameters are adjusted, variably across each of the two-dimensional images, by providing a least squares adjustment of the image pointing parameters to minimize a geolocation difference between the three-dimensional geolocation position of each of the target features in each of the two-dimensional images and the weighted average of the three-dimensional geolocation position of each of the target features across the two-dimensional images. The method projects each of the two-dimensional images onto a georeferenced three-dimensional surface model of the target area based on results of the adjusting to form georeferenced and coregistered three-dimensional images from the two-dimensional images.

According to yet another non-limiting embodiment of the present disclosure, a non-transitory computer readable medium including an executable set of instructions for forming three-dimensional images from two-dimensional images is provided. The instructions, when executed by a processor, causes the processor to execute operations comprising: storing a plurality of two-dimensional images in a memory, the two-dimensional images each including a same target area and being acquired at different times and at different collection angles; identifying a plurality of target features in the target area of each of the two-dimensional images; determining, independently for each of the two-dimensional images and based on image pointing parameters, a three-dimensional geolocation position for each of the target features; calculating a weighted average of the three-dimensional geolocation position for each of the target features using the two-dimensional images; adjusting, variably across each of the two-dimensional images, the image pointing parameters by providing a least squares adjustment of the image pointing parameters to minimize a geolocation difference between the three-dimensional geolocation position of each of the target features in each of the two-dimensional images and the weighted average of the three-dimensional geolocation position of each of the target features across the two-dimensional images; and projecting each of the two-dimensional images onto a georeferenced three-dimensional surface model of the target area based on results of the adjusting to form georeferenced three-dimensional images from the two-dimensional images.

BRIEF DESCRIPTION OF THE DRAWINGS

The present invention is further described in the detailed description that follows, in reference to the noted plurality of drawings, by way of non-limiting examples of preferred embodiments of the present invention, in which like characters represent like elements throughout the several views of the drawings.

FIG. 6 is a table which includes exemplary descriptions and specifications of Step 1 and Step 2 of the multi-temporal, multi-angle, automated target exploitation process of FIG. 5.

FIG. 10 is a table that includes exemplary descriptions and specifications of Step 3 of the multi-temporal, multi-angle, automated target exploitation process of FIG. 5.

FIG. 15 is a table which includes exemplary descriptions and specifications of Step 4, Step 5, Step 6, and Step 7 of the multi-temporal, multi-angle, automated target exploitation process of FIG. 5.

DETAILED DESCRIPTION

Figure 1:
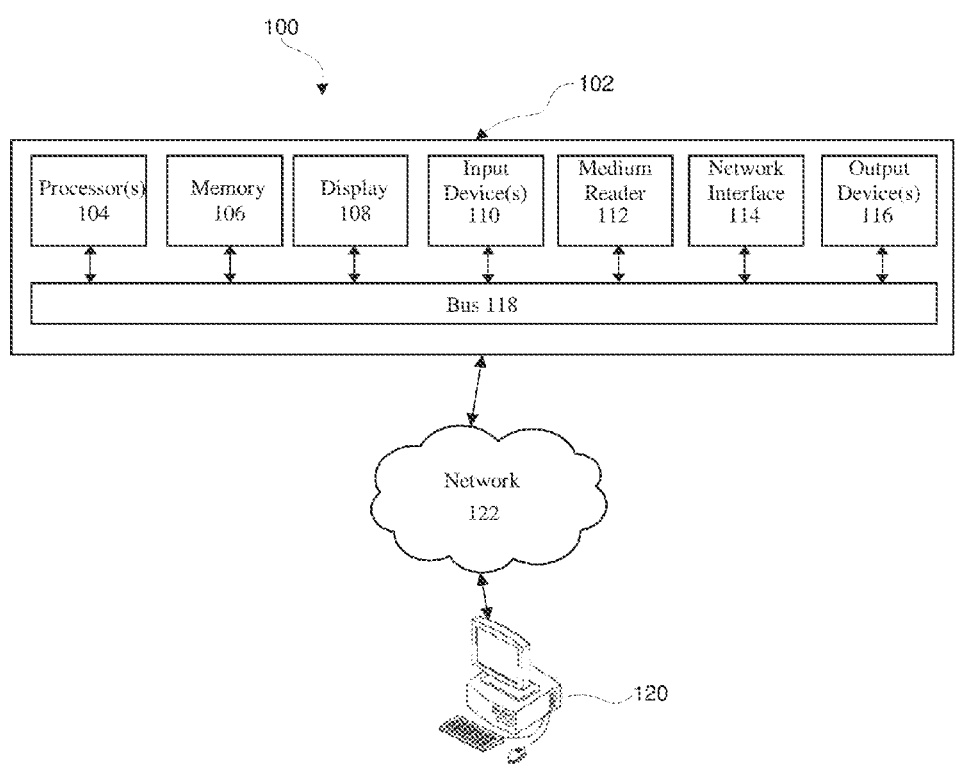
FIG. 1 illustrates an exemplary schematic of an image processing system.

The present disclosure, through one or more of its various aspects, embodiments and/or specific features or sub-components, is thus intended to bring out one or more of the advantages as specifically described below.

The present application may be used with an onboard spacecraft or aircraft data processing system. In this regard, the onboard spacecraft or aircraft data processing system may improve accuracy, resolution, and reduce the communication rate between satellites and ground systems by co-registering and analyzing images onboard the spacecraft. The spacecraft or aircraft data processing system may locate image regions with significant change or significant queried information for prioritized transmission, processing, and storage. In regions without significant change, information from multiple images can be co-added to increase signal-to-noise ratio while minimizing communication rate.

The present application may also be used with an automated aircraft and satellite ground processing and image exploitation system. The automated aircraft and satellite ground processing and image exploitation system may co-register images to a georeferenced scene topography, and then combine the images to improve accuracy, resolution, and signal-to-noise ratio.

In even further embodiments, the present application may be used in conjunction with medical imaging and film and video game applications. Of course, the present disclosure is not limited to being used in association with the above-mentioned systems, fields, and applications. The present disclosure may be used in association with any image processing systems, fields, and applications and in conjunction with any images collected on the ground, from the air, and from space. For example, in still further embodiments, the present disclosure may be used detect, identify, and/or track objects, such as in facial or object recognition systems. One exemplary application is to detect and track moving objects using multiple images, where each target is detected and tagged among the moving objects using its unique, measured spectroradiometric target signature. Thereafter, each target's trajectory or track is estimated across multiple images by maximizing the statistical significance of each target's track. Of course, this embodiment is again exemplary and not limiting or exhaustive.

The teachings of the present application may be used in connection with any image processing, analysis, evaluation, and compression systems without departing from the scope of the present application. In this regard, FIG. 1 shows an exemplary system 100 for use in accordance with the embodiments described herein.

The system 100 may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment. The computer system 102 may be fully contained, such as within an onboard spacecraft or aircraft data processing system or within an automated aircraft and satellite ground processing and image exploitation system. Alternatively, the computer system 102 may comprise a distributed system (not shown).

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 1, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, a printer, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 1 as a personal computer. However, those skilled in the art appreciate that, in alternative embodiments of the present application, the device 120 may be a laptop computer, a tablet device, a personal digital assistant, a mobile device, a palmtop computer, a desktop computer, a smartphone, a communications device, a wireless telephone, a personal trusted device, a web appliance, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 2:
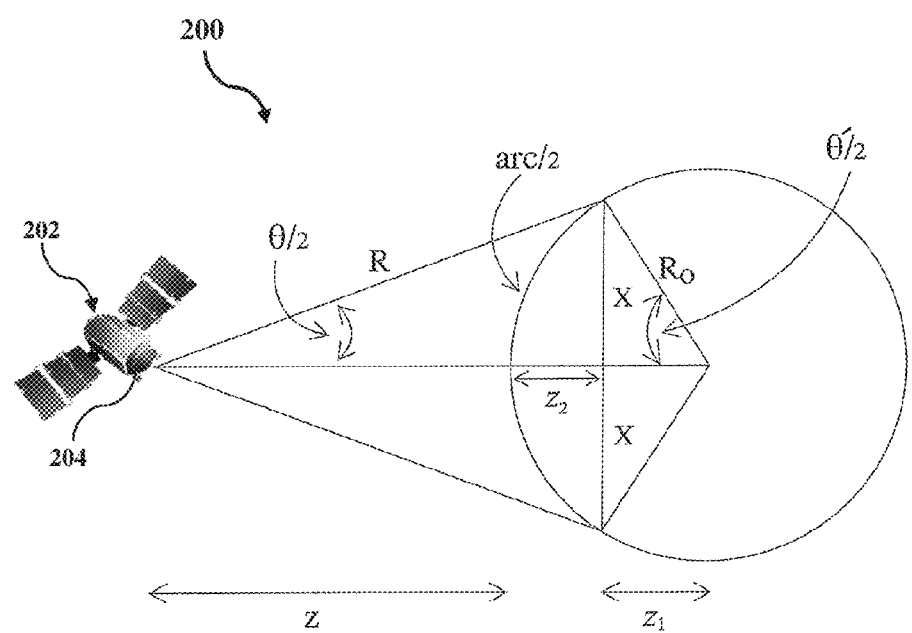
FIG. 2 illustrates an exemplary schematic of an image processing system for satellite imagery.

FIG. 2 shows an exemplary embodiment of the system 100 of FIG. 1 at 200. The system 200 includes an onboard spacecraft or aircraft data processing system 202 within which any combination of the components of the computer system 102 may be included. The onboard spacecraft or aircraft data processing system 202 may also include additional or alternative components, such as, for example, camera 204. The camera 204 may capture satellite imagery which may be processed by the onboard spacecraft or aircraft data processing system 202. The onboard spacecraft or aircraft data processing system 202 may improve the accuracy, resolution, and signal-to-noise ratio of the satellite imagery, and may further reduce the communication rate between the onboard spacecraft or aircraft data processing system 202 202 and a ground processing system (not shown) by co-registering and analyzing images onboard the onboard spacecraft or aircraft data processing system 202.

U.S. Provisional Pat. Appl. No. 61/153,934; U.S. patent application Ser. No. 12/708,482, now U.S. Pat. No. 8,238,903; U.S. patent application Ser. No. 13/544,141, now U.S. Pat. No. 8,480,036; and U.S. patent application Ser. No. 13/544,155, now U.S. Pat. No. 8,360,367 describe methods for optimizing the performance, cost and constellation design of satellites for full and partial earth coverage. The onboard spacecraft or aircraft data processing system 202 may be in accordance with the disclosure of any of these patent documents. The present application further describes novel applications of these patent documents, including, but not limited to, spacecraft processing, improvements to image geolocation from orbital measurements, interferometric imaging applications for KSS-designed satellite constellations, three or more sensor and satellite design changes to improve sensor resolution and signal-to-noise ratio, and a change in the KSS Satellite System Design Cost Model formulation for the patent documents.

Satellite systems designed in accordance with the disclosure of the above-mentioned patent documents may have either continuous or systematic access to collect measurements and images, and these imaging opportunities provide longer integration time, producing higher signal-to-noise ratio measurements, for better sensitivity and resolution than other available systems. These satellite systems may cost less and collect more images than other available satellite systems. Imaging systems that collect more images require more communication capacity between satellites and the ground processing system (not shown), and require more processing capacity to generate image and data products. The present application may be used in connection with the disclosure of these patent documents to provide higher communication capacity by designing imaging satellites in full constellations to function as elements in a relay communications system. Of course, those of ordinary skill in the art appreciate that the present application is not limited to being used in accordance with the disclosure of these patent documents and that the present application may be used in connection with any additional and/or alternative systems as generally known and understood in the art.

Figure 3:
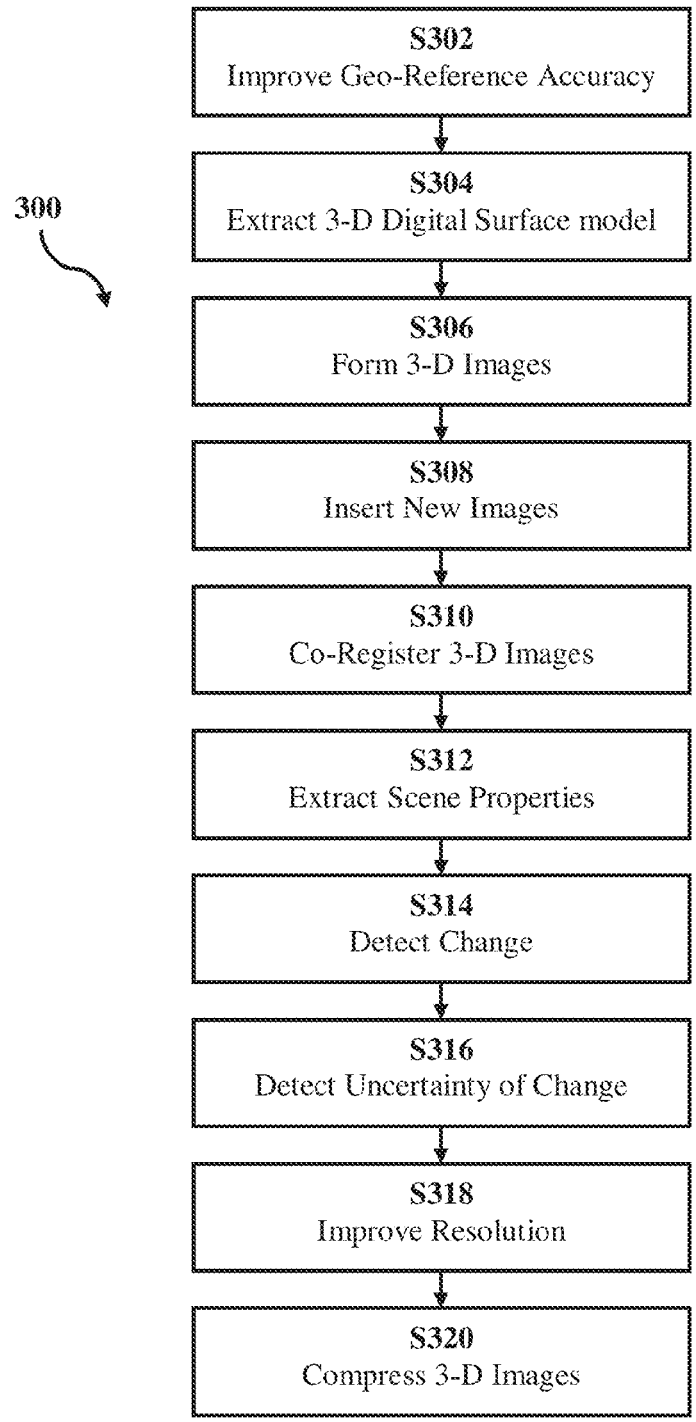
FIG. 3 illustrates an exemplary process for multi-temporal, multi-angle, automated target exploitation.

FIG. 3 shows a multi-temporal, multi-angle, automated target exploitation method 300 according to an embodiment of the present application. The method 300 may be a stand-alone process, or the method 300 may be embedded within a system, such as, for example, the satellite system 202 as shown in FIG. 2. In even further embodiments, the multi-temporal, multi-angle, automated target exploitation process 300 may comprise a transitory or non-transitory computer program which is executable by a processor, or the application may be tangibly embodied in a computer-readable medium which is readable by a processor.

The multi-temporal, multi-angle, automated target method 300 is a system or series of processes S302-S320 for processing a large number of images. The method 300 may geo-rectify the images to a 3-D surface topography, co-register groups of images with fractional pixel accuracy, and automate change detection. The method 300 may further evaluate the significance of change between images for massively compressing imagery sets based on the statistical significance of change. The method 300 may improve the resolution, accuracy, and quality of information extracted beyond the capabilities of any single image, and create registered six-dimensional image datasets appropriate for mathematical treatment using standard multi-variable analysis techniques from vector calculus and linear algebra such as time-series analysis and eigenvector decomposition. The above-described advantageous effects and results are merely exemplary and are not to be limited. The method 300 may be executed to achieve any or all of the above-described advantageous effects and results, or to achieve any additional or alternative effects.

The method 300 may be executed by a satellite processor and/or ground processing system which is designed to automatically extract finished information from multiple image sets collected from different collection angles, at different times, from different kinds of sensors, e.g., panchromatic, visible and near-infrared (VNIR), short-wavelength infrared (SWIR), mid-wavelength infrared (MWIR), long-wavelength infrared (LWIR), multispectral image (MSI), polarimetric imaging, hyperspectral imaging (HSI), spectrometers, Lidars, and synthetic aperture radar (SAR) sensors. The method 300 combines multiple images to provide extremely accurate geolocation information everywhere in the imagery for precision targeting and surveying. The method 300 may create Lidar-quality point clouds and digital elevation models (DEMs) from multiple electro-optical (EO) images, create true 3-D images by re-projecting each 2-D image onto the 3-D point cloud, co-register all images to fractional pixel accuracy, automatically provide rigorous change detection and image triage at pixel scale resolution, and compress multi-image datasets with variable compression that preserves the most significant data. The method 300 may even provide data compression at S320 for the most demanding and complex targets including cities, industrial sites, and mountainous areas. Of course, it is again understood that the above-described advantages and effects are merely exemplary and not limiting or exhaustive.

FIG. 3 shows the multi-temporal, multi-angle, automated target method 300 as including ten steps or processes S302-S320. Nevertheless, it is to be known and understood that further embodiment of the method 300 may include any combination of the shown processes S302-S320 in addition to any additional or alternative processes discussed herein.

The processes are generally for analyzing and compressing a large number of images or datasets collected over the most diverse, or general, image collection conditions possible. The images or datasets may be collected or measured from different angles, at different times, with different sensors, in different wavelength regions, with different illumination sources and conditions, and with different polarizations. The images or datasets may further be collected or measured over any additional and/or alternative collection conditions without departing form the scope of the present application.

As shown in FIG. 3, the multi-temporal, multi-angle, automated target method 300 improves geo-reference accuracy, absolute geolocation, and relative intra-image accuracy for features throughout images at S302. Geolocation accuracy is improved for all points in and around targets by using multiple images with high geometric accuracy, such as images collected by the GeoEye-1 and Worldview-2 (WV-2) satellites, co-registered by bundle adjustment or weighted co-averaging, with weighting by known error. Prior performance was 4 to 5 meter accuracy. An exemplary demonstration of the present application (Korb et al, 2012) had Goal performance of 1-2 meter accuracy at 0.67 probability, and achieved 0.60 meter accuracy using a set of nine GeoEye-1 (GE-1) images. This capability is at least 700% better than the current best geolocation information, available automatically everywhere in the imagery, to provide precision targeting for government customers and surveying and automated measurements for commercial customers.

The multi-temporal, multi-angle, automated target method 300 extracts 3-D digital surface models (DSMs) or point clouds from multiple images at S304. Digital surface/elevation model data is automatically extracted for cities, industrial sites, and mountainous sites using multiple images from a range of azimuth and zenith angles, collected in a single image pass or for mining all of the images in a library. Prior performance is 1 meter resolution with 0.5 meter root means square error (RMSE) for a stereo pair. Goal performance is 1 meter accuracy with 0.3 RMSE or better. An exemplary demo of the present application achieved 0.80 m resolution with 0.1 m RMSE, using a set of 16 GE-1 images, an improvement of more than 500% compared to prior art. DSMs are needed for automated geometric measurements, to construct 3-D images, to achieve accuracy and noise-limited precision in complex city environments, and to enable automation in processing.

3-D images are formed by projecting 2-D images onto the digital surface model at S306. In this regard, true 3-D images are formed on the surface of the georeferenced point cloud formed at S304, rather than forming images on a horizontal plane or low accuracy elevation model such as the digital terrain elevation data (DTED) level 2 shutter radar topography mission (SRTM) data used by Digital Globe, for example. The two-dimensional original images are bundle adjusted, e.g., re-projected to improve their degree of co-registration, and then are projected with the updated rigorous sensor or camera model onto the three-dimensional DSM, to form true 3-D images. The true 3-D images can be rotated and rendered from any perspective viewpoint, which is impossible using 2-D images, so the 3-D process is required for analyzing images collected from different viewpoints, with different sensors at different times. The 3-D images may be co-registered to 0.1 pixel accuracy or better in order to analyze the most important, small targets. The 3-D images may improve georeference accuracy, improve band-to-band registration for MSI, and improve chip-to-chip registration errors for panchromatic images with the highest resolution. An exemplary demo of the present application generated true 3-D images with 0.1 meter uncertainty from 1000 kilometer distance, representing geometric precision of 1 part in 10 million, 100 nano-radians. The 3-D images may be rotated in real time to any perspective, which generates 3-D computer-aided design (CAD) products that can be used in video games, television and/or film production, and industrial process inspection. The 3-D images create a superior user visualization experience with unique capabilities for foliage penetration in vegetative environments, activity based intelligence (ABI) analysis, low-light and nighttime imaging capabilities, and other capabilities.

New images are projected onto the digital surface model to improve geo-reference and relative geometric accuracy by field angle mapping new images onto the georeferenced DSM, point cloud, or 3-D images at S308. This improves geo-registration, absolute and relative accuracy, coregistration with other imagery, band-to-band registration (BBR), and chip shear, among other errors corrected. It enables the multi-temporal, multi-angle, automated target method 300 to geometrically calibrate and co-register low-quality images to extremely high accuracy, using the georeferenced DSM base layer to re-project these low-quality images. These lower-precision imagery or data sources might be aircraft imagery or instrumentation, hand-held photography, digitized historical film, ground sensors, radar, or any other data associated with target areas. Of course, these are merely exemplary and additional or alternative imagery or data sources may be equally applicable. Moreover, the imagery or data sources are not limited to being of lower-precision, but also, may be of a same or higher precision.

Since software, such as Co-registration of Optically Sensed Images and Correlation (COSI-Corr), can co-register images to accuracies of 0.02 pixels with exact height information, the re-projected imagery has absolute georeference accuracy nearly equal to the georeference DSM accuracy. An exemplary demo of the present application showed that IKONOS satellite images could be spatially calibrated to improve geolocation error from 25 meter error to 0.75 meter at 0.67 probability, an improvement of over 3000%, achieved without changing the physical sensor or using any human labor.

The 3-D images are co-registered to form a 6-D hyper-image with 3-D Geometry, time sampling, spectral sampling, and polarization sampling at S310. The 6-D hyper-image may also be analyzed with Multi-variable mathematics, including but not limited to: linear algebra, multi-vector calculus, statistics, and Boolean algebra at S310. In this regard, S310 creates a geo-referenced, co-registered image stack for multi-temporal and, multi-angle exploitation of all imagery ever collected for a target. As the geo-referencing, co-registering process improves, other images with lower geometric accuracy and lower intraband geometric linearity are re-projected onto the DSM, and are field-angle mapped, to improve inherent image geometric linearity and to transfer geolocation attributes of the geo-referenced DSM base layer to these lower quality images. As before, this improves chip-to-chip registration errors, and BBR errors for multispectral systems with offset line imaging causing parallax-induced mis-registration, but now in 3-D for all prior known surfaces and volumes.

The co-registration at S310 creates a set of images co-registered to 0.1 to 0.02 pixel error for the first time ever, throughout the image altitude layers in a city or in a human body for medical imaging, for example. Thereafter, any image can be rotated, to any perspective, and projected in 3-dimensions on a 3-D monitor. The geo-referenced, co-registered image stack is a novel 6-Dimensional vector data structure that can be automatically queried and analyzed with all of the machinery of vector calculus, including time series analysis and Principle Components Analysis. Analysis with vector calculus techniques is a method for extracting information from images without human analysis, for achieving cost savings through automation.

After or before the co-registration at S310, scene properties may be extracted from the 3-D images, the co-registered image stack, and/or the 6-D hyperimage at S312. The scene properties may include, but are not limited to, reflectivity, emissivity, and polarization of surfaces. Further scene properties which are known in the art may also be extracted at S312, such as, for example, volumetric absorption and scattering.

In extracting the scene properties, target properties may be calculated for analysis of surface reflectance and surface spectral emissivity to identify materials, surface temperature to identify human activity, and use physics-based analysis methods with Lambertian and non-Lambertian reflectance/emissivity models. Software image processing toolkits currently analyze multispectral VNIR, SWIR, MWIR, and LWIR data as well as MSI and HSI data. The multi-temporal, multi-angle, automated target method 300 can process and analyze MSI and HSI data measured by aircraft and spaceborne sensors, e.g., Landsat Thematic Mapper (TM), Advanced Spaceborne Thermal Emission and Reflection Radiometer (ASTER), MODIS, Advanced Very High Resolution Radiometer (AHVRR), commercial space imaging sensors such as GeoEye-1 and WorldView-2, and other U.S. sensors.

The MSI and HSI data may be used to calculate surface leaving reflectance, temperature, emissivity, or spectral complex index of refraction. The MSI and HSI data may also be used to calculate surface roughness, particle size distribution, surface contaminant, soil water content, chlorophyll, leaf area index, water color, polarization, and other absolute measures of surface and volume properties in the scene. For comparisons between images, these derived surface properties and volumetric properties, such as absorption coefficient and scattering, are more invariant to variations in collection conditions and sensors than sensor radiance measurements or surface leaving radiance. The analysis is more sensitive, accurate, and automated because the highly-conditioned data reduces machine errors that previously required human intervention.

The multi-temporal, multi-angle, automated target method 300 may detect changes in measured scene properties between sets of 3-D images, the co-registered image stack, and/or the 6-D hyperimage at S314. At S314, the method may compare information in a current, or test, image to information in a previous image or images which represents a reference baseline. The change in each pixel from the difference or normalized difference between identical areas in the test image and the reference set may be computed at S314. The change detection can additionally or alternatively utilize more complex analysis techniques, such as time-series analysis, enabled by the accurate vectorization of multiple datasets. Nevertheless, it is to be understood that the change detection is not limited to the methods described herein and that any known and understood change detection methods may be utilized without departing form the scope of the present application.

After the change detection, a change detection significance may be measured at S316. The change detection significance may be, for example, a ratio of measured change ($\Delta$) to a measured uncertainty of change ($\sigma$). The change detection significance provides for ranking change level of confidence, and prioritization for change impact analysis (IA).

The change $\Delta$ between two sets of images can be compared to local averages of calculated and measured total uncertainty and noise $\sigma$, where the ratio $\Delta/\sigma$ for each pixel generates a significance image that represents the degree of change from image to image, for every pixel, in comparison to our ability to measure that change. The ratio $\Delta/\sigma$ provides an automated method to filter important data using the statistical measure of confidence in the change detection. For example, a one-sigma change would be caused by real change 68% of the time, and by natural variation 32%. A two-sigma change is real 95% of the time, but is a false positive result 5% of the time. Similarly a three-sigma measurement detects real change 99.7% of the time, with only 3/1000 false positives. This significance image can be colorized or thresholded to extract and transmit only individual pixels and clusters of pixels with change beyond some desired level of significance. The significance may also be thresholded to transmit only individual pixels and/or clusters of pixels with change of a predetermined condition, such as, for example, a predetermined type or directional change. Of course, these examples are merely exemplary and the significance image may be thresholded in accordance with any additionally or alternatively known criteria. In any event, the measured change detection significance may then form the basis for a compression technique where only the most valuable data is analyzed, transmitted, and/or saved.

The multi-temporal, multi-angle, automated target method 300 may further improve resolution and signal-to-noise ratio by super-resolution processing of many images at S318. The method 300 may improve spatial resolution two-fold to three-fold, +1 to +1.58 NIIRS improvement, or more by super-resolution processing of multiple images. In this regard, multiple images at a lower resolution can be combined through a mathematically closed-form process to both improve the co-registration of the images, and to develop a higher resolution image of the target. The method 300 improves co-registration to ~1/50 pixel error, which provides sufficient accuracy to provide some resolution enhancement.

The 3-D images, the co-registered image stack, and/or the 6-D hyperimage may be compressed at S320. The images may be compressed using, for example, the change detection significance processing of S316 to filter changed pixels. Of course, those of skill in the art appreciate that the images may additionally or alternatively be compressed in accordance with any known image compression techniques. Nevertheless, the multi-temporal, multi-angle, automated target method 300 of the present application provides a novel compression process in which the images are compressed with dynamically-varying compression using the change detection significance measured in S316.

Using the change detection significance, pixels and regions of interest (ROIs) with the most significant changes may be located, to optimally process, compress, transmit, and save the most important data, for optimal utilization of processing, communication, and data storage resources. Compression ratios may vary from 1 to any arbitrary value, depending on capacity and need. The capacity and need may be computed dynamically from the ratio of the available data rate to the communication rate to set the threshold for the optimal compression ratio. Of course, the compression ratios may vary in accordance with any other criteria in accordance with known methods.

A non-limiting and exemplary demonstration of the multi-temporal, multi-angle, automated target method 300 was performed in 2012. During the demonstrative, the following non-limiting but representative results were achieved: absolute geolocation accuracy of 0.6 meter accuracy, 1.2 pixels (0.67 p), using bundle adjustment of commercial imaging by the GeoEye Satellite; extracted 3-D surface models with geolocation accuracy of 0.6 meter (0.67 p) and DSM resolution better than 0.8 meter; 3-D images were formed from each 2-D image, with geolocation and geometric information encoded in World Geodetic System (WGS) 84 coordinate system of latitude, longitude, and height above ellipsoid (HAE); co-registered 3-D images together with accuracy of 0.1 to 0.02 pixels.

The ten steps or processes S302-S320 of the multi-temporal, multi-angle, automated target method 300 of FIG. 3 are automated processes, designed to reduce the labor costs for image exploitation and improve exploitation accuracy. The method 300 improves geolocation accuracy, measurement accuracy, and resolution quality by combining information from large numbers of images. Information can be combined from many images when the images are rigorously co-registered to fractional pixel error, which requires that all images are rigorously re-projected onto the scene's georeferenced topography in 3-D. The method 300 projects each 2-D image onto the 3-D scene topography to improve the georeference accuracy throughout each image to equal the accuracy of the group average of the images, which enables co-registering the images in 3-D with sub-pixel accuracy. Image co-registration allows weighted co-averaging to enhance sensitivity and resolution, and allows rigorous comparison to enable pixel-level change detection and analysis. The method produces image qualities and information extraction beyond the capabilities of any single image that may likely exceed the physical limits for individual images, such as the aperture-limited diffraction spatial resolution and the slit-width-limited spectral resolution limits.

The multi-temporal, multi-angle, automated target method 300 is the first data system that automatically analyzes the properties of a group of images, including the spatial, spectral, temporal, and polarimetric measurements of radiance intensity in electromagnetic radiation. Integrating many images acquired at different times, different collection angles, and with different sensors with spectral-polarization-resolution properties provides a new capability to record a "movie" of the properties and all of the time-varying activity over large areas, over an entire planet, and more. The "movie" provides for ecological as well as climatological and geographical monitoring. The "movie" also provides for numerous commercial applications, as well as scientific, such as but not limited to surveying, navigation, and surveillance. The "movie may measure changes in geometric, time, spectroradiometric, and polarimetric target properties automatically. Of course, the above-listed examples and advantages are merely exemplary and are not limiting, exclusive, or exhaustive.

The following is a comparison of the attributes and differences between the multi-temporal, multi-angle, automated target method 300 and other applications that involve 3-D processing, such as C3 Technology, Google 3-D Earth, and OsiriX medical imaging software. The method 300 and the other approaches all may utilize multi-EO rays to collect 3-D information of the surfaces and volumes in a scene. Only the method 300 and OsiriX allow simultaneous exploitation by sensors in different spectral regions. For example, the method 300 allows simultaneous exploitation in EO, infrared (IR), and SAR, while OsiriX allows simultaneous exploitation in x-ray and sonograms. The method 300 automatically adjusts pointing information to improve the accuracy of co-registration, however, while OsiriX requires manual adjustment of pointing. The method 300 correlates different sensors in multiple bands simultaneously to provide best coregistration, while OsiriX correlates using a single band. Only the method 300 uses many images to increase the accuracy and resolution of image products, and uses a priori information from previous collections to solve under-determined retrievals of surface and volume properties. There are other change detection capabilities for radiometry, but these work only on 2-D images without surface orientation knowledge and have unconstrained error in BRDF, whereas method 300 calculates surface orientation accurately within 140 mrad to accurately model BRDF. Of the 3-D change applications, only the method 300 analyzes the radiometry using Lambertian and BRDF angular dependence models that can utilize the 3-D surface knowledge accurately. None of the other applications includes all of the disclosed processes of georegistration, 3-D surface retrieval, 3-D image projection, image co-registration, radiometric retrievals, rigorous change detection, change detection significance, and super-resolution processing.

The multi-temporal, multi-angle, automated target method 300 is the first data process/system that creates image products using multiple images to improve the quality of information extracted from imagery. In accordance with the method 300, accuracy and resolution are improved by averaging multiple measurements using averages, and by the use of weighted averages with weighting incorporating estimated uncertainties. Accuracy and resolution are also improved by using a priori information acquired in previous measurements to improve image restoration and image enhancement processes such as modulation transform function (MTF) correction. Accuracy and resolution are further improved by measuring the same features multiple times, where the sampling is varied either randomly, e.g., dithering of independent measurements, or varied systematically, to provide a sampling comb that exceeds Nyquist or other physical limitations. These oversampling methods can provide spatial, spectral, or temporal resolution enhancements beyond the natural physical limits available to single measurements, such as aperture-limited spatial resolution, or slit resolution limits inherent to diffractive spectral systems. Oversampling through combining multiple measurements in the spectral, spatial, or temporal domains can be exploited to simultaneously improve both signal-to-noise and resolution when the number of multiple measurements is large.

The multi-temporal, multi-angle, automated target method 300 exploits all of these advantages to improve absolute geolocation accuracy from imagery, improve the accuracy of relative geometric measurements within an image, improve the accuracy and precision of the derived 3-D images, derived point cloud, digital surface/elevation model (DSM) products, improve the accuracy of image co-registration, and improve the signal-to-noise ratio, spatial resolution, spectral resolution, temporal resolution derived and extracted from the multi images.

The method 300 is also the first design of a new data type, a new data construct, or data model to describe planetary observations. The data model is a generalized $6^+$ or general n-Dimensional vector set, which describes measurements recorded and derived for: the 3-D spatial model of the target surface; 1-Dimensional changes through time; and 2-D spectral, and polarimetric properties including spectral reflectance, spectral emissivity, measurements of the polarization for each of the spectral properties, multi-dimensional derived atmospheric, surface properties, and bulk material properties, which include but are not limited to temperature, material characteristics such as thermal inertia, and properties such as surface roughness. This model is derived from image datasets, already recorded, to compare a baseline, which is any group of previous images, to current and future images to analyze their incremental change and information content The method 300 is also the first design of datasets, the 6+, n-dimensional planetary data model, as vector datasets to enable image and target analysis using the methods of vector calculus. Vector calculus analysis methods include eigenvector decomposition, time series analysis such as Fourier time series analysis, vector addition, subtraction, scalar multiplication/division, vector dot products, curls, gradients, divergences, and others, as standard target analysis methods. None of these methods are previously available for analysis in multi-image sets at pixel level accuracy for time series, spectro-radiometric and polarimetric-based, and geometric analyses due to inadequate image co-registration, absolute geolocation and relative geometric accuracy in 3 spatial dimensions. Methods that provide automated geometric co-registration in 2-D are rare, see, e.g., CalTech, and in 3-D rarer, see, e.g., Mundy et al. at Brown. Of those co-registered in 3-D, none calculate and improve absolute geolocation, none claim improvement to relative geometric accuracy, and therefore none has similar geometric accuracy in geometric change detection, none calculate spectroradiometric surface properties according to the Lambertian model correctly, and none calculate spectroradiometric surface properties according to the non-Lambertian model, using BRDF, correctly.

The multi-temporal, multi-angle, automated target method 300 is also superior to previous methods in the scale of resolution for its design. The method 300 may be used with imagery collected from space or aircraft, or from closer ranges. However, the most stressing applications are the space-collected images. Unlike medical applications, such as OsiriX where images are collected at resolutions of fractional millimeters from a meter or so distance, hand-held photography applications such as 1, 2, 3-D by AutoCAD, applications including Google 3-D Earth, Apple's C3 technology, and other similar technologies using imagery from airplanes or surveying equipment where the scale might be an inch resolution at several mile distance, this application involves resolution of inches at distances of nearly 1000 miles, so that the angular resolutions used in this application are in scales of nanoradians rather than microradians, e.g., from aircraft, or milliradians, e.g., medical imaging and close-range applications. Thus, the angular resolution of this technology is already 3 to 6 orders of magnitude finer than non-space applications. In this regard, the resolution of satellites designed by the above-mentioned patent documents to Korb et al. may be enhanced by another seven or more orders of magnitude using multiple images collected with optical interferometry, as described by the present application.

Figure 4:
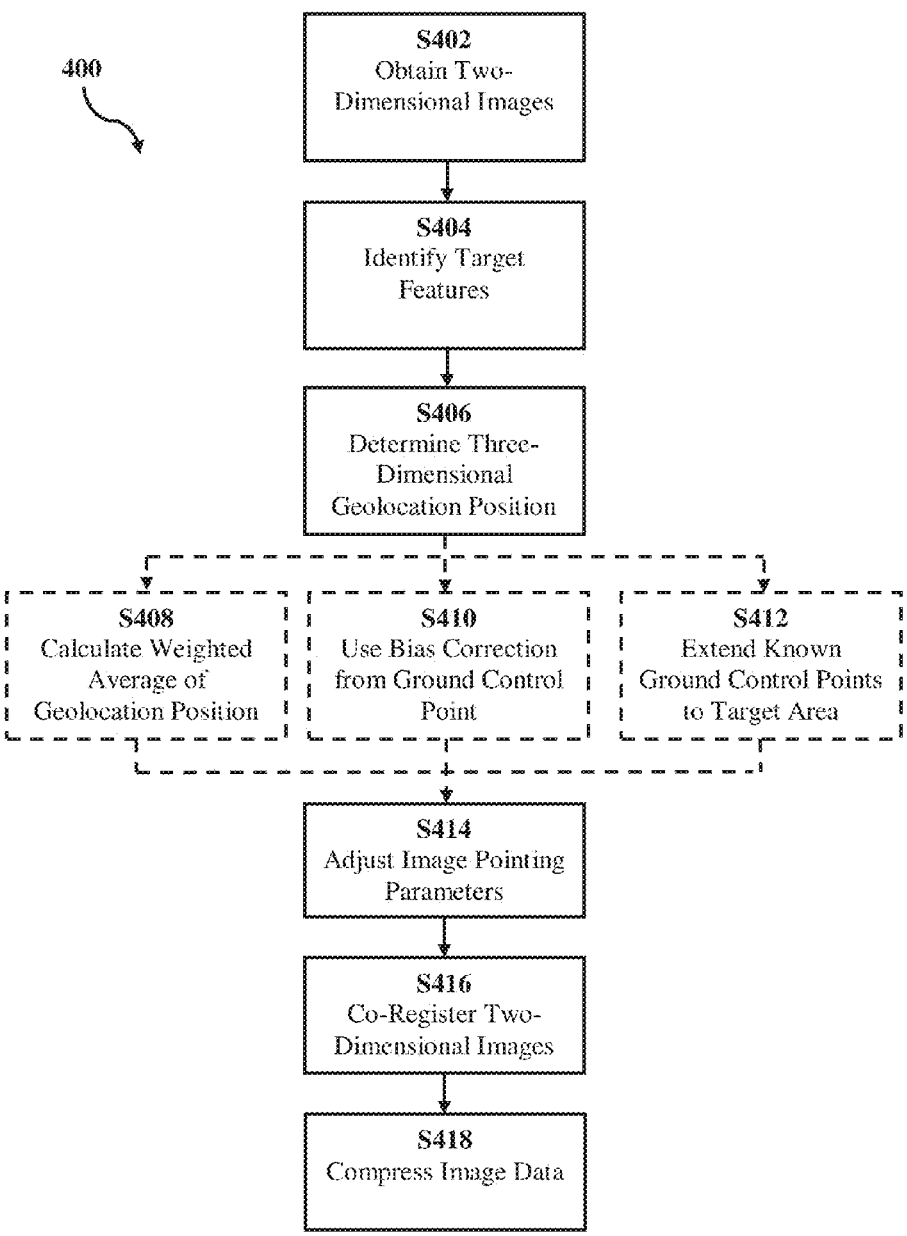
FIG. 4 illustrates a further exemplary process for multi-temporal, multi-angle, automated target exploitation.

FIG. 4 shows an additional embodiment of the multi-temporal, multi-angle, automated target method 300 of FIG. 3. The multi-temporal, multi-angle, automated target method of FIG. 4 is generally indicated at 400. As with the multi-temporal, multi-angle, automated target method 300 of FIG. 3, the various features S402-S416 of the method 400 of FIG. 4 may comprise method steps or processes which are performed via any of the tangible structural components described herein. In further embodiments, the various features S402-S416 of the method 400 may comprise operations which are executed by a processor within a system. For example, the various features S402-S416 may comprise operations which are executed by the onboard spacecraft or aircraft data processing system 202 as generally indicated in FIG. 2. In this regard, the onboard spacecraft or aircraft data processing system 202 may comprise a memory and a processor, as described with respect to FIG. 1. The memory may include instructions which, when executed by the processor, cause the onboard spacecraft or aircraft data processing system 202 to perform the operations S402-S416 as shown by FIG. 4. Of course, various other embodiments as disclosed by the present paper may similarly include the various features S402-S416 as shown by FIG. 4 and the additional and alternative features described herein.

The multi-temporal, multi-angle, automated target method 400 of FIG. 4 obtains a plurality of two-dimensional images at step S402. The images may be obtained externally via a network, such as the network 122 as described with respect to FIG. 1. Additionally or alternatively, the two-dimensional images may be obtained from a library or database, such as the memory 106 as described with respect to FIG. 1. In even further embodiments, the two-dimensional images may be captured by a camera or image capture device of a system which executes the method 400, such as the camera 204 as shown in FIG. 2. Of course, the above-described embodiments are non-limiting and not exclusive or exhaustive. The two-dimensional images may be obtained in accordance with any known methods in the art without departing from the scope of the present application.

Each of the two-dimensional images generally includes a same target area, but is acquired at different times and at different collection angles. In further embodiments of the method 400, the two-dimensional images may additionally or alternatively have different spatial, spectral, temporal, or polarimetric properties.

The method identifies a plurality of target features in the target area of each of the two-dimensional images at S404, and determines a three-dimensional geolocation position of each of the target features in each of the two-dimensional images at S406. The three-dimensional geolocation position is determined independently for each of the two-dimensional images. The three-dimensional geolocation position is determined based on image pointing parameters, such as, for example rational polynomial coefficients (RPCs).

The multi-temporal, multi-angle, automated target method 400 improves the absolute geolocation and relative measurement accuracy of the three-dimensional geolocation position at steps S408-414. The absolute geolocation and relative measurement accuracy can be improved by combining measurements of the three-dimensional geolocation position of the target features from each of the two-dimensional images, e.g., a group of images, over the same target area, using multiple techniques. The multiple techniques are shown at steps S408-S412 and briefly described below. The multiple techniques are described more thoroughly hereinafter.

The multi-temporal, multi-angle, automated target method 400 includes an n-bundle adjustment (BA) for the two-dimensional images, e.g., a group of images. The n-bundle adjustment is shown at step S414 of FIG. 4 and includes a quasi-least squares adjustment of the image pointing parameters, such as the RPCs, to minimize a discrepancy error amongst the two-dimensional images. In contrast with previous techniques which adjust one or more slave images to a master image, the multi-temporal, multi-angle, automated target method 400 co-registers multiple images to a derived three-dimensional surface that minimizes the sum of the squared errors.

The method 400 may minimize the discrepancy error by using weighted-coaveraging of geolocation derived independently from multiple images. In this regard, the method 400 may calculate a weighted average of the three-dimensional geolocation position for each of the target features using the two-dimensional images at S408. The method may also calculate a least squares fitting of the three-dimensional location position for each of the target features using the two-dimensional images at S408. Those of ordinary skill in the art appreciate that the least squares fitting should be interpreted as including a quasi-least squares fitting or a weighted least squares fitting, and any additional methods of determining a best fit as generally known and understood in the art. The three-dimensional geolocation position of each of the target features are independently derived for each of the two-dimensional images at S406.

Additionally or alternatively to step S408, the method 400 may minimize the discrepancy error by using bias corrections from one or more ground control points (GCPs) located in the target area when available. The method may use the bias correction from a GCP at S410.

Even further to the above, additionally or alternatively to steps S408 and S410, the method 400 may minimize the discrepancy error by extending known GCPs, which are not in the target area, to the target area at S412. In this regard, the method 400 may use triangulation with 2 or more rays in a series of triangles. The method 400 may collect long strips of imagery from the known GCPs to the target area, depending on the segregation of errors into bias terms which can then be subtracted using the GCPs.

After any combination of steps S408, S410, and S412, the method adjusts the image pointing parameters, variably across each of the two-dimensional images, by providing an adjustment of the image pointing parameters to minimize a geolocation difference between the three-dimensional geolocation position of each of the target features in each of the two-dimensional images and the weighted average of the three-dimensional geolocation position of each of the target features across the two-dimensional images at S416. The adjustment may comprise a least squares adjustment, for example, or any other adjustment that is generally known and understood in the art. As a result, the absolute geolocation accuracy of the two-dimensional images is improved by using the improved image pointing parameters, such as, for example, the RPCs.

The multi-temporal, multi-angle, automated target method 400 may utilize GeoEye-1 images when determining the absolute geolocation of the target feature at S406. During the period from 2009-2012, GeoEye-1 images provided the best absolute geolocation and relative geometric accuracy available from spaceborne imaging systems available commercially. Kohm and Fraser reported absolute geolocation accuracy. Kohm also specified the high relative accuracy of the GeoEye-1 sensor. However, no one reported the use of a multi-ray n-bundle adjustment to improve absolute accuracy, and relative accuracy.

Geolocation absolute accuracy improves using a bundle adjustment by approximately the square root of n, the number of independent measurements. This improves the absolute geolocation uncertainty from 3.5 meters to 1.2 meters, at the two-sigma level of confidence. Image pixels with 0.5 meter ground sample distance (GSD) are now registered in absolute location to about 1 pixel of accuracy, 1-sigma, 0.6 meter.

The two-dimensional images are co-registered together non-homogeneously by re-creating each two-dimensional image in three-dimensions and minimizing the fitting error to the a priori or a posteriori surfaces and volumes in the target area at S416. The absolute geolocation accuracy, improved by using the adjusted imagery pointing information improved in steps S408-S414, which may reside in the detailed camera or sensor geometry model or be included with the two-dimensional images, is used to begin the co-registration of multiple images, and to enhance the co-registration of multiple images collected at different collection geometries, different times, and with different sensors. This technique results in absolute location within one pixel, one sigma, which is superior to other results reported in the literature for high-resolution imagery collected from space.

One important differentiation using this technique is that scenes with repetitive features with scales of larger than 1 meter or 2 imaging pixels, whichever is smaller, can now be co-registered without ambiguity, which would not be possible without absolute geolocation of ~1 pixel accuracy. This applies to scenes with high-rise buildings and rows of agricultural crops, which are nearly or absolutely identical.

The two-dimensional images may be co-registered together non-homogeneously, fitting each set of auto-correlated target features from all of the two-dimensional images to either: an a priori knowledge, and uncertainty, of the three-dimensional locations along surfaces and within volumes in the target area; or, in the absence of this knowledge, e.g., the first time a set of measurements is made, the root mean square (RMS) minimization may be made between the weighted group average and the individual two-dimensional measurements for each auto-correlated target feature location.

The co-registration of multiple images, using an n-bundle adjustment of image pointing parameters, for example RPCs, may be spatially-variable across each of the images, and generally different for each measurement unless collected from near-identical angles. The co-registration process modifies the image pointing parameters, such as RPCs or pointing using rigorous error propagation with covariances, and these modifications to the image pointing parameters are solved for and applied independently over different sections of the target area, e.g., non-homogeneously. The algorithm measures and effects change to the pointing for a set of auto-correlated target features or tie points. The changes to pointing, in zero to second order or more, that are required for an improved "best fit" are solved through an over-determined least squares fit that minimizes the RMS of the residuals between the estimated knowledge of the tie points' locations and the locations known a priori from previous knowledge, such as earlier measurements, or locations to be determined from this set of measurements a posteriori. The a priori or a posteriori knowledge of the target scene surfaces and volumes shapes and locations represents the 3-D topography of the scene extracted from high resolution DSM extraction performed earlier, a priori, or after the fact, a posteriori, from this set of images. This requires iteration one, or more times, since at minimum the 3-D topography must be calculated.

The least squares fit applies to the minimization of geolocation difference to the a priori or determined after the fact knowledge of the surfaces and volumes of the target area. The least squares fit applies differently for different surfaces and different volumes for semi-transparent surfaces, correcting for multiple orders to correct for image biases, translations, rotations, stretches, and multi-order corrections, all non-homogenously applied through the images. These capabilities may improve spatial resolution for medical imaging applications when spatial resolution is limited by uncorrected imaging effects including but not limited to rotations, translations, non-homogeneous motion, and scale expansion/contraction in the subject, and uncorrected camera errors including angular and position errors, and camera distortions.

Further to the above, the multi-temporal, multi-angle, automated target method 400 may compress sets of images using change detection significance to filter changed pixels at S418. The data is compressed with an adjustable compression ratio ranging from one to infinity that is automatically set by the significance threshold value, which is computed from the ratio of the data rate to the communication rate. The compression can filter the geo-referenced pixels and ROIs in rank order of statistical significance, which is calculated by the change detection significance and the ROI size and arrangement, after co-registering multiple images in 3-D. Only the most significant ROIs need to be saved or sent.

Figure 5:
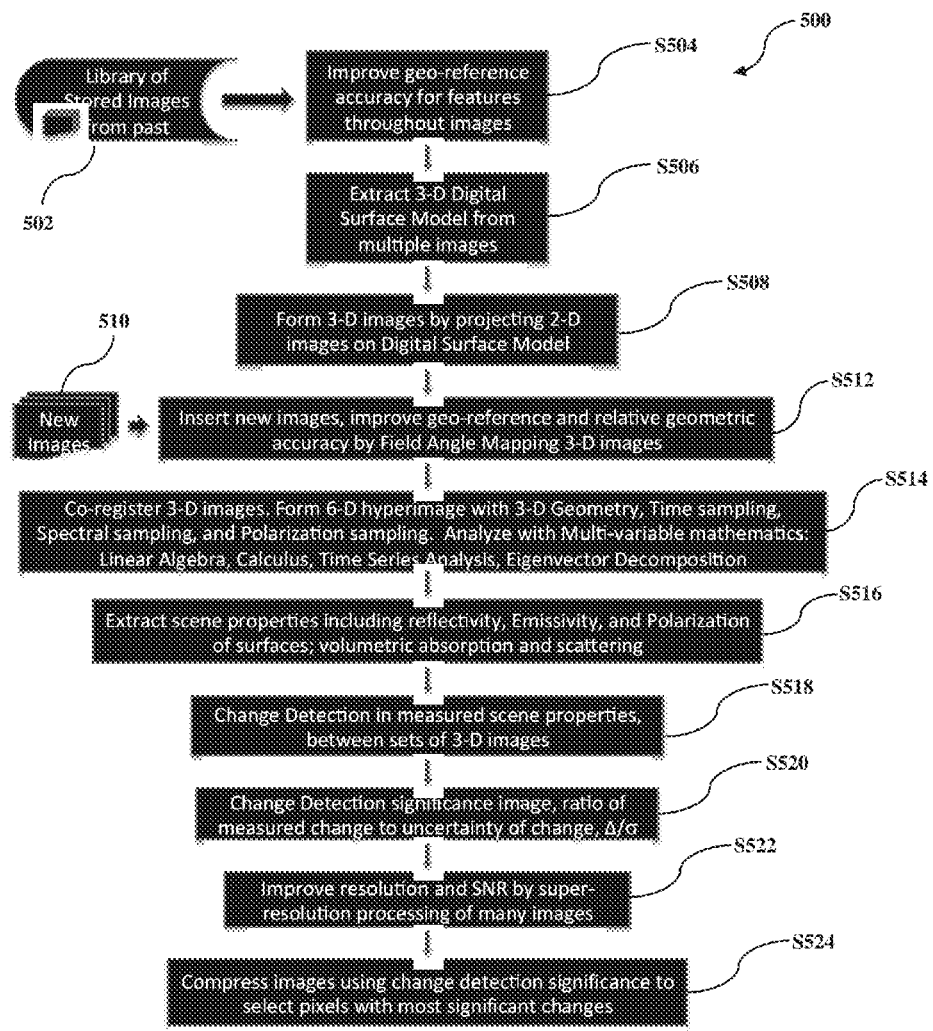
FIG. 5 illustrates an even further exemplary process for multi-temporal, multi-angle, automated target exploitation.

A further embodiment of the multi-temporal, multi-angle, automated target method is generally shown at 500 in FIG. 5. The method 500 includes a series of algorithms for automating rigorous change detection, extracting better information from multiple collections of targets over time and at multiple angles, rigorously georegistering images to high accuracy, creating georeferenced DSMs, using bundle adjustment for image co-registration and commercial imagery for its georeference accuracy. The method 500 is shown as including ten algorithms, steps, or processes. Moreover, these steps, algorithms, or processes are referred to as Step 1, Step 2, Step 3, etc. for convenience. Nevertheless, it is to be understood that further embodiments of the method may comprise any combination of the listed steps, including any additional or alternative steps which are described herein or known and understood in the art. Moreover, it is be understood that the ordering of the steps is not limited to that as shown in Figure and recited numerically herein, unless describe as necessary.

Figure 6:
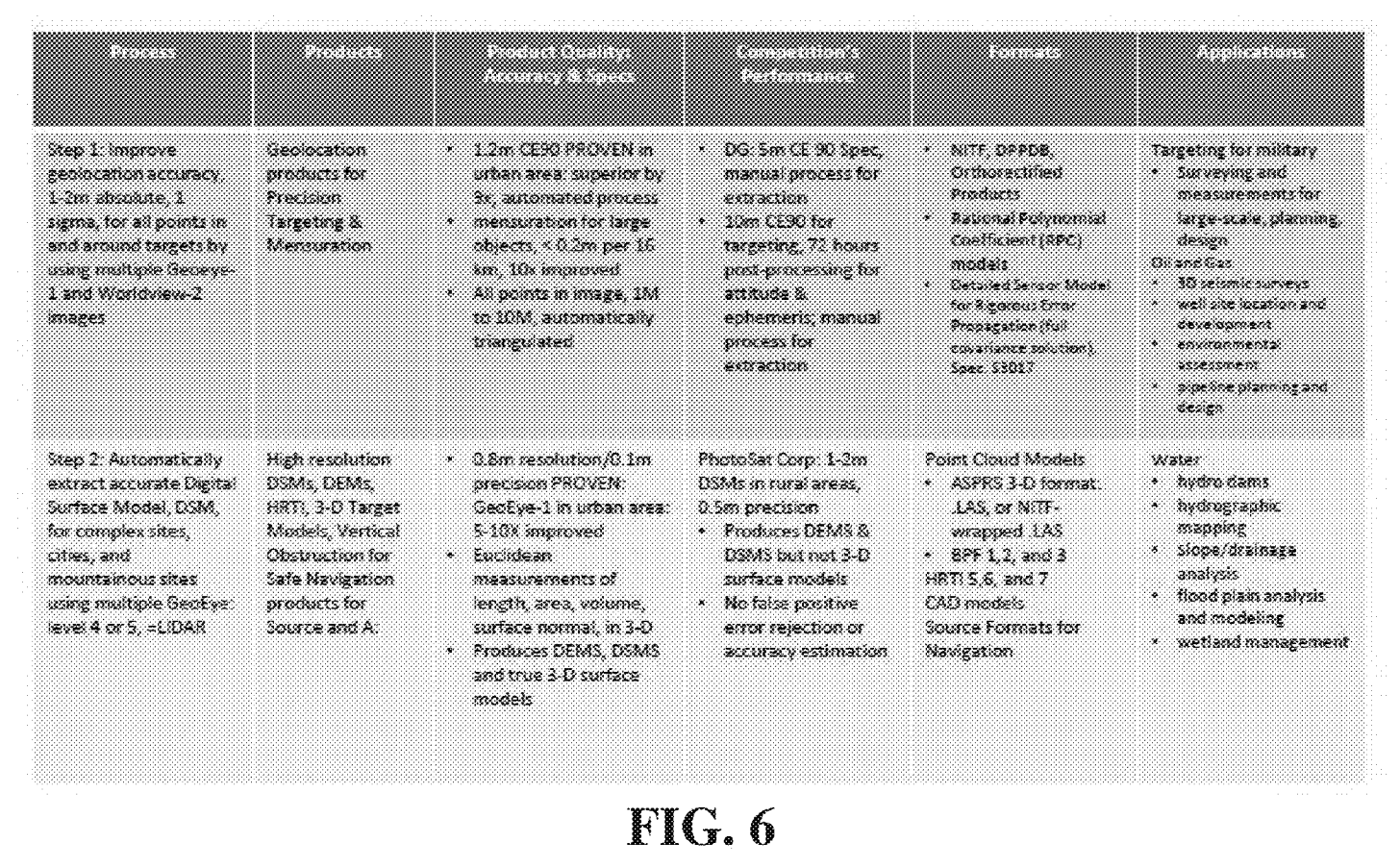

Step 1, shown at S504 of FIG. 5, improves geolocation accuracy for all points in and around targets by using multiple images with high geometric accuracy, such as images collected by the GeoEye-1 and Worldview-2 satellites, co-registered by bundle adjustment. In the embodiment of the method as shown in FIG. 5, the multiple images are received from a library of stored images from the past, indicated at 502. Non-limiting and exemplary processes, specifications, competitor's performances, formats, and applications of Step 1, e.g., S504, are shown in FIG. 6 of the present disclosure.

Geoeye-1 and Worldview-2 satellites imagery have absolute geolocation error, CE 90/LE 90, of less than 3.5 meters from pairs of stereo images using RPCs without tie points or Ground Control Points. Geoeye-1 has a mean error, for a large number of images that is well under 1.0 meter, absolute, without post-pass ephemeris or GCPs. University of Melbourne has verified that performance is perhaps better than advertised, and that with a single GCP and bias-corrected RPCs has RMSE error of 0.1 to 0.25 meter throughout large areas, and basic image size is >15 kilometers×15 kilometers, collected in less than 2 seconds. GeoEye can collect multi-stereo image pairs within a single pass, certainly more than two images per pass. These accuracy specifications were verified at one ground-truth site in a demonstration of this application in 2012.

Bundle adjustment can geometrically co-register images to better than 1 pixel accuracy using image correlation. The co-registration accuracy is measured with a metric value representing the degree of fit throughout the image; the degree of coregistration fit and absolute geolocation accuracy were validated during the 2012 demonstration at 0.1 pixels or less, and 0.6 m accuracy (at 0.67 probability), respectively.

Step 1, e.g., S504, includes a first process for improving absolute geolocation knowledge and uncertainty, and a second process for improving relative position measurement accuracy.

The accuracy of absolute geolocation, exact position on the Earth reference system, WGS 84, and relative measurements can be improved by combining measurements from two or more images over the same area, using multiple techniques, described herein. Most simply, by measuring the 3-D geolocation position with a stereo pair of images. Each stereo pair provides an x coordinate (latitude), a y coordinate (longitude), and height coordinate for every correlated feature in the image pair. These position measurements may be improved by averaging multiple measurements, collected with multiple, n, stereo pairs. Position error and uncertainty can be improved by as much as the square root of n, $n^{1/2}$. Actual improvement may be less than $n^{1/2}$ though.

The geolocation positions could also be measured from multiple single image measurements, where the 3-D position is derived from the intersection of the target ray with the ground plane, assuming a target height. Position error may then depend on the error and uncertainty of the knowledge of exact height within the target scene, which is an additional source of error.

The 3-D geoposition averaging from n stereo pairs can be improved by using weighted-averaging, where each of the x, y, and z coordinates is calculated with a weighted average. For image i, where i is one of n images, the weighting factor $w_{ij}$ for image i's contribution to the $j^{th}$ coordinate, i.e., x, y, and z coordinates of position vector x, where $$x = x_j \text{ for Cartesian coordinate components } j=1\ldots 3 \quad \text{(Equation 1)}$$

is one divided by the $i^{th}$ image error, in each $j^{th}$ coordinate $\sigma_{ij}$ squared, then divided by the sum of one divided by the squared errors for all of the images, in each coordinate $1/\Sigma_i(\sigma_{ij}^2)$, as specified by the following equation $$w_{ij} = (1/\sigma_{ij}^2)/\Sigma_i(1/(\sigma_{ij}^2)) \quad \text{(Equation 2)}$$

Step 1 of method 500, e.g., S504 of FIG. 5, provides an n-bundle adjustment for a group of n images. The n-bundle adjustment provides a quasi-least squares adjustment of RPCs to minimize the discrepancy error over a group of m features detected in each of the n images. Some implementations adjust the RPC sensor model, but cannot adjust for the other eight sensor model types described by Deilami (2011), et al., particularly the Rigorous Sensor Models, nor Universal Lidar Error Model (ULEM, Community Sensor Model Working Group, 2012). Some implementations adjust a single bias term for each image, constant or homogeneous across the entire image. This is a zero-order, homogeneous correction. There is no capability to adjust in zero order non-homogeneously, nor capability to adjust with linear (first order), quadratic (second order), or higher order terms, either homogeneously, or non-homogeneously. The difference between the present application and the previous efforts is that the previous efforts adjust one or more slave images to a master image. In contradistinction, the present disclosure co-registers multiple images to the derived 3-dimensional surface, e.g., the Earth or planetary topography, that minimizes the sum of the squared errors for all of the common features in the images.

Additionally or alternatively to the above, Step 1, e.g., S504, of the method 500 may minimize the discrepancy error over the group of n images by using bias corrections from one or more GCPs located in the target area when available. In even further additional or alternative embodiments, Step 1, e.g., S504, may minimize the discrepancy error by extending known GCPs, which are not in the target area, to the target area, using either: triangulation with 2 or more rays in a series of triangles from the known GCPs to the target area; or by collecting long strips of imagery from the known GCPs to the target areas, depending on the segregation of errors into bias terms which can then be subtracted using the GCPs.

Step 1, e.g., S504, of the method 500 may utilize GeoEye-1 images, which in the period from 2009-2012, provide the best absolute geolocation and relative geometric accuracy available from spaceborne imaging systems available commercially. Absolute geolocation accuracy was reported by Kohm and Frase. Kohm also specified the high relative accuracy of the GeoEye-1 sensor. However, no one reported the use of a multi-ray n-bundle adjustment to improve absolute accuracy, and relative accuracy.

Figure 7:
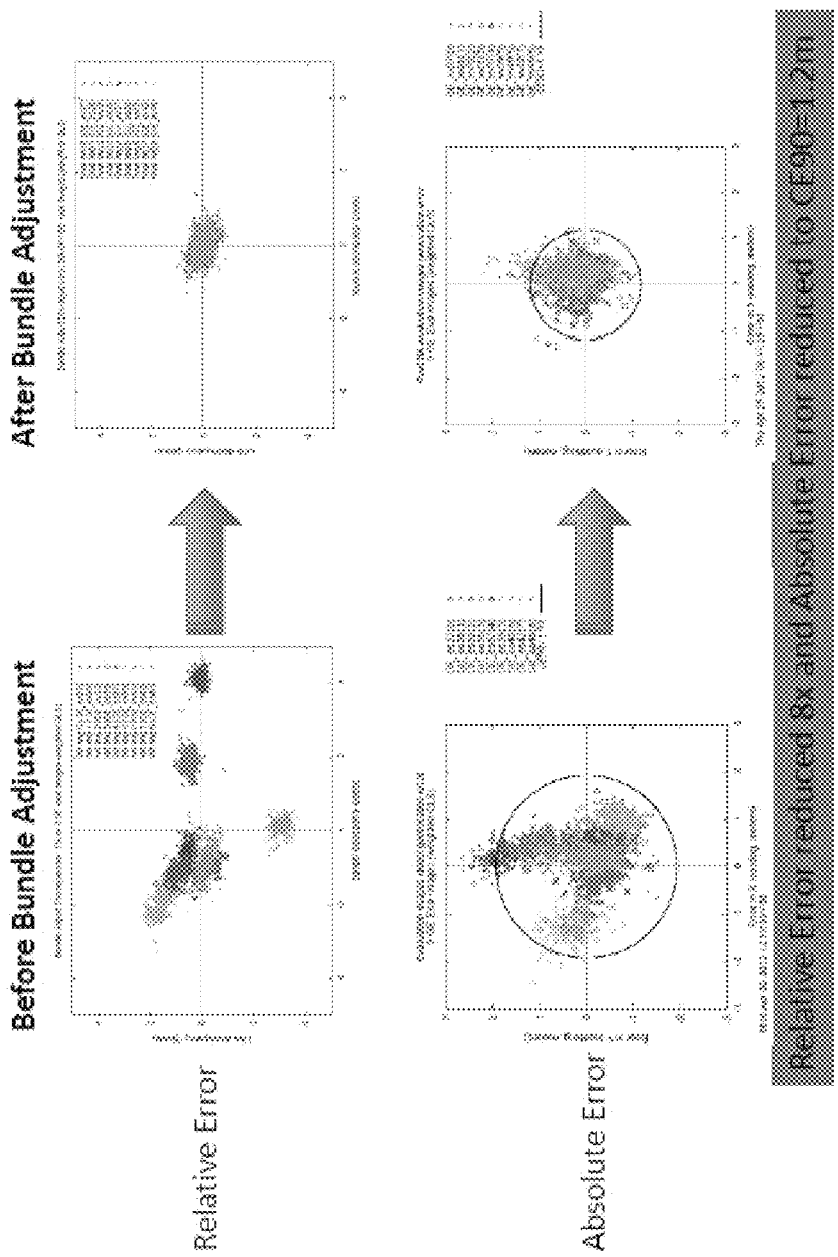
FIG. 7 illustrates an exemplary representation of the improvement of relative error and absolute error by a multi-ray n-bundle adjustment according to the multi-temporal, multi-angle, automated target exploitation process of FIG. 5.

Geolocation absolute accuracy improves by approximately the square root of n, the number of independent measurements. This improves the absolute geolocation accuracy from 3.5 meters (2 sigma) to 1.2 meters (2 sigma), with 9 or more GeoEye-1 images. Image pixels with 0.5 meter GSD are now registered in absolute location to about 1 pixel of accuracy, 1-sigma, 0.6 meter. This is believed to be the first algorithm to obtain these levels of absolute georeference accuracy. FIG. 7 shows a non-limiting and exemplary illustration of the improvement of relative error and absolute error by the multi-ray n-bundle adjustment.

Opaque obscurants, including clouds, dust clouds, fog, and smoke, may reduce the information content of the measured signal through absorption, reflection, and scattering processes. These processes generally vary spatially across a scene for each measured resolution element or pixel. For each pixel, the total obscuration can reach a level where the information is no longer measurable. The minimum detectable measurement level is calculated as a multiple, representing different confidence levels, of the measurement noise level. The measurement describes derived properties, such as reflectance, emissivity, or temperature.

Detecting and identifying pixel measurements that provide no scene information, due to obscurants and other effects may be important. It may be desirable to exclude these pixels from further processing in the multi-step processing because the information content is not from the scene. In other words, the information content is different from the scene and a source of false positive for anomalies. These are pixels which for which detection and exclusion may be describable because they are not conveying the scene information. Failing to be detected through an existing cloud detection algorithm, these measurements may be detected and identified by the multi-temporal, multi-angle, automated target method 500 of FIG. 5 because the measurements have large errors and anomalous differences. Clouds have large height and temperature errors that may be detected in IR and projected geometry measurements in Step 2, e.g., S506, and may cause image projection anomalies detected in Step 3, e.g., S508. Separating ground clouds from snow or ice surfaces, for example, is a difficult remote sensing problem. The method 500 provides additional geometric and spectroradiometric information provided by multiple images to improve the solution of these problems.

Figure 8:
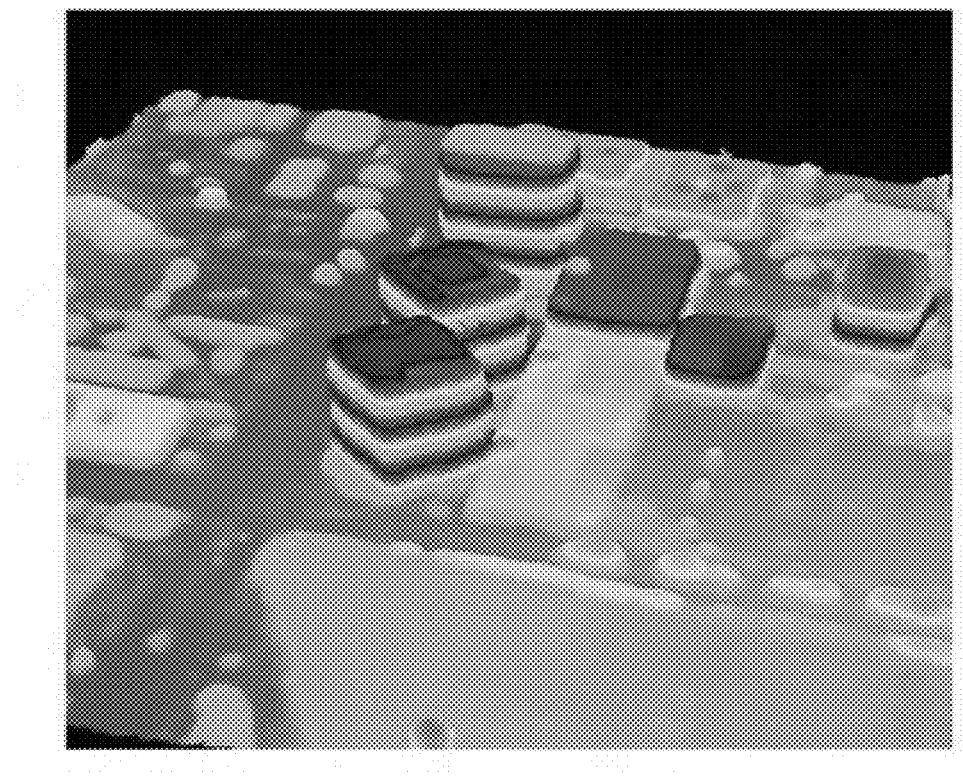
FIG. 8 is an exemplary image of a digital surface model of an urban area that was automatically extracted by the multi-temporal, multi-angle, automated target exploitation process of FIG. 5.
Figure 9:
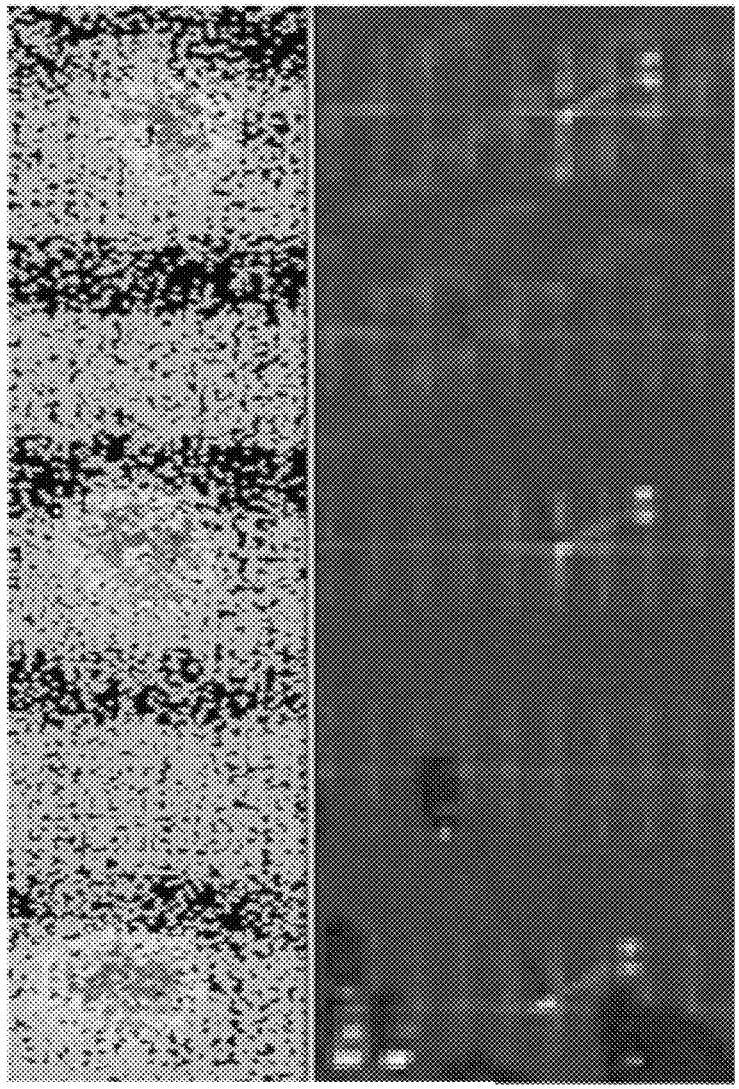
FIG. 9 is another exemplary image of a digital surface model that was automatically extracted by the multi-temporal, multi-angle, automated target exploitation process of FIG. 5, demonstrating the capability to detect sub-pixel urban features and detect aerial obstructions.

Step 2, shown at S506 of FIG. 5, automatically extracts highly accurate vertical digital terrain elevation data (DTED) for complex sites, such as cities and mountainous sites, using multiple images, such as those by GeoEye and Worldview-2, from a well-chosen range of azimuth and zenith angles, using commercial and academic software DSM extraction tools. DSMs with resolution of 1 meter and RMSE of less than 0.5 meter can be extracted from a single stereo pair. As the number of GeoEye images increases, with the proper angular diversity, the extracted DSM resolution, accuracy, and precision may improve, and may have geolocation accuracy better than 0.5 meter, one-sigma. This "georeferenced DSM base layer" is needed for subsequent processing. Exemplary images of georeferenced DSM base layers are shown by FIG. 8 and FIG. 9.

Figure 10:
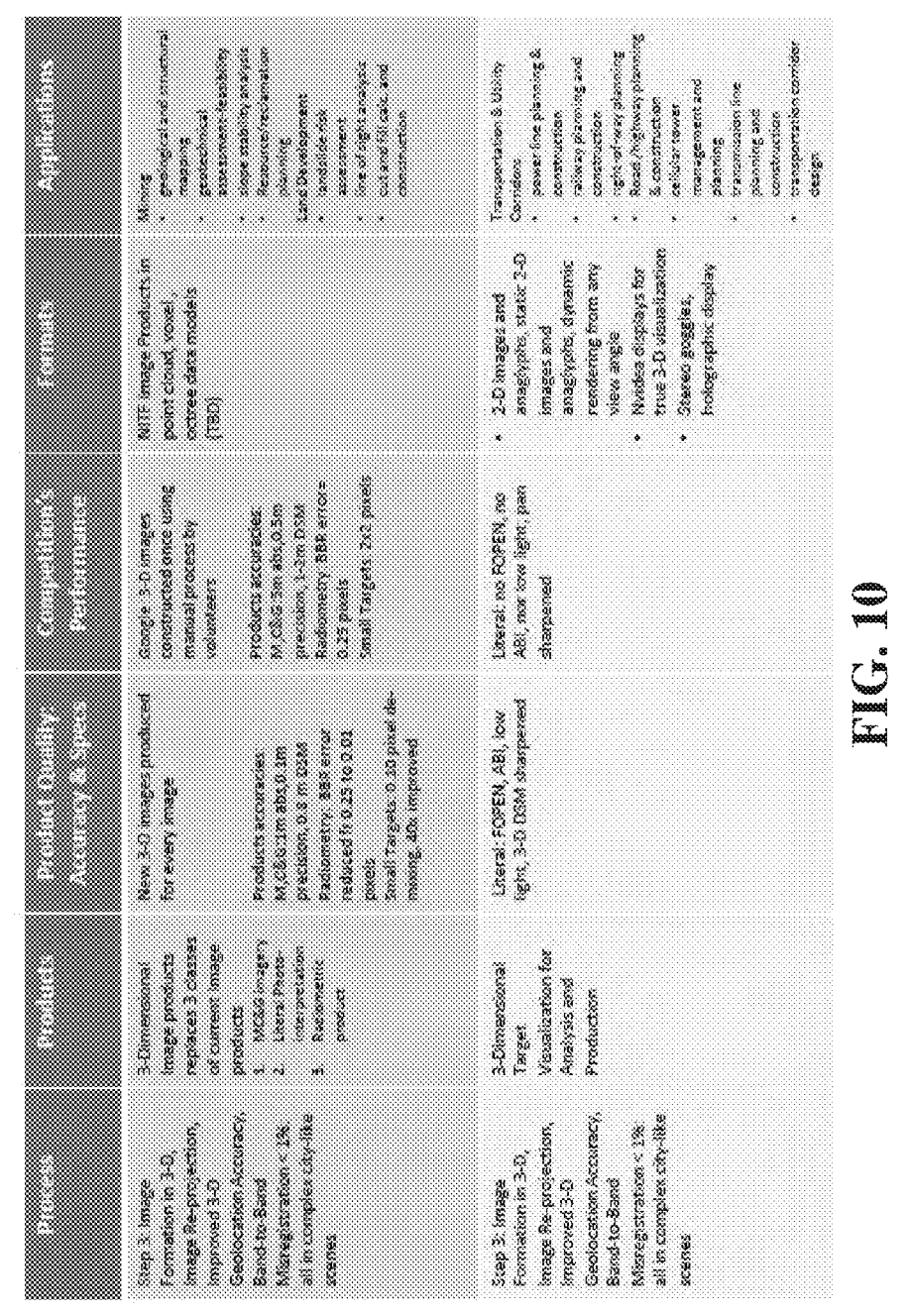

Step 3, shown at S508 of FIG. 5, provides an image formation process. In this regard, non-limiting and exemplary processes, specifications, competitor's performances, formats, and applications of Step 3, e.g., S508, are shown in FIG. 10 of the present disclosure.

Figure 11:
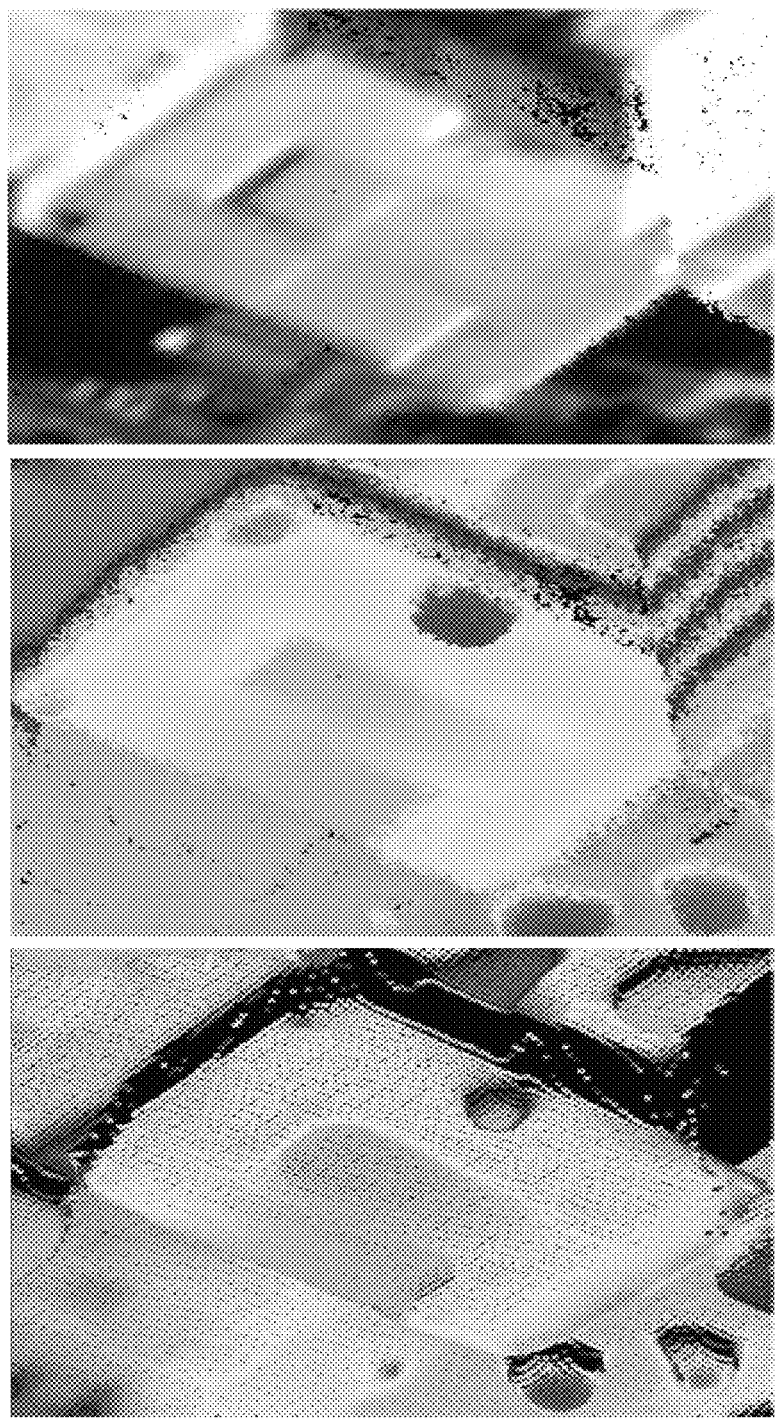
FIG. 11 is an exemplary image of three-dimensional image formation (right figure) in an urban area on a point cloud surface (middle figure), and a Digital Surface Elevation Model (left figure) generated from the point cloud, in accordance with the multi-temporal, multi-angle, automated target exploitation process of FIG. 5.

For planetary or Earth images, Step 3, e.g., S508, forms images using on the surface of the georeferenced DSM or point cloud base layer that resides on a planetary geodetic model such as WGS-84 or EGM-96, rather than forming the images on the bare WGS-84 Earth ellipsoid or more primitive geodetic model. The two dimensional original images are bundle adjusted, e.g., re-projected to improve their degree of co-registration, then are projected with the updated rigorous sensor or camera model onto the three-dimensional DSM base layer, to form 3-D images. An exemplary image of 3-D image formation on a DSM base layer is shown by FIG. 11.

Figure 12:
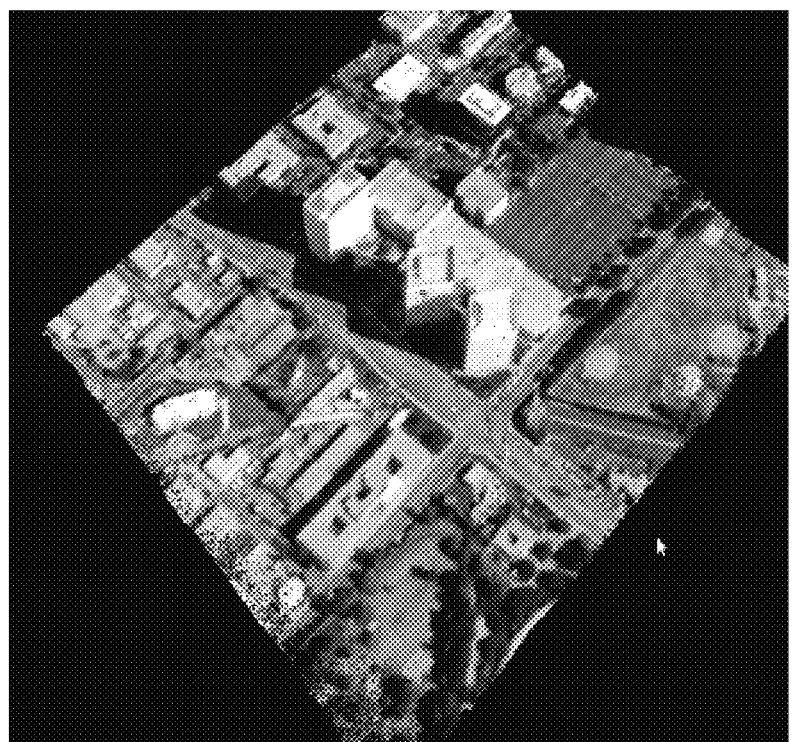
FIG. 12 is an exemplary image of a three-dimensional image formation in an urban area on a digital surface point cloud model re-projected at 60-degree elevation angle in accordance with the multi-temporal, multi-angle, automated target exploitation process of FIG. 5.
Figure 13:
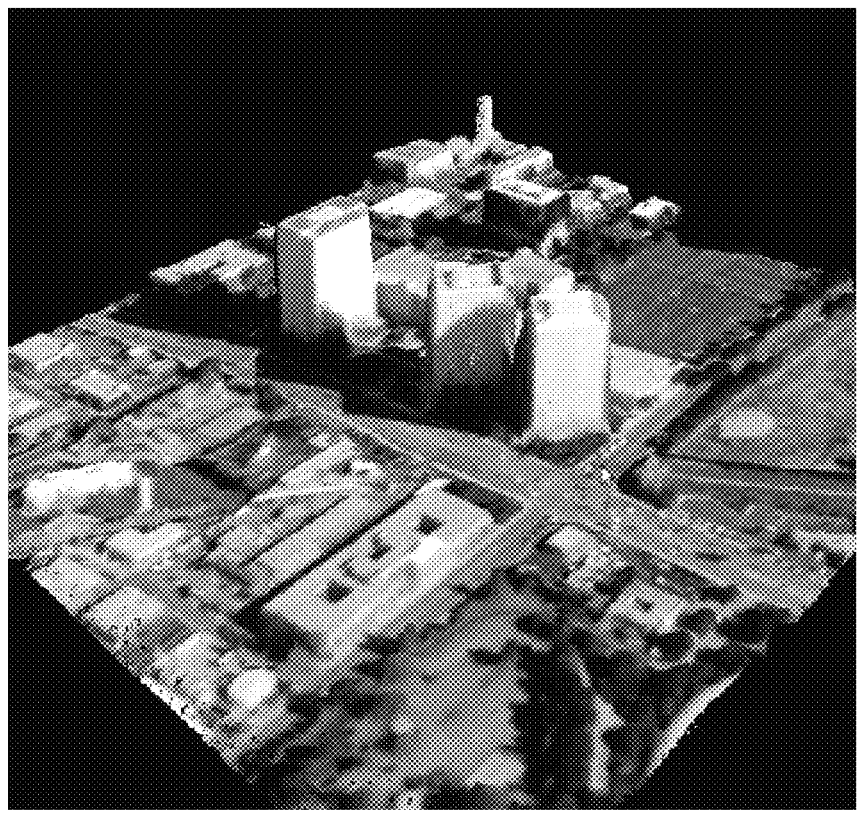
FIG. 13 is another exemplary image of a three-dimensional image formation on a digital surface model at 30-degree elevation angle in accordance in accordance with the multi-temporal, multi-angle, automated target exploitation process of FIG. 5.
Figure 14:
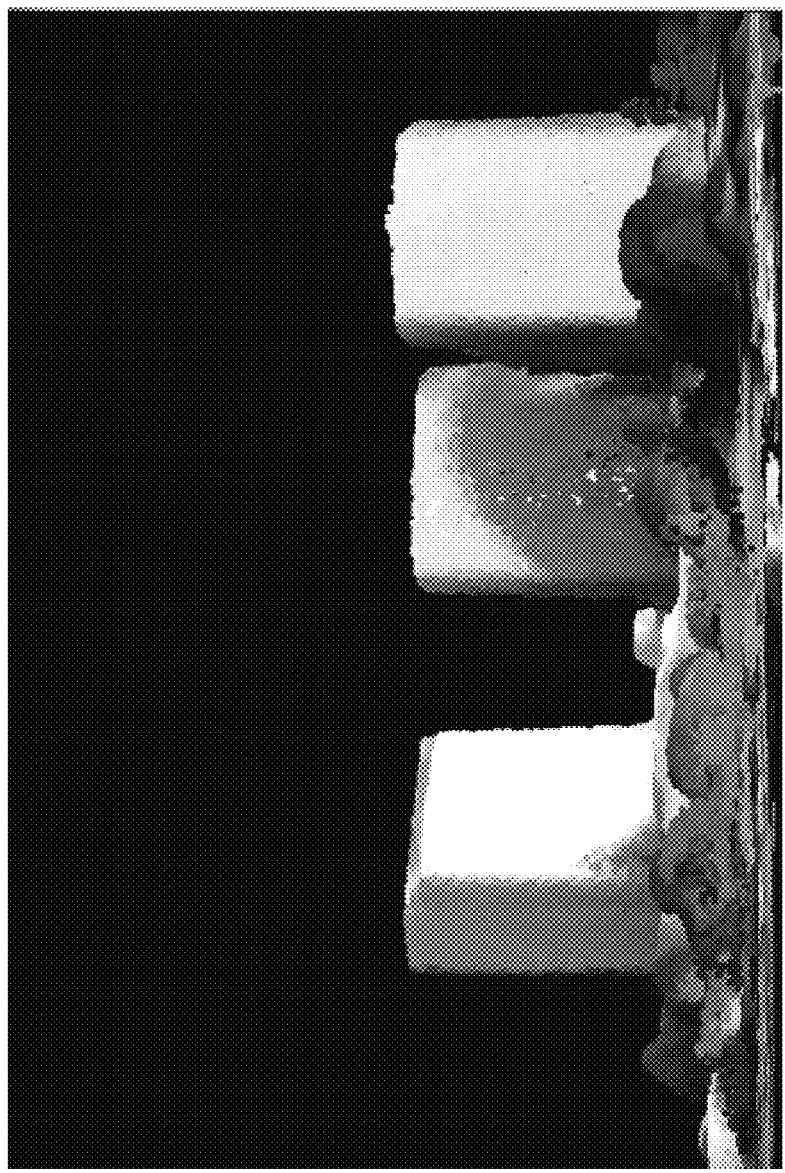
FIG. 14 is another exemplary image of a three-dimensional image formation on a digital surface model at ground elevation angle in accordance in accordance with the multi-temporal, multi-angle, automated target exploitation process of FIG. 5. This figure shows tree trunks under dense tree canopies demonstrating foliage penetration capability.

The 3-D images can be viewed from any perspective viewpoint, unlike 2-D images, and these rotations can be processed in real time by multiplication with a rotation matrix. FIG. 12, FIG. 13, and FIG. 14 show various exemplary 3-D images at different degrees of elevation. Generating 3-D images from 2-D images provides co-registration in three-dimensional geometry rather than in just one altitude plane within the image, and similarly improves georeference accuracy, improves band-to-band registration for MSI, and chip-to-chip registration for Pan at much better than 0.5 meter accuracy.

The DSM extraction can be repeated and improved on the improved synthetic array generation (SAG) product, or from chip-level data, without Synthetic Array Interpolation. This process can be iterated as images are continuously collected, refining the DSM and the geolocation accuracy of the co-registered image stack with each new image. With this processing, all images overlay, e.g., are co-registered with 0.02 to 0.1 fractional pixel accuracy at the base elevation and throughout the elevation levels in the scene, including the tops of skyscrapers, and each image may have geolocation accuracy of 0.5 meter, 0.05 to 0.1 meter intra-image accuracy, and RMSE of 0.05 to 0.1 meter, or better, as demonstrated in 2012.

A generalized image formation process for transmissive surfaces and volumes may be as follows. From the camera model the centroid of each pixel in the 2-D image maps to a ray that projects on to the point cloud, with one or more intersections on the point cloud for each ray. If the point cloud volume is transparent, or semi-transparent, then the pixel measurement may contain information from each of the surfaces and volumes intersected.

Information is currently derived and re-constructed from single pixel spectroscopy measurements for surfaces and volumes along the ray. Examples include horizontal models of atmosphere-to-surface and atmosphere-to-sea surface-to sea volume-to bottom surface. In these models where surface and volume properties are derived through radiative transfer physics, proposed first by King (1957), Chahine's "Relaxation Method" (1967), and others. For proper understanding of the radiative transfer, the reflectance and emissivity for each surface must be known or derived, and the absorption and scattering properties of each volume must be known or measured from the remote measurements. Multiple measurements improve accuracy and resolution; co-registered images with spectroscopic measurements, polarization measurements, multiple angle sampling, and multi-temporal sampling, all inferring information for the same surfaces and volumes, may improve the richness, accuracy and depth, of information to be extracted.

An image formation process for reflective surfaces and volumes, with no corrections for transmission through volumes larger than 1 pixel in size may be as follows. Three adjacent points in the point cloud form the corners of a triangular facet, which represents part of a surface. The assumption is made that the facet is planar, part of a plane. Each of these three adjacent points has coordinates on the Earth mapping system (WGS-84) in latitude, longitude, and height above ellipsoid. The facet orientation, dimensions, and area are all calculable from the Earth coordinates of the corner points, with errors and uncertainties for each corner predicted from the errors and uncertainties calculated from the point cloud derivation in Step 2, e.g., S506.

Each of the three adjacent points in the point cloud, with near-exact geodetic coordinates, that forms a triangular facet projects back to the camera's image plane at a fractional line and sample location on the image plane. The fractional line and sample are calculated using the adjusted RPC or rigorous method camera model. Thus these three corner points that form a facet on the target surface trace back to three locations in the image forming a triangular region in the image plane. The facet and the surface may generally not be parallel to the image plane.

The facet illuminates the image plane with a triangular pattern, which is spread and blurred by optical MTF and other optical errors (de-focus, wavefront error, and aberrations) over a larger area than the triangular pattern predicted by the camera model, into adjacent triangular regions of the image plane illuminated by adjacent facets, which must be added back into the triangular image region through an image MTF correction. Similarly, the adjacent facets leak radiance into the triangular image of the first facet, which must be subtracted when the adjacent facets are MTF-corrected.

Thus to first order, map the facet back to the image on the detector chips, and calculate the intensity of the facet from the triangular pattern of fractional pixel intensities, added together in radiance after all detector pixels are image-formed and spectro-radiometrically calibrated. This produces the correct spectroradiometric integrated intensity on the target facet, distributed over the correct quantity of area to correctly calculate the target radiance, and this projection is also photogrammetrically correct, meaning all intensities are mapped correctly to the target surfaces.

To second order, improve the calculated facet intensity by performing an MTF correction of the detector chip measured radiances, by integrating the convolution of pixel intensities and inverse MTF that is limited by SNR. This is basically a linear interpolation weighted by inverse MTF, which is called the noise-corrected Weiner filter. This sharpens the data, improving spatial contrast and SNR level.

This MTF correction can be improved by convolving into the MTF all of the image formation errors discussed in the next paragraph, then performing the MTF correction.

The image formation error depends on whether the imaging system is a scanning system (such a raster, linear, or whisk scanner) or a staring system. For scanning systems the triangular facet illumination pattern moves across the focal plane prescribed by the scanning motion with imperfections caused by scan errors such as jitter, oscillation, scan-rate smear, and image smear which degrades away from the scan control point in the array. Staring systems also have scan errors from deviations from expected scan motion including jitter, oscillation, scan-rate smear, and image smear, but have the additional property that image smear errors change through the integration time of the frame.

For scanning systems the triangular region moves across detector chip arrays though time, illuminating regions on one or detector more chip arrays simultaneously, but continuously moving across arrays and array edges. Each of the chips produces an independent subset of the image, though some subsets overlap. Each subset must be mapped to its facets independently, and if the overlapping image subsets are combined they should be combined at the facet, using a mean weighted by accuracy.

An image formation process for the Lambertian approximation for calculating 3-D image projections at angles rotated from the collection angle $\theta_{measured}$ to any arbitrary angle $\theta_{observation}$ may be as follows.

For rendering the appearance of the facet, with measured radiance $L_{measured}(\theta_{measured})$, at angle $\theta_{measured}$ where $\theta_{measured}$ is the difference angle measured between the facet's nadir angle (parallel to the normal vector for the facet) and the observation angle. The $\theta_{measured}$ can also be called the target zenith angle. Assume that the facet reflectance is Lambertian, e.g., isotropic, or invariant to angle of observation. A finite-sized Lambertian surface radiance may be maximum at Nadir and decrease as cos ($\theta_{Nadir}$). Rotated to Nadir, the estimated radiance may be calculated from:

$$L_{Nadir}(\theta=0)=L_{measured}(\theta_{measured})/\cos(\theta_{measured}) \quad \text{(Equation 3)}$$

When rotated to a different observation angle, $\theta_{observation}$, $$L_{observation}(\theta=observation)=[L_{measured}(\theta_{measured})*\cos(\theta_{observation})]/\cos(\theta_{measured}) \quad \text{(Equation 4)}$$

The appearance of the facet, e.g., the facet radiance, may use the measured radiance at the original collection angle, and vary as prescribed above. An alternate option is to modify the measured radiance at all angles using a substitution where the terms for each facet cos ($\theta_{observation}$) are set to unity.

An image formation process for a Non-Lambertian approximation for calculating 3-D image projections at angles rotated from the collection angle $\theta_{measured}$ to any arbitrary angle $\theta_{observation}$ may be as follows.

If the facet material is known a priori, and the BRDF for the material is known, then the measured radiance may be calculated from:

$$L_{measured}(BRDF(\theta_{measured}))=S*BRDF(\theta_{measured}) \quad \text{(Equation 5)}$$

at angle, $\theta_{measured}$, where S is the downwelling radiance incident at the target integrated over all angles. Then $$L_{measured}(BRDF(\theta_{measured}))/BRDF(\theta_{measured})= S \text{ at angle}, \theta_{measured} \quad \text{(Equation 6)}$$

Rotated to an observation angle at Nadir with respect to the facet, the calculated radiance would be:

$$L_{estimated}(BRDF(\theta_{nadir}))=S*BRDF(\theta_{nadir}) \text{ at angle}, \theta_{Nadir} \quad \text{(Equation 7)}$$

Therefore the $$L_{estimated}(BRDF(\theta_{nadir}))=L_{measured}(BRDF(\theta_{measured}))*BRDF(\theta_{nadir})/BRDF(\theta_{measured}) \text{ at angle}, \theta_{Nadir} \quad \text{(Equation 8)}$$

Generalizing this to any angle $\theta$, $$L_{estimated}(BRDF(\theta))=L_{measured}(BRDF(\theta_{measured}))*BRDF(\theta)/BRDF(\theta_{measured}) \text{ at observation angle}, \theta \quad \text{(Equation 9)}$$

The image formation process may enable detection of geometric changes, e.g., changes in the scene's surfaces and volumes, as anomalies from a single new image of the changed surface and as measured changes in two or more images of the changed scene.

If a single point on a surface or in a volume changes height position significantly, and the changed position is imaged correctly in 2-D, but is projected in 3-D onto the previous DSM surface without the changed height, the error in height may create a horizontal error in the point position. The horizontal position may be shifted in the direction of the point-to-sensor vector projected on the surface, toward the sensor for a positive increase in height, and away from the sensor for a negative increase in height. For the zenith angle $\theta_z$ at the target and absolute height error, dz, $$\tan(\theta_z)=\text{rise/run}=x/z:x=z*\tan(\theta_z) \quad \text{(Equation 10)}$$

then horizontal error, dx, $$dx=dz*\tan(\theta_z) \quad \text{(Equation 11)}$$

Conversely, a significant change in horizontal position may create a vertical position error in the 3-D formed image.

The significance of change in the point cloud surface model, or the significance of change in the reflectance properties of materials, are defined statistically as the comparisons of measured change to the uncertainty of the change measurement. The change measurement is equal to the difference between two or more images, and standard deviation is the uncertainty in the change measurement. The term change significance is defined here as the ratio of the measured difference divided by the standard deviation of the measurement uncertainty. When this ratio is greater than a threshold value, typically between two and five, the differences of point position, in this case, are significant to a particular level of confidence, such as 95% for two sigma differences, and 99.8% for three sigma differences. These definitions of significance, and change significance, are used throughout this work.

The sensitivity of a new image measurement from zenith angle $\theta_z$ to measure a differential change in the surface or volume in any arbitrary direction with respect to the local zenith $\theta_c$ and azimuth $\theta_c$ may depend on the sin $(\theta_z-\theta_c)$. For example, a single measurement from nadir is insensitive to a vertical change, but is most sensitive to a change in horizontal position. This sensitivity factor is used as a weighting factor to calculate the standard deviation of the measurement uncertainty in position in each of the separate Cartesian coordinates, which in turn is used in automatically evaluating whether a measured change represents a measurement error or an actual change in position.

For a single image measurement, the image anomalies caused by surface or volume change may be observed as anomalous projection shifts caused by incorrect positional information from the a priori derived point cloud. These projection shifts may create false surfaces that block light from facets that should be visible, and allow transmission from facets that should be obscured from that perspective. These projection effects may be maximized for observations of the formed 3-D image at projected observation zenith $\theta_{obs}$ and azimuth $\varphi_{obs}$ that are perpendicular to the direction of differential change zenith $\theta_c$ and azimuth $\varphi_c$. This condition occurs at observation angles specified by the dot product of the measurement angles and observation angles equals zero.

[zenith $\theta_{obs}$,azimuth $\varphi_{obs}$]*[zenith $\theta_c$,azimuth $\varphi_c$]=0 (Equation 12)

As two or more new images are collected, from diverse collection angles, after a position change the ability to detect and measure the position changes for each point in the point cloud in 3 Cartesian coordinates is developed.

The image formation in complex scenes requires a test for obscuration: projecting from the point cloud to the image plane, if there is an intersecting surface, Fresnel relations control the surface interactions. If the transmission is zero, the ray provides no radiance contribution to the measurement.

If an image or measurement has a pixel with smaller, finer, IFOV than the scene facet, the pixel provides better spatial resolution than the facet. For this case the image should be formed from the SCA-level pixel measurement projected onto the facet, as a variation. The SCA projection resolution is improved by correcting MTF effects, using the three dimensional surface and surface property information, and sensor information, to apply adaptive, spatially-varying MTF corrections.

Figure 15:
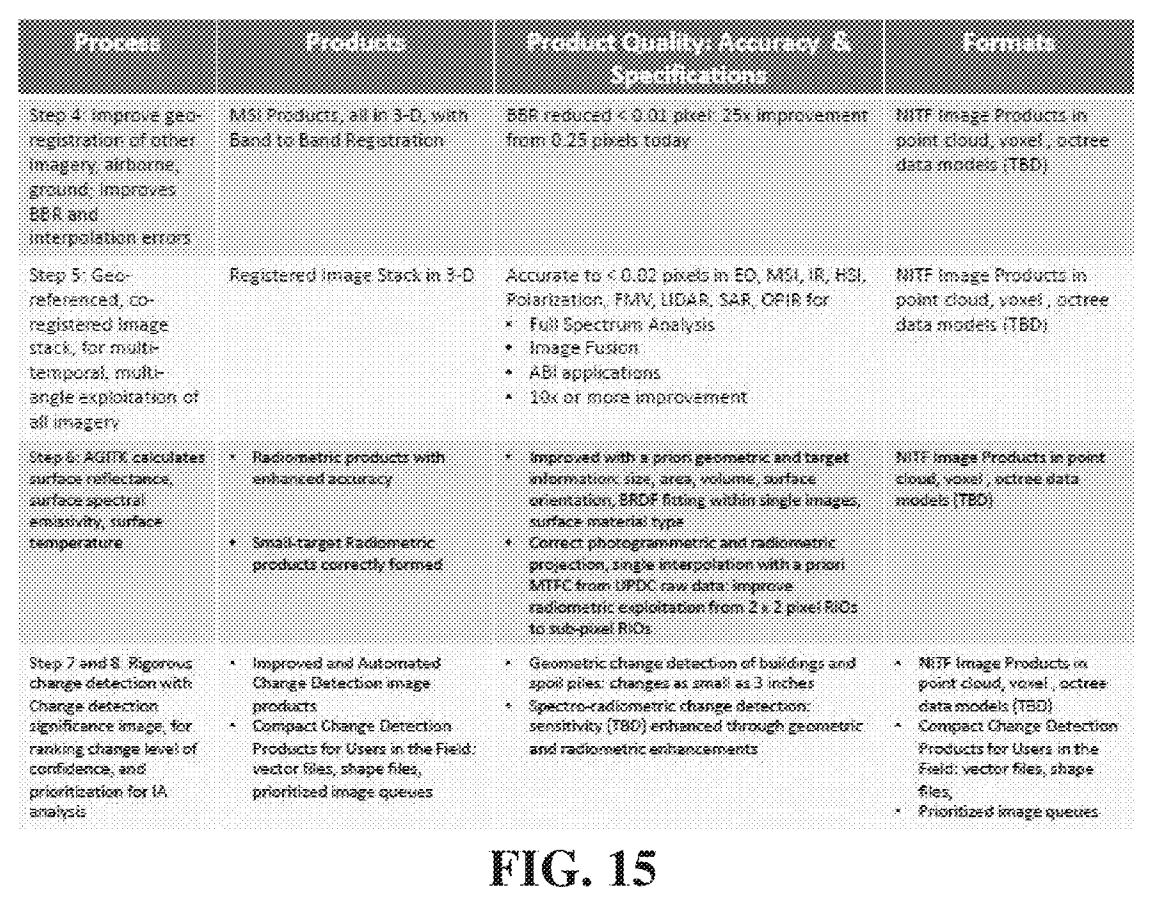
Figure 16:
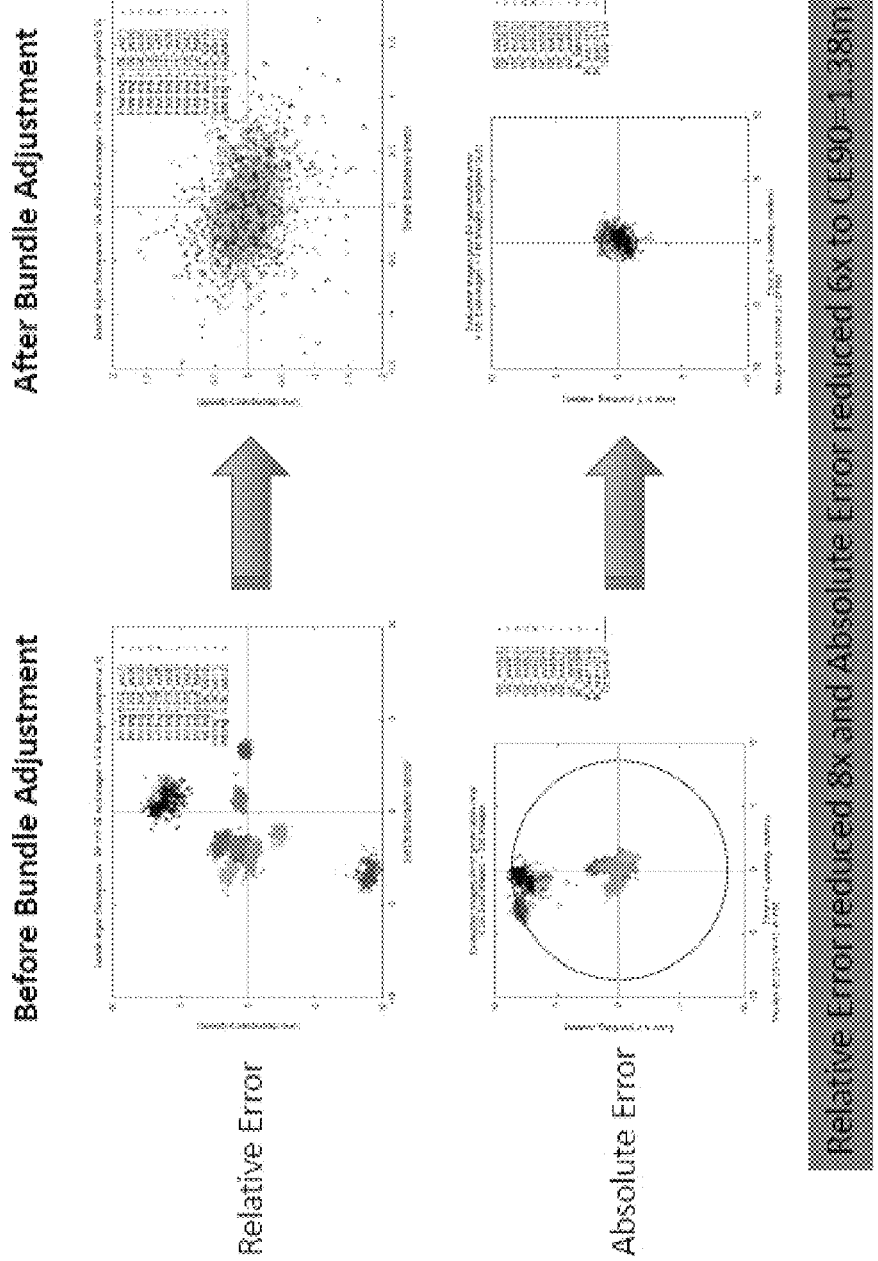
FIG. 16 illustrates an exemplary representation of the improvement of relative error and absolute error by a multi-ray n-bundle adjustment according to the multi-temporal, multi-angle, automated target exploitation process of FIG. 5. This figure provides validation that the present disclosure may improve the geometric quality of low-fidelity images to substantially the same accuracy as the georeferenced DSM base layer formed from multiple images.

Step 4, shown at S512 of FIG. 5, provides a new image 510 insertion process to improve the geo-registration of other imagery from satellites, airborne, and ground. It also improves BBR errors and interpolation errors. Non-limiting and exemplary processes, specifications, competitor's performances, formats, and applications of Step 4 are shown in FIG. 15 of the present disclosure. Moreover, FIG. 16 illustrates an exemplary representation of the improvement of relative error and absolute error by a multi-ray n-bundle adjustment according Step 4, e.g., S512, of the multi-temporal, multi-angle, automated target exploitation process of FIG. 5

The method 500 of FIG. 5 may co-register finished images 510 with poor geometric accuracy, or no geometric accuracy, to the georeferenced DSM base layer, and re-project these lower-precision images to the more accurate coordinates at each of the automatically-generated tie points in the scene at S512. These lower-precision imagery or data sources might be aircraft imagery or instrumentation, hand-held photography, digitized historical film, ground sensors, radar, or any other data associated with target areas. The re-projection can be accomplished by existing algorithms including inhomogeneous multi-order bundle adjustment in 3-D, which will be described in Step 5, shown at S514 of FIG. 5, inhomogeneous field-angle mapping, or homogeneous bundle adjustment algorithms. Leprince et al. from Caltech report that Academic and commercial software such as COSI-Corr can co-register images to accuracies of ~0.02 pixels when a priori height information for the scene is accurate to ~2 m or better. As surface height models extracted using the techniques described in Steps 1 and 2, e.g., S504 and S506, have absolute accuracy equal or better than 0.6 meter accuracy (1-sigma), the co-registration accuracy should be less than 0.01 pixels. The re-projected imagery may have an absolute georeference accuracy equal to the error of the georeferenced DSM root sum squared (RSS) with the ~0.02 pixel co-registration error, or better.

Images with lower geometric accuracy and precision may be improved by correlating to another image, a set of images, a height model such as a point cloud or DSM, or one or more 3-D images with known accuracy, in a weighted fitting. There are two cases: the first case being when the surface topography has not changed since the previous set of images; and the second case being when the surface topography has changed since the previous set of images, the a priori data.

With respect to the first case, the surface topography has not changed since the previous set of images. If the height model is assumed unchanged, than the error weighting on the a priori data can be set to zero so the a priori coordinates are not updated. As such, the lower accuracy images are field angle mapped to the a priori coordinates, improving both absolute georeference and relative accuracy in the re-mapped camera model.

With respect to the second case, the surface topography has changed since the previous set of images. In this regard, the area of the scene with surface and volume change may be identified in the image formation process of Step 3, e.g., S514. Outside the changed area, the height model is unchanged, and the first case weighting rules apply. The newer image or images are field-angle-mapped (FAM) to the a priori data outside the changed area, and the camera model re-mapping is applied over the changed area of the new image. This improves the metric accuracy of the new images in the changed area where the topography must be re-calculated using the newer data, with potentially "lower quality". Inside the changed area, where the height model has changed, the a priori data weighting can be set to zero, because to first order only the newer images have relevant spatial information. The a priori coordinates are not updated, but they represent a topography that existed in previous measurements, at previous times. The topography model can be partially extracted from the first new image, but cannot definitively measure all 3-D coordinates until two or more new images are collected, re-mapped over unchanged areas using the first case, and re-mapped over the changed area using Step 1 process, e.g., S504. Thereafter, height extract the change region using Step 2 process, e.g., S506, then re-project the images over the new changed height model in a Step 3 process, e.g., S508.

The first of one or two images are re-FAM-mapped in unchanged regions, wherein the lower accuracy images are field angle mapped to the a priori coordinates, improving both absolute georeference and relative accuracy in the re-mapped camera model.

However, to optimize geolocation by re-mapping the camera model, the sensor must have a camera model that can calculate the position on the Earth reference frame from the image coordinates. For imaging systems without image support data, or metadata, this requires a replacement camera model. The replacement camera model would be used to begin the geolocation improvement process using a best estimate of the camera position, camera pointing direction, and/or camera field angle mapping for each detector pixel.

An interactive 3-D model of the target scene would be very helpful for building these elements of the Camera Replacement Model. If georeferenced 3-D point clouds, DSMs, or 3-D images are available or can be generated for the scene, the new image can be field angle mapped or inhomogeneously bundle adjusted to the 3-D point clouds, DSMs, or 3-D models. Then the camera position and orientation can be calculated by triangulation from the imaged positions of two or more scene features. The accuracy of the calculation of camera location and orientation improves with the square root of the number of autodetected features used for the calculation. This technique can be used to locate 3-D absolute position to better than 1 meter accuracy using 3-D imagery from this application without any prior knowledge of position, as an alternative to GPS or other location methodologies fail, for example.

Step 5, shown at S514 of FIG. 5, provides a co-registering process for geo-referencing 3-D images non-homogeneously, minimizing the fitting error to the a priori or a posteriori surfaces and volumes in the scene. Step 5 further creates a 6-Dimensional hyperimage of a geo-referenced, co-registered image stack. Non-limiting and exemplary processes, specifications, competitor's performances, formats, and applications of Step 5 are shown in FIG. 15 of the present disclosure.

Every high-geometric quality image ever taken of the location, is formed into a 3-D image using the Step 3 process, e.g., S508, or a process such as Synthetic Array Generation (SAG), to the georeferenced DSM base, and stacked in the georeferenced image stack. In Step 4, e.g., S512, new images 510 or images with lower geometric accuracy and intraband geometric linearity are re-projected onto the DSM at level 5 or better, and Field-Angle Mapped to improve inherent image geometric linearity. This process transfers the geolocation attributes of the georeferenced DSM base layer to these images, so that lower quality images are geo-rectified to nearly identical accuracy as the georeferenced DSM or point cloud base. In the initial demonstration of the method 500, a point cloud with an absolute accuracy of 1.2 meters CE 90 was extracted in Steps 1 and 2, e.g., S504 and S506. In Step 4, e.g., S512, lower quality IKONOS images were bundle adjusted to the georeferenced point cloud and the geolocation accuracy improved from over 10 meters error to 1.4 m CE 90, only 17% worse than the georeferenced point cloud. This geometric calibration improves chip-to-chip registration errors, and BBR errors for multispectral systems with offset line imaging causing parallax-induced mis-registration. This provides accurate georeferenced imagery throughout the image altitude layers, in a city, for example. Now any image can be rotated, to any perspective, projected in 3-dimensions on a 3-D monitor.

At this step, the stack of co-registered georeferenced 3-D images must be registered one or more times to minimize the residuals using an inhomogeneous bundle adjustment to provide the best piecewise co-registration for each image.

Now all of the images, or any subset, chosen by attributes like time, season, time of day, angle, phenomenology (e.g., Electro-optical (EO), Multispectral Imagery (MSI), Hyperspectral Imagery (HSI), and Synthetic Aperture Radar (SAR), or radar) can be displayed in chronological order, or played rapidly in succession to show a movie of the target scene through time, and its associated changes, in the native units of the sensor, which might be expressed in units of spectral radiance, $W/m^2/sr$, or similar units. Any or all images can be rotated in azimuth or zenith angle in any way desired, shown in 3-D on monitors, in multi-hyperspectral true or false colors. Any MSI or HSI product, or any complex derived product can be shown in any layer, in transparency, with full mensuration intrinsic through the geometric properties embedded from the georeference DSM base. This co-registered, georeferenced image stack now begins to provide a multi-temporal, multi-angle image source for exploitation, but this is not the most refined product.

Radiance measured at sensor varies with sun angle, atmospheric conditions, view angle, clouds, sensor calibration, sensor polarization, instrument self-emission, and many other factors, so radiance is not the best quantity for change detection, since even two sequential images taken with one sensor in one pass may vary in every pixel, substantially, due to changes in illumination over very short time scales (due to changes in atmospheric and cloud conditions) and due to differences in the measurement angles. As a result, the next step specifies that images are corrected for atmospheric effects, so that surface and volume properties such as surface reflectivity and absorption coefficient can be calculated, which are more invariant to different imaging collection conditions and sensors, and reduce false alarms and false identifications.

The absolute geolocation accuracy, improved by using the imagery pointing information improved in Step 1a and 1b above, which resides in the detailed Camera or Sensor geometry model, is used to begin the co-registration of multiple images, and to enhance the co-registration of multiple images collected at different collection geometries, different times, and with different sensors. This technique results in absolute location within one pixel, one sigma, which is superior to other results reported in the literature for high-resolution imagery collected from space.

One important differentiation using this disclosure's method is that scenes with repetitive features with scales of larger than 1 meter or 2 imaging pixels, whichever is smaller, can now be co-registered without ambiguity, which would not be possible without absolute geolocation of ~1 pixel accuracy. This applies to scenes with high-rise buildings and rows of agricultural crops, which are nearly or absolutely identical.

In step 5 at S514 of FIG. 5, the 2-D images are co-registered together non-homogeneously, fitting each set of autocorrelated tie points from all of the images to either: an a priori knowledge, and uncertainty, of the 3-D locations along surfaces and within volumes in the target region; or, in the absence of this knowledge, e.g., the first time a set of measurements is made, the RMS minimization is made between the weighted group average and the individual image measurements for each auto-correlated tie point location.

The co-registration of multiple images, using an n-bundle adjustment of RPCs for example, may be spatially-variable across each of the images, and generally different for each measurement unless collected from identical angles. The co-registration process modifies the image pointing parameters, such as Rational Polynomial Coefficients (RPC) or Pointing using Rigorous Error Propagation with covariances, and these modifications to the image pointing are solved for and applied independently over different sections of the target area, e.g., non-homogeneously. The algorithm measures and effects change to the pointing for a set of autocorrelated tie points. The changes to pointing, in zero to second order or more, that are required for an improved "best fit" are solved through an over-determined least squares fit that minimizes the RMS of the residuals between the estimated knowledge of the tie points' locations and the locations known a priori from previous knowledge (such as earlier measurements), or locations to be determined from this set of measurements a posteriori. The a priori or a posteriori knowledge of the target scene surfaces and volumes shapes and locations represents the 3-D topography of the scene extracted from high resolution DSM extraction performed earlier, a priori, or after the fact, a posteriori, from this set of images. This requires iteration one, or more times, since at minimum the 3-D topography must be calculated.

The least squares fit applies to the minimization of geolocation difference to the a priori or determined after the fact knowledge of the surfaces and volumes of the target area: differently for different surfaces and different volumes for semi-transparent surfaces, correcting for multiple orders to correct for image biases, translations, rotations, stretches, and multi-order corrections, all non-homogenously applied through the images. This allows for medical imaging solutions to improve spatial resolution.

Step 5, e.g., S514, forms a 6-Dimensional data construct. The simple data model proposed herein, with each x, y, and z location registered to multiple image measurements, each containing its collection time, the radiance for each band, and the polarization, each a separate vector measurement. Each value has an uncertainty that is calculated by a data error model using a simplified representation of the individual measurement error sources. The grid for sampling is in the surface georeference coordinate system.

Step 6, shown at S516 of FIG. 5, provides processes for growing surfaces from facets. Non-limiting and exemplary processes, specifications, competitor's performances, formats, and applications of Step 6 are shown in FIG. 15 of the present disclosure A facet is defined by the surface connecting 3 adjacent points in the point cloud. Each point has a geometric coordinate in x, y, and z, in this case known to about 0.6 meter absolute in x, y, and z, with an uncertainty of much less than 0.2 meter, probably less than 0.1 meter, 1-sigma in x, y, and z. The geometric coordinate positions for each provide a deterministic solution for the facet position, orientation, size and area. These measurands have fairly large uncertainty at the facet level, due to random uncertainty it may be assumed. Slope error between any two corner points defining the triangular facet is approximately 0.1/0.8 meter=130 mrad, from uncertainty in z divided by the point cloud separation of 0.8 meter.

If the facet is part of a larger surface then adjacent facets, sharing an edge defined by the same two corner points from the point cloud, are parallel to each other. If the adjacent facet is truly parallel to the first facet, then the second facet's orientation, or the average of the two facets, should be parallel to the first facet within one sigma measurement error, 67% of the time, assuming a normal distribution of facet angular errors. This should be stated as a hypothesis test: the test is whether the second facet is parallel to the first facet, satisfying the parallel criterion within some threshold value. The threshold value is a multiple of the standard deviation for slope error, providing a mechanism for provisionally accepting and rejecting facets from the hypothetical surface based on statistical rejection criteria, which could vary by user choice and application. Then the algorithm should increment to the next facet over, and test whether that third facet might be part of the larger surface. One advantage of this technique is that it reduces geometric estimation errors as the surface grows larger. A surface built from 16 facets, comprising an area of just 2 square meters (at 0.5 m sampling) may have error reduced by co-averaging from perhaps 130 mrad to 130/4=32 mrad. Well-defined corners may provide adjoining surfaces with very different slope, such that a right angle corner has 1.57 rads=1570 mrad difference in orientation, and are easily detected.

If the second facet tests not parallel to the first facet, then the third facet is presumably parallel to the second, or part of a different surface, perhaps the first surface, or a hole in the surface. The number of logical possibilities is no more than 4 or 5, and all can be further hypothesis tested to refine the surface model. Most facets may be subsets of much larger surfaces, and this method offers very high precision measurements with large numbers of parallel facets.

Improving the accuracy of these measurements improves geometric accuracies, and improves radiometric accuracy by reducing BRDF uncertainty. If the measurement error is random, averaging more facets should improve accuracy by the square root of the number of facets, $1/(n)^{1/2}$ The surface reflectance, surface polarization surface spectral emissivity, and surface temperature are calculated with Lambertian and non-Lambertian Reflectance/Emissivity models. Software image processing toolkits, such as Tetracorder, ENVI, ERDAS, and others analyze multispectral, VNIR, SWIR, MWIR, LWIR, MSI, and HIS data. MSI and HSI data are measured by aircraft and spaceborne sensors, e.g. Landsat TM, ASTER, MODIS, AHVRR, and now high resolution MSI data are available from Commercial Sensors such as GeoEye-1 and WorldView-2. MSI and HSI data are used to calculate surface leaving reflectance, temperature, emissivity, or spectral complex index of refraction, surface roughness, particle size distribution, surface contaminant, soil water content, chlorophyll, leaf area index, water color, polarization, and other absolute measures of surface properties in the scene. For comparisons between images, these derived surface properties and volumetric properties such as absorption coefficient and scattering are more invariant to variations in collection conditions and sensors than entrance aperture radiance measurements, or surface leaving radiance.

Spectral reflectance and its complement in the infrared spectral emissivity (i.e., in local thermal equilibrium emissivity=1-reflectance according to Kirchhoff's Law, Korb et al. 1997), as well as polarized spectral reflectance and polarized spectral emissivity deserve particular attention for VNIR-SWIR, MWIR-LWIR broadband, MSI, and HSI and spectropolarimetric measurement and analysis. All materials have spectral reflectance and emissivity properties, which provide information about the surface or volumetric material composition, compositional mixing ratio, isotope ratios, density, temperature, homogeneity, surface roughness, contaminants, and other properties. These types of measurements have identified the composition of planets, stars, and galaxies, nucleosynthetic processes and products within stars in different life stages particularly supernovae, and the age and temperature of the universe itself. These measurements of surface and volume properties are complicated by variations in measurements with the angular position of light sources and the measurement angles with respect to the targets, atmospheric properties, and sensor characteristics, including sensor self-emission and sensor polarization/depolarization. Within an image or measurement, each sensor detector measures the intensity of light reflected and emitted into a small range of incoming angles. At each target surface or volume element, light may be incident from all $2\pi$ or $4\pi$, respectively, steradians of solid angle, and the distribution of light over solid angle may be homogeneous and isotropic (but not usually), or may have a large point source contribution from the Sun, or another point source for an active remote sensing measurement, like radar or an x-ray medical measurement, with or without smaller, continuously varying contributions from the rest of the solid angle. Reflectance is modeled as Lambertian for simplicity, or non-Lambertian. Lambertian reflectance varies only as the zenith angle cosine of the incoming sunlight, and the zenith angle cosine of the outgoing ray to the sensor. However, the Lambertian approximation has been found by Wald et al (1994) to be approximately correct only under special circumstances, typically in remote sensing for measurements collected within 20°-25° from the surface normal with high sun angles, and Lambertian corrections for surface topography are not adequate to explain remote sensing measurements. Therefore, to retrieve accurate measurements of surface and atmospheric properties, reflectance and emissivity should be calculated as non-Lambertian properties. Non-Lambertian reflectance and emissivity modeling typically use empirical measurements of bi-directional Reflectance distribution function (BRDF) collected in the laboratory over a range of source and measurement angles. However, to identify a material using a BRDF library of measurements requires measurements of the unknown material from 2 or more different source or sensor angles, which is not possible from a single image if all of the surface orientations have to be assumed to be identically horizontal. The method 500 does not require the simplifying assumption that surfaces are all identically horizontal, since the method 500 measures all of the surface orientations in Step 2, e.g., S506, and fits surface and volume facets to larger surface and material properties in Step 6, e.g., S516. The method 500 takes advantage of the serendipitous fortune that the multiple angles of our many collections provide the complex measurements for de-tangling the complexities of the angular effects, providing a physical solution to a problem not solvable with any single collection measurement.

The information products from Step 6, e.g., S516, derive geometric, surface, and volume properties from the many scene images, which are all georeferenced to the georeferenced DSM base, which includes physical dimensions, areas, volumes, line drawings, thickness of layers, thermal inertia, thermal conductivity, electrical conductivity, angles of facets, morphology properties including surface roughness, particle size distribution, and shape. Every new image, in any spectral region or phenomenology, with any geometric quality level, may be used to improve the quality of the DSM, improve the derived quantities, add new derived quantities, and add another temporal measurement of the target. All of the images, the DSM, the MSI, the HSI layers of the target, and every product derived from these images may become an attribute of the target, and the recording of all of these georeferenced measurements and derived information is now a 6-dimensional, or more, digital model of the target itself. The method 500 integrates six measured dimensions, including 3 spatial dimensions, time, spectral wavelength, and spectral polarizations. This 6-D data construct might well be called a hypercube dataset, or a hyperimage.

The target scenes, or an entire planet, or a human medical subject, possess a temporal basis, e.g., changes through time, with movement, contamination, rain, snow, seasonal change, modifications, people, and machines. With the rigid registration of 6 or more dimensions of measurement, rigorous temporal analysis is enabled for individual regions of interest, or individual pixels, with analysis via Fourier analysis to calculate patterns and periodicities, as an example of new analytical processes. Three spatial dimensions, time as fourth dimension, spectral wavelength, polarization, all may be measured, compared, diced and sliced, transformed using standard mathematical tools for multi-dimensional vector sets, including but not limited the methods of multi-variable vector calculus and linear algebra, Eigenvector decomposition, series and functional analysis. In every field of physics where vector sets are created, multi-variable mathematical tools, such as scalar multiplication, vector dot products, vector cross products, gradients, divergences, derivatives, and integrals have specific meaning and utility. All of these multivariable tools and others may find meaning in remote sensing analysis now that these tightly registered vectorized image products can be built using the present disclosure. For example, in current remote sensing principle components analysis, minimum noise transforms are spectral decomposition tools, but these tools can be applied to the other dimensionalities, 3-D geometry, time, and polarization, and their cross products, within this digital target construct, along with other complex transforms, process modeling, problem-centered analyses, and new forms of detailed analyses that have not been explored yet.

To view these information sets, users may employ 3-D television monitors, stereo vision goggles, and virtual reality rooms, using rapidly rotating images, moving holographic projections, and other technologies, to explore and interact with the rich information about these scenes. At the very least, the users may need the ability to view the data sets in true 3-D, with stereo convergence angle varying both automatically based on perspective, and manually controlled, with the ability to view from any perspective, at any level of magnification, with contrast adjustment, dynamic range adjustment, display of any recorded spectral region in any number of display colors, using band math, using logic commands, or in other words all of the capabilities of today's image processing suites and new mathematical analysis tools as a starting place for multi-image processing and information extraction.

For users with extensive libraries for particular scenes, the disclosure should be used to explore the existing data holdings to georeference and co-register all images, extract 3-D topography, re-project in 3-D, construct the 6-D hypercube datasets, and begin extracting new information from old imagery. The value of old imagery is greatly enhanced using this disclosure, because the old imagery explores the target properties during past time no longer available for sampling, and builds the temporal record needed for temporal pattern analysis. So, old data should be digitized, and metadata on accuracies and error sources provided to support data excavation for these valuable scenes. Imagery data for Earth is available from 1959 and later from the U.S. spy satellite programs that have been declassified, such as the Corona satellites.

Step 6, shown at S516 of FIG. 5, also provides processes for identifying materials in surface facets. Surface facets, defined by three contiguous points in the point cloud, have a defined position for each point, or corner, which determines the facet slope with respect to the local horizontal, and the facet orientation in azimuth angle. The angular errors on the facet orientation provide a source of error for the facet reflectivity and emissivity, because the facet reflectivity and emissivity vary with angle. Facet reflectivity and emissivity are related by: directional emissivity=1-directional hemispherical reflectance from Kirchhoff's Law.

Surface reflectivity and emissivity may vary with facet angle, according to both accepted surface reflectance theories. The simplest reflectivity model is the Lambertian assumption, which prescribes that the reflectivity may vary as the cosine of the target zenith angle. The more generalized reflectance theory allows a generalized BRDF for the surface where the variation in reflectivity/emissivity is measured, or predicted through a reflectance theory such as the Hapke model based on index of refraction and surface roughness properties. In the BRDF model the reflectivity usually varies by at least the cosine of the target zenith angle as well.

For either Lambertian or BRDF representations, the facet model established by the method 500 through the extraction of point clouds in Step 2, e.g., S506, provides a method for identifying surface materials in each facet with much greater accuracy than the current state of the art for multiple reasons. First, facet orientations measured using the method 500 are determined with good accuracy, about 130 mrad or less, at present, as discussed earlier. The state of the art for identifying materials from reflectivity and emissivity measurements assumes that all of the surfaces in each scene are horizontal, because surface orientations are not derived, and no accurate source of this information exists for most planetary scenes. The angular accuracy of the facets, determined previously to be +/−0.130 radians, or less, limits the error of reflectivity uncertainty due to angular uncertainty, by reducing the angular uncertainty from 1.57 radians ($\pi/2$) for horizontal models to +/−0.130 radians for facets. The corresponding fractional error is reduced from Horizontal model reflectivity error=[Reflectivity($\pi$/2)−reflectivity(0)]/[Reflectivity($\pi$/2)+reflectivity(0)]/2=100% error,assuming reflectivities may be evaluated using the Lambertian model (Equation 13)

to facet model reflectivity error=[Reflectivity($\theta_z$+0.130radian)−reflectivity($\theta_z$−0.130radian)]/[Reflectivity($\theta_z$+0.130radian)+reflectivity($\theta_z$−0.130radian)]/2 (Equation 14)

This fractional error can be calculated for any material if the directional reflectivities, BRDF, are known.

For the Lambertian case, the fractional error is:

fractional model reflectivity error=Reflectivity*cos($\theta_z$+0.130 radian)−reflectivity*cos ($\theta_z$−0.130 radian)/[Reflectivity*cos($\theta_z$+0.130 radian)+reflectivity*cos ($\theta_z$−0.130 radian)]/2 (Equation 15)

The reflectivity cancels out, leaving fractional error=[cos($\theta_z$+0.130 radian)−cos($\theta_z$−0.130 radian)]/[cos($\theta_z$+0.130 radian)+cos($\theta_z$−0.130 radian)]/2 (Equation 16)

fractional error($\theta_z$=0°)=0,at zenith angle=0° (Equation 17)

and fractional error($\theta_z$=90°)=13%,at zenith angle=90° (Equation 18)

This analysis for the Lambertian reflectance model case shows that this disclosure's validated facet surface orientation knowledge error of ~0.13 milli-radians generates a maximum fractional reflectivity error of 13%, at nadir incidence angles, whereas the fractional reflectivity error using the current state of the art, without facet surface orientation knowledge (corresponding to +/−90° uncertainty in surface orientation) is 100% error. For the more realistic case using the BRDF reflectance model, the angular uncertainty in the prior art may generate reflectivity errors that are much larger than 100%. Obviously, the patent methods improve geometric accuracies that help improve radiometric accuracies to levels previously unattainable.

The previous steps of the method 500 allow co-registration of multiple measurements from n multiple images, and from multiple, s, sensors with additional spectral and polarimetric information. Material Identification is improved by using multiple, n, images because the uncertainty of the average is reduced by $1/(n)^{1/2}$. The improvement of identification from multiple, s, collections with orthogonal spectral and polarimetric information is an additional factor of Material ID improvement that can improve performance faster than 1/s, through rejection of false ID matches.

Using a facet model provides many different angular samplings for the surface materials in the scene, assuming that the number of facets is much larger than the number of surface materials in the scene. This allows the use of a single image to sample the BRDF or reflectivity at many different angles, to increase the number of measurements in excess of the number of unknowns. This changes an under-determined problem to an over-determined problem. In the horizontal model of surface orientations, multiple images are required to sample the target surfaces from multiple angles.

For facets with either Lambertian or BRDF-dependent reflectances, this facet model suggests a simple hypothesis test, that the adjacent facets are made of the same material as the facet under test. If the measured BRDF of the adjacent facet is similar, within threshold, of the measured BRDF of the facet under test, then the adjacent facet is measured to be the same material. The threshold difference in measured reflectivity is the difference in reflectivity calculated from the difference in facet orientations, multiplied by a significance multiplier, representing statistical confidence desired in the test, e.g. 1, 2, or 3 for 67%, 95%, and 99.8% confidence levels in the test.

As adjacent facets are tested and determined to be of the same material, the accuracy of the Material ID process should increase, because the measurements are independently sampling different facets and different BRDF angles, each providing a similar piece of information. The improvement scales with the number m of similar facets measured, as $1/(m)^{1/2}$, or faster.

The 3-dimensional geometric knowledge, and the Sun angle for reflective measurements, for each image allow predictive knowledge of shadows, and shadow depth, in each 3-D image for each pixel of imagery. Shadows and different depths change the spectral radiances of the downwelling radiance (DWR) at any target surface. Downwelling radiances are also greatly affected by 4 or more types of adjacency effects from the local background around each target surface. Adjacency effects can be modeled when each surface or facet in the neighboring area has a known geometry, predicted surface type and predicted reflectivity/emissivity, and the atmospheric DWR is known or calculated. This knowledge greatly reduces the errors and uncertainties of the predicted total downwelling radiance, and its 3-D distribution, at each target surface.

Step 7, shown at S518 of FIG. 5, provides for rigorous change detection as follows. Non-limiting and exemplary processes, specifications, competitor's performances, formats, and applications of Step 7 are shown in FIG. 15 of the present disclosure.

Image processing tools currently have the capability to read metadata from image libraries, to know the approximate location of images, and their attributes. Adding the capabilities from this disclosure into these image processing tools, images may be formed onto the rigorous georeferenced DSM at DSM-level 5, 6, 7 resolution as available. On these true 3-D images, the image processing tools may calculate surface and volume properties including reflectance, emissivity, temperature, and other derived quantities like leaf area index, water color, or plankton quantity, and perform rigorous change detection, comparing each new image to any baseline image from any image ever taken, at any resolution, because the original data must remain to exploit, to limit the number of interpolations that reduce accuracy. Each image can be re-projected to other angles, re-sampled to change its resolution spatially, or re-sampled spectrally to reduce dimensionality, or model to a reflectance/emissivity from other sensors with different spectral response, or resolution.

The method 500 compares the information in the current, or test, image to the information in previous images representing the reference baseline. The method 500 computes the change in each pixel from the difference or normalized difference between identical areas in the test image and the reference set. The normalized difference reduces the error of the change detection measurement by eliminating additive terms by subtraction and eliminating multiplicative errors by division, and this improves results to the extent that these errors are identical for both images. This is an important and simple technique for reducing error in any analysis comparing one measurement to another, such comparisons of BRDF observed for the same material from different angles, where both measurements have common bias and multiplicative factors.

Step 8, shown at S520 of FIG. 5, provides for change detection significance, for ranking a change level of confidence and prioritization for impact analysis (IA). Non-limiting and exemplary processes, specifications, competitor's performances, formats, and applications of Step 8 are shown in FIG. 15 of the present disclosure.

The complex multi-dimensional digital measurements are real and complex numbers with spatial and temporal attributes, all co-registered spatially, geo-referenced, time tagged, and eventually metadata rich. The data must be recorded in standardized, interoperable data structures that are transparent to the data system, and must be in NIST or ISO formats that are easily generated and interpreted, with numerically lossless compression, and full dynamic range that provides quantization of noise and peak signal levels to retain all target property information for later processing. Current sensor systems record imagery and scientific data at radiometric resolutions of 8 bits or less up to 16 or more bits, but we recommend 16 bit resolution as a minimum, with 24 or 32, or more, bit resolution of any data, with SNR designed to satisfy at least the problems of interest within some number of contiguous pixels defining minimum target sizes desired, which ultimately are 1×1, then sub-pixel. Non-uniformity error must be properly controlled to co-add signal and noise temporally and spatially with proper advantage.

These data may be vectors, which then lend themselves to mathematical and logical processes. Change can be measured by subtracting one image from another, or by subtracting an image product derived from one set from another image product derived from a different set. Change can be normalized, by dividing by the average of the two measurements, to compute the fractional change. Of course the disclosure enables the use of more complex math for analysis of the image sets, due to the accuracy of the coregistration, including for example vector dot products, vector gradient, complex vector curl products, vector divergence, and time derivatives of first and second order may have some meaning and utility.

All of this processing involves error, and error may have to be tracked, and tracked throughout as random and systematic errors, at the very least. Crudely, total change error may be the RSS of spatial co-registration error, spectral error, radiometric error, temporal error, and this error may be calculated for significance.

Total uncertainty, $\sigma$=Root sum squared(spatial co-registration error,spectral error,radiometric error, temporal error)    (Equation 19)

$\sigma = [(\text{spatial co-registration error})^2 + (\text{spectral error})^2 + (\text{radiometric error})^2 + (\text{temporal error})^2]^{1/2}$    (Equation 20)

Change $\Delta$ can then be ratioed to local averages of calculated and measured total uncertainty and noise $\sigma$, where the ratio $\Delta/\sigma$ for each pixel generates an significance image that represents the degree of change from image to image, for every pixel, in comparison to our ability to measure that change. This ratio is called a significance image, and represents an approximate statistical measure of confidence. For example, a 1 sigma change would be caused by real change 68% of the time, and by natural variation 32%. A 2 sigma change is real 95% of the time, but false 5% of the time, and similarly for a three sigma measurement 997/1000 detections of change are real, while only 3/1000 are false positives. This significance image could be colorized, or thresholded to extract and transmit only individual pixels and clusters of pixels with change beyond some desired level of significance. This significance measure forms the basis for a compression technique where only the most valuable data, as measured by its significance ratio $\Delta/\sigma$, is saved or transmitted. Other more sophisticated statistical analyses of these datasets are also now possible.

A simple technique for understanding the uncertainty in the change measurements is enabled by the high degree of coregistration possible using these multiple steps. The variability of each region, or each facet, can be analyzed through sequential measurements over time. If the measurements are used to derive a time invariant surface property, such as directional reflectance or emissivity or index of refraction, then the measurement variability is a combination of the multiple error sources. Multiple error sources force the distribution of the combinatorial error to become more Gaussian than the error sources. For samples that follow the Gaussian distribution, the peak-to-peak variation of the derived quantity is very accurately measuring the uncertainty distribution for the measurement, which varies over roughly +/−2 standard deviations. Thus the standard deviation is ¼ the peak-to-peak variation. This provides a simple estimation method for estimating the uncertainty for each region or surface or facet in each scene, and these simple uncertainty estimates are compared to the error propagation estimate of combined uncertainty.

The method 500 evaluates the importance or significance of the change based on an automated statistical test, and parses image regions with the most significant changes from the newest images. The satellite only needs to send the most important information, which is evaluated using the ratio, $\Delta/\sigma$. If the satellite needs a greater or lesser degree of compression, the statistical significance criterion can be tightened or loosened to match the needed degree of compression. For example, if the compression factor desired is 370:1, the change detection significance ratio, $\Delta/\sigma$ is set to 3, representing pixels with 3-fold more change than the uncertainty value $\sigma$, and a 0.997 probability that the change measured is real, which separates a fraction 0.0027 of the imagery pixels, creating a compression ratio of 570:1. Similarly, a threshold value of Δ/σ=2 corresponds to a 0.954 probability that the measured change is real, which separates a fraction 0.046 of the imagery pixels, creating a compression ratio of 22:1.

A lossless image compression can still be applied to the Significance Image result of Step 8, e.g., S520, with some benefit to compression because the techniques are orthogonal.

Step 9, shown at S522 of FIG. 5, improves spatial resolution 2-fold to 3-fold (+1 to +1.58 NIIRS improvement), or more by Super-resolution processing of multiple images.

A review of the scientific literature reveals that multiple images at lower resolution can be combined through a mathematically closed-form process to both improve the coregistration of the images, and to develop a higher resolution image of the target. Super-resolution to improve resolution using multiple images, and improving the quality of a single image are research topics at math and electrical engineering departments at many distinguished universities. Individual images sample the target discretely with a digital comb filter. Multiple images provide different detector phasing on the target, which represent an over-sampling of the target with respect to the original resolution of each image, and the over-sampling varies randomly. With a large number of images, oversampling provides a nearly continuous sampling. This can be used to improve spatial or spectral resolution in a process similar to the multiple sampling used in scanning near-field microscopy, which has achieved spatial resolution results from multiple images at least 10-fold finer than the diffraction-limited resolution for a single image limited by aperture size. In the simplest implementation of super-resolution processing a higher-resolution sampling grid is defined, and each of the pixel measurements for every image contributes to the sampling gridpoint closest to its geometric center, using a nearest neighbor interpolation, producing an image with resolution corresponding to the higher sampling grid, if there are enough measurements.

Create a super-resolution grid, for n images the spatial sampling factor<$n^{1/2}$. Map the pixel values, without changing value, to the nearest sampling gridpoint, e.g., nearest-neighbor sampling. Individual measurements for each gridpoint have an x, y, z, spatial coordinate, a time, radiance band values, and polarization band values. These values can be co-averaged for SNR improvement, or analyzed as vector data. With an extremely large number of images, there are multiple copies of each sample phasing, and images can be used to improve both spatial resolution and SNR simultaneously.

This idea of over-sampling broad sampling windows can be extended spectrally, to use lower spectral resolution sampling to provide higher spectral resolution.

From a review of the super-resolution literature, it became obvious that the high degree of co-registration accuracy, and the improvements to geometric accuracy and linearity of the post Field-angle-mapped 3-D images, achieved as a result of Steps 1, 2, 3, 4 and Step 5, lend themselves to super-resolution processing. Extraction of DSM and processing of unprocessed uninterpolated SCA-level data may be necessary to achieve sufficient co-registration to enable super-resolution, but will improve results for DSM extraction and image co-registration.

Improving spatial co-registration is part of many of these routines, because many of the simplest techniques simply represent extracting data from over-sampling spatially onto a higher resolution grid spacing, using nearest neighbor or other simple sampling techniques.

Step 10, shown at S524 of FIG. 5, provides for compression of imagery using change detection significance as set forth below.

New satellite systems may require more communication capacity between satellites and the ground processing system, and require more throughput capacity for processing imagery and measurements in the ground processing system. The satellite design methods of the herein referenced patent documents to Korb et al. can provide higher communication capacity by using imaging satellites in full constellations as a relay communications system. In an embodiment of the multi-temporal, multi-angle, automated target exploitation method 500, the method 500 may be for use with an onboard spacecraft data processing system to reduce the communication rate between satellites and ground, by compressing the image data onboard the spacecraft.

The method 500 may also be used as a generalized image and data compression method, where the compression ratio is variable and controlled with a statistical criterion Δ/σ over a range of 3 to over a million. Rather than compressing the data by comparing change within one image, the present application compresses the data by comparing the change in the current image from the previous image or a set of images. Rather than providing the change in the current image from the previous image or a set of images for every pixel in the image, the present application detects and prioritizes the changed pixels in the current image that are different from the previous image set, e.g., detects and selects pixels in the current image that are different by more than some threshold difference, as described in the significance image result of Step 8, e.g., S520. Rather than compare the radiance values in different images for change comparison, the change image and change significance images are calculated with derived target properties, such as surface reflectivity or absorption coefficient, such that the result is more invariant to variability in solar irradiance, atmospheric properties, weather, diurnal or annual cycle effects.

Data rate is reduced by transmitting information only from pixels that have changed significantly, and by not transmitting information from pixels that have not changed significantly. The significance of the change is evaluated with an automated statistical test of the ratio of the change difference Δ to the uncertainty σ in change measurements, Δ/σ. The change significance Δ/σ measured for each pixel produces the change significance image in Step 8, e.g., S520. The compression is applied by detecting and selecting only the pixels with measurement values x where the absolute difference Δ from the reference average μ, where Δ=x−μ, is larger than a threshold multiple α of the standard deviation σ.

$$\Delta = x - \mu \geq \alpha^* \sigma \qquad \text{(Equation 21)}$$

or $$(x-\mu)/\sigma \geq \alpha \qquad \text{(Equation 22)}$$

$$\Delta/\sigma \geq \alpha \qquad \text{(Equation 23)}$$

The threshold value α is a variable that can be used to control or evaluate the statistical certainty or probability that the change is real and not caused by random variability. This probability is calculated by the complement of the P value, 1−P, giving the probability that the change was not caused by random variability. The probability P for the value x is $$P(x) = \exp[-(x-\mu)^2/2\sigma^2]/\sigma(2\pi)^{1/2} \qquad \text{(Equation 24)}$$

And thus for the threshold value α where x−µ≥α*σ, the probability that the change is real is $$1-P(\alpha: (x-\mu) \geq \alpha\sigma) \geq 1-\exp[-(\alpha\sigma)^2/2\sigma^2]/\sigma(2\pi)^{1/2} \quad \text{(Equation 25)}$$

$$\geq 1-\exp[-\alpha^2/2]/\sigma(2\pi)^{1/2} \quad \text{(Equation 26)}$$

For α values of 1, 2, and 3 for example these probability values are 0.683, 0.954, and 0.9973, respectively, from the Table 1 below.

The satellite, or the compression method itself, only needs to send the most important information, which is evaluated using the ratio, Δ/σ. When Δ/σ>α the change Δ is greater than the threshold criterion α*σ, and the pixel data should be saved in a compression application, or saved and transmitted in a compressive sensing application. If the satellite needs a greater or lesser degree of compression, the statistical significance criterion α*σ can be tightened by increasing the significance value α, or loosened by decreasing the significance value α, to match the needed degree of compression. The degree of compression is the compression ratio cr, which is the total number of pixels divided by the number of sent pixels, which is 1/fraction of pixels sent.

$$cr=1/\text{fraction of pixels sent} \quad \text{(Equation 27)}$$

$$cr=1/\exp[-(x-\mu)^2/2\sigma^2]/\sigma(2\pi)^{1/2} \quad \text{(Equation 28)}$$

$$cr=1/\{\exp[-\alpha^2/2]/\sigma(2\pi)^{1/2}\} \quad \text{(Equation 29)}$$

$$cr=\exp(\alpha^2/2)*\sigma(2\pi)^{1/2} \quad \text{(Equation 30)}$$

For an imaging sensor with a pushroom imaging configuration using a single array in the cross track direction, with m channels in the cross scan direction and n TDI elements recorded separately in each channel in the along-scan direction, the uncompressed data rate $$dr=\{(lr \text{ line rate})*(m \text{ channels})*(b \text{ bits per pixel})*(s \text{ oversample factor per line})*(n \text{ TDI,if recorded separately})*(1 \text{ spectral bands per pixel})\}/\{(A_y \text{ Aggregation factor in along-scan})*(A_x \text{ Aggregation factor in cross-scan})\} \quad \text{(Equation 31)}$$

$$dr=(lr*m*b*s*n*1)/(A_y*A_x) \quad \text{(Equation 32)}$$

For the pushroom imaging sensor, the integration time t is controlled with the line rate lr, $$t=1/lr, \text{ or} \quad \text{(Equation 33)}$$

$$lr=1/t \quad \text{(Equation 34)}$$

The data rate increases with k additional arrays in the sensor as $$dr=\Sigma_k dr_k=k*dr_k \text{ if all the arrays have equal size} \quad \text{(Equation 35)}$$

then total uncompressed data rate $$dr=(k*m*b*s*n*1)/(A_y*A_x*t) \quad \text{(Equation 36)}$$

For an imaging sensor with k staring arrays, each with n×m pixel elements with n rows in the along-scan direction, m columns in the cross scan direction, and frame rate fr, the total uncompressed data rate is:

$$dr=\{(k*n*m \text{ pixels})*(fr \text{ frame rate})*(b \text{ bits per pixel})*(s \text{ over-sample factor per frame integration})*(1 \text{ spectral bands per pixel})\}/\{(A_y \text{ Aggregation factor in along-scan})*(A_x \text{ Aggregation factor in cross-scan})\} \quad \text{(Equation 37)}$$

$$dr=(k*n*m*fr*b*s*1)/(A_y*A_x) \quad \text{(Equation 38)}$$

For the staring array imaging sensor, the integration time t is controlled with the frame rate fr, $$t=1/fr, \text{ or} \quad \text{(Equation 39)}$$

$$fr=1/t \quad \text{(Equation 40)}$$

and total uncompressed data rate is $$dr=(k*n*m*b*s*1)/(A_y*A_x*t) \quad \text{(Equation 41)}$$

The equations for the pushroom imaging array and for the staring array sensor are identical, if the pushroom array's n TDI elements are recorded separately, otherwise the staring array has an additional factor n for the number of detectors in the along track direction.

The communication rate, comm rate, is the data rate dr divided by the compression ratio, $$\text{Comm rate}=\text{data rate}/\text{compression ratio} \quad \text{(Equation 42)}$$

Typically the compression ratio is fixed, and then the communication rate may limit the data collection rate. However, in this disclosure the compression can be varied to meet the needs of measurement. The required compression ratio is $$\text{Compression ratio}=\text{data rate}/\text{Comm rate} \quad \text{(Equation 43)}$$

$$\exp(\alpha^2/2)*\sigma(2\pi)^{1/2}=(k*n*m*b*s*1)/(A_y*A_x*t)/\text{Comm rate} \quad \text{(Equation 44)}$$

which provides the compression factor needed for a particular sensor system and comm rate limitation.

Solving for the variable a for the threshold multiple of the standard deviation, $$\exp(\alpha^2/2)=(k*n*m*b*s*1)/(A_y*A_x*t)/[\text{Comm rate}*\sigma(2\pi)^{1/2}] \quad \text{(Equation 45)}$$

$$\alpha^2/2=\ln\{(k*n*m*b*s*1)/(A_y*A_x*t)/[\text{Comm rate}*\sigma(2\pi)^{1/2}]\} \quad \text{(Equation 46)}$$

$$\alpha=(2*\ln\{(k*n*m*b*s*1)/(A_y*A_x*t)/[\text{Comm rate}*\sigma(2\pi)^{1/2}]\})^{1/2} \quad \text{(Equation 47)}$$

The threshold variable a controls the needed compression ratio.

For the spacecraft processor application, for systems of multiple satellites in a constellation, the Comm rate limitation can take at least three different forms. The first is an average Communication rate for the entire system of j satellites, equal to the total system communication rate divided by the number of satellites j.

$$\text{Average Communication rate}=\text{total system communication rate}/j \text{ satellites} \quad \text{(Equation 48)}$$

Other limiting communication rates, for example, are the cross-link and down-link communication rates for a satellite communicating with other satellites in the constellation and with the Ground, respectively. Whichever communication rate is limiting is the appropriate rate for the compression equation.

TABLE 1

Probabilities/Confidence level that detected change is real, fraction of pixels, and compression ratios for the threshold variable α

| α = Δ/σ | P = Prob. change is real | Fraction of pixels | Compression Ratio |
| --- | --- | --- | --- |
| 1 | 0.683 | 0.317 | 3.2 |
| 2 | 0.954 | 0.046 | 21.7 |
| 3 | 0.9973 | 0.0027 | 370.4 |
| 4 | 0.999937 | 6.334 * E−5 | 15,788 |
| 5 | 0.99999943 | 5.734 * E−7 | 1,743,983 |

The data system can always optimally fill the communications pipe, and only send the most important data in the order of importance. This provides the capability for providing high priority data that has already been highly-filtered to communications-rate limited users in the field, in vehicles or aircraft. As an onboard spacecraft data processing system the present disclosure provides the capability for reducing data rates by 6 or more orders of magnitude.

The measure of the standard deviation a or repeatability is used in the significance change image in Step 8, e.g., S520, the compression Step 10, e.g., S524, as a threshold value $\alpha\sigma$, and in significance testing throughout this disclosure. The threshold value or criteria used in significance testing, probability testing for hypotheses, or used in variable compression or elsewhere may be based on variability a calculated for single pixels, or for clusters of adjacent pixels, or pixels in regions of interest, or sets of pixels selected in any manner.

The significance of two or more pixels in a region of interest, or cluster, is the complement of the probability P(ROI) that the pixels in this region have anomalous values due to random variability, which is 1−P(ROI). The probability P(ROI) that the cluster of pixels happened by random variability is the product of each pixel's random probability, multiplied by the number of combinations allowing the spatial arrangement of values. For example, for two adjacent pixels $x_1$ and $x_2$ the Probability that these pixels occurred in that arrangement by chance are:

$$P(x_1,x_2)=P(x_1)*P(x_2)*\text{number of combinations with } x_1 \text{ and } x_2. \quad \text{(Equation 49)}$$

There are 6 ways to arrange pixels adjacent to each other, so the random probability P(x1, x2) for two pixel values each with a 5% probability of occurring by chance to be adjacent $$P(x1,x2)=0.05*0.05*6 \text{ combinations}=0.015=1.5\% \quad \text{(Equation 50)}$$

The probability that these adjacent pixels represent a significant non-random event, i.e., the significance for these two pixels together, is 0.985=98.5%, much higher than the significance of either pixel event by itself, 95%.

$$\text{Significance}=1-P(x1,x2)=1-0.015=0.985=98.5\%. \quad \text{(Equation 51)}$$

The multi-temporal, multi-angle, automated target exploitation method 500 of FIG. 5 may also, according to the additionally disclosed embodiments of the present disclosure, be used in a non-limiting and exemplary purpose of detecting and tracking moving targets with multiple images.

According to the multi-temporal, multi-angle, automated target exploitation method 500 and the additionally disclosed embodiments, geo-orthorectification is performed with the 3-D images created in Step 3, e.g., S508, being geometrically calibrated by multiple triangulation, weighted by a priori errors, to reduce geolocation and intra-image mensuration errors by the square root of the number of images. Because each image is re-projected on the georeferenced point cloud of the surface elevation, all height-induced errors such as horizontal displacement errors, band-to-band registration errors, and chip shear errors are all minimized. The 3-D image can be re-projected to any viewpoint with a rotation matrix, and the radiances corrected for projection viewpoint by Lambertian or BRDF-based corrections, or left without correction. Projected from Nadir, the 3-D images represent Geo-Ortho-rectified images with absolute error of ~1 meter CE 90 and precision of 0.1 meter, or better.

Reduction is also performed with the 6-D hypercube produced by the multi-temporal, multi-angle, automated target exploitation method 500, and the additionally disclosed embodiments. The 6-D hypercube consists of n images, each geometrically calibrated, rectified onto the geolocated 3-D topography of the scene, and co-registered to co-registration accuracy between 0.02 and 0.10 pixels or better. The co-registration occurred iteratively in Steps 1, 3, 4, and 5, e.g., S504, S508, S512, S514, but Step 1, e.g., S504, is generally sufficient to de-rotate, de-translate, and de-jitter the images with respect to each other, to better than 0.1 pixel accuracy. The hypercube can be queried with automated tools developed from multi-vector mathematics. One of the simplest operations is to add vector images, and average them together to reduce the data volume, and to increase the effective signal-to-noise ratio of the combinatorial image. This process can be improved by using a priori errors to form a weighted-average of multiple images, where the weighted averaging produces an optimized result for each facet of the target scene, measured in derived surface properties including spectral reflectance and emissivity.

Compression is also performed by the multi-temporal, multi-angle, automated target exploitation method 500, and the additionally disclosed embodiments. The reduction process described above serves as a compression method to reduce the data volumes. In addition, however, the method 500 provides a unique, novel data compression method for measuring the change between images, described earlier in Steps 8 and 10, e.g., S520 and S524. The compression method saves or sends only the ROIs with statistically significant changes between images, and saves or sends the changed ROIs in ranked order. The strength of the statistical filter can be varied dynamically to optimally fill the communication or storage system at any level of compression.

Auto-tagging and auto-tracking of moving targets is even further performed by the multi-temporal, multi-angle, automated target exploitation method 500, and the additionally disclosed embodiments. Step 5, e.g., S514, of the method 500 produces an n-image hypercube of co-registered image frames. Vector subtraction between successive images produces change detection images for detecting moving targets and eliminating static backgrounds. Each of these change detection images produces an image with residual static background errors and the images of the moving targets in the scene. The residual background errors are static, e.g., do not exhibit motion. If well-registered images are used to compute a time derivative, dx/dt, the moving target velocities and headings are calculated. Static targets and background residuals have zero, or near zero velocity, and can be thresholded out easily. Targets are detected with spectral, radiometric, and/or spatial signatures from a spectral signature library and digital keys for the target types. When a target is detected, the software tags the target with the spectral, radiometric, and/or spatial signature from the image itself, rather than the library and digital key signatures. The velocity, heading, and accelerations can be calculated for each pair of images, tracking each detected target separately, and painting the target with identifiable markings or analyzed characteristics, as desired. Rules-based-analysis can provide some elimination of blunders and false alarm rejections for velocities, headings, and/or accelerations that are within and those outside the range of interest or the range of the possible, for example.

While the features of the present disclosure have generally been described with respect to planetary observation and communication via a single set of images, those of ordinary skill in the art appreciate that the disclose embodiments and features may also be used in further application and fields without departing from the scope of the disclosure. For example, the above-mentioned satellite design patent documents to Korb et al. describe various methods for optimizing the performance, cost and constellation design of satellites for full and partial earth overage. The Korb et al. satellite design patents provide new opportunities for planetary observation and communication. This following sections explores some applications and implementations using the patent technology and methodologies, assuming a constellation of satellites designed by the Korb et al. satellite design patents has been implemented, with regular revisit and resolution over the entire planet, in the visible and IR, with at least 4 or more bands in each EO-IR atmospheric window. Nevertheless, it is to be understood that the following sections are not limiting or exhaustive and that the present disclosure may be used in additional or alternative applications and implementation.

The embodiments described herein may be used in image recording, compression, and processing. Each satellite has a fast-access dynamic memory with a geographic-coordinate based memory of the radiance, reflectance, TOPO height, etc., foundation, for every pixilated location on the planet, at some resolution better than the sensor, for each time, $t_i$ The sensor records the radiance from an image scene in a frame at new time $t=t_{i+1}$, and processes the new frame to co-register them spatially, spectral, and radiometrically, for the same view angle using high resolution 3-D model of the ground plane, pixel by pixel.

Onboard processing compares the image at $t_{i+1}$ to the memory of the scene at $t_i$. The difference in the registered images is the change detection image of the scene. The new scene values replace the old scene values in the satellite memory, and the difference image is transmitted to its neighboring satellites, to incorporate in their memory of the scene at time $t_{i+1}$, and this change detection image, which could be a shape file or a highly compressed image file, with compression of millions to one.

The memory of the radiance as a function of time, for each pixel on Earth is stored on the ground and used for exploitation, and represents a "movie" of the activities and image of our planet on a time scale of years, months, weeks, days, and then minute updates.

Specific designs of sensor readout, data processing and storage in different levels of accessible memory depend on factors including the volume of each type of accessible memory, data transmission rates, communication bandwidths, and cost. We at Korb Satellite Systems have analyzed future sensor designs and we find that future sensors will not be limited as current space systems are limited by power consumption of the detector arrays, but rather will be limited by communication system capability to downlink data from spacecraft to Ground and potentially by data processing limitations onboard the spacecraft. Based on this analysis, it may be very important to optimize the information content in the available data, provide large factors of data compression on the spacecraft while using onboard processing capabilities efficiently to compress the communication rate, which is possible at 2 or more locations between the aperture and the transceiver.

As originally conceived, the sensor readout compares the measured and "current" memory value, to measure then record the difference. According to an embodiment, one would measure the difference using an optical subtraction that occurs before the detector measures the radiance, then the detector would measure only the difference radiance, effectively compressing the light signal. This allows the detector and amplifier to be optimized for best sensitivity, with low-background, as performed in the FIRAS instrument aboard the NASA COBE satellite. The detector's output, an analog voltage signal, is then already highly compressed.

The subtraction may more likely occur after the detector measures the radiance. Comparing the previous measurement in analog before the signal is digitized, perhaps with multiple previous measurements, subtracting in voltage, providing a compressed signal to the A/D converter.

These two schemes are compression at the detector element or readout level. After the A/D converter, lossless digital compression is required before transmission.

A constellation of satellites with the ability to sequentially-image each spot on earth, over time at different times, provides sequential multiple stereo, as the number of images for each spot increases with each new image. This record of multiple collections at various angles, with known geolocation error and angular error can be used to construct a topographic database of the 3-D locations and heights for every point on Earth. This is a model of the Earth and its inhabitants and vehicles in a static sense. Each successive collection at a new angle adds new information to this 3-D model. The 3-D model uses this new image information addition to slightly improve its accuracy and precision, for that location on Earth, at that time.

In turn, this model may be used to geometrically-register each new image to exact geo-reference locations used in the planetary 3-D model.

This also requires an interpolation where the recorded new radiance values in the image, collected on different detector arrays are spatially-interpolated (synthetic-array-generated, SAG) to form a single sampled image, using the correct 3-D heights from the 3-D model, to form both the actual geometric and radiometrically-corrected image, and to geo-reference the image to exact Earth coordinates for numerical comparison to the current Earth image in that spectral band.

Fusing the new image with old image allows for super-resolution processing of the new image, which improves the image quality by no less than 0.27 NIIRS adder (the standard image quality adder for stereo), or more likely improves the image resolution by a factor of 2 or more and improves image quality by a +1 NIIRS adder, with resolution improvement of 2x, or more.

The new image information, the radiance values, time, geometric 3-d information about the scene and its targets, is updated, and the difference in these images is a change detection image or shape file, with very high compression ratio, millions to one, or more. Moving targets and change of targets in the scene in the time difference between images are a key Indicator and Warning (I&W) image information product.

If the stereo collection is simultaneous in time with two or more imagers, then the image pair, or image set for 3 or more, contains the 3-D locations of all objects in the 3-D space at the image time, and successive simultaneous stereo images form a change-product that represents the target vectors in 4-D space, for all movers and objects in the scene. Of course most objects don't move, and the co-registration that minimizes the number of pixels of change is the "ideal" co-registration of the simultaneous image set, and the minimization of this residual difference between new images collected and the previous image of the scene is the "ideal" geo-referenced co-registration possible, suggesting an algorithmic co-registration and geo-reference test and optimization iteration process.

The measurement of exact 3-D geometric and geo-reference properties from both sequential and simultaneous image sets may be greatly enhanced if the satellites can simultaneously see each other over horizon, and are in laser-link communication, allowing knowledge of relative distance to centimeters, millimeters, micrometers, or angstroms, depending on the time resolution and calibration of the clocks. One could also use a scheme with additional relay satellites, perhaps just GPS, to perform triangulation of imaging satellites in the constellation without these imaging satellites being in direct laser communication with each other. The triangulation could be done with RF to an accuracy of cm or better, and with lasers to nanometers-scale accuracy.

With this exact baseline knowledge, simultaneous multiple stereo collections ought to be able to retrieve locations in 3-D space to cm or mm accuracy, perhaps better, simply through accurate knowledge of the baseline length, and the angles at the sensors, like a surveyor does.

The stereo triangulation with multiple platforms in simultaneous laser phase lock can be extended to the idea of forming an interferometric imaging system, a synthetic array image, like Synthetic Aperture Radar (SAR) but in any EM frequency desired from gamma rays to RF, with individual satellite apertures contributing to an optical image formed by the collection of sparse apertures at immense distances with precise knowledge of location and time to a fraction of a wave, 0.1 wave, accuracy, for SAR image resolution and geolocation accuracy at 300 kilometers=3 $10^{11}$ um, to 10 nm, theoretically, about 100 hydrogen atom diameters. This could be used for Earth remote sensing for resolution and geolocation accuracy, and for astronomical purposes for imaging planets in other solar systems, with an effective aperture of 10,000 kilometers=$10^7$ meters, and diffraction limited imaging at $10^{-6}$ meters, or 1 um at ~$10^{-13}$ radians, in improvement of about $10^6$ in spatial resolution.

At 10 light years, range=10*365*24*3600*3*10^8 meters=~9.5 10^16 meters~1017 meters. Angular resolution is of $10^{-13}$ radians. At $10^{17}$ meters, GSD=angular resolution (radians)*range=$10^{-13}$*$10^{17}$ meters=$10^4$ meters=10 kilometers at 4 light years. That's enough resolution to image Earth at 1200×1200 pixels, and form extremely good images of small planets in local solar systems at 10 light-yrs. A Jupiter or Solar sized object may be well imaged at 10 to 100× greater distances, 1000 to 10,000 light year, about 1/10 the diameter of the Milky Way Galaxy. Large planets could thus be imaged, albeit poorly, anywhere in our galaxy.

MSI Sensors may likely employ off-axis, unobstructed telescopes with a modified Offner, Dyson, or Mertz imaging spectrometer grating design with the holographic grating on one of the powered optical surfaces, providing a line image in the scan direction, with spectral resolution over at least 5 nm spectral channels, perhaps 1 nm spectral channels in the along-track direction on the FPA. The Dyson design allows a larger F# input beam and has better spatial and spectral uniformity performance, according to JPL. These spectral bands can be integrated in analog or digital format, to form MSI bands differently for each collection, at up to full spectral resolution and spatial resolution, with aggregating spectrally and/or spatially depending on the product required, target type, reflectance/emissivity/BRDF characteristics, atmospheric conditions. SNR, acquisition parameters, need to exploit atmospheric or gases versus surface features, etc. These designs collect multispectral or hyperspectral measurements simultaneously, which increases accuracy for events with short time constants, such as hyperspectral imaging in ocean or human volumes where motion is a significant source of error, provides spectrally and spatially co-registered images at configurable spatial and spectral resolution, with rapid frame rates possible. These sensors would probably utilize CMOS multi-dimensional FPA chips to take advantage of CMOS detector array developments to improve temporal resolution, frame rate, spatial resolution, and SNR. These imaging spectrometers may have to be scanned in patterns on the surface including whisk broom scanning for full spatial coverage, which requires 2-D scanning mirror to optimize area coverage rate. Telescope may be in a streamlined fairing, pointed along track, looking through the over-sized flat scanning mirror, perhaps polarization-compensated.

Imaging sensor performance can be improved by several techniques, including the following three techniques. Of course, these techniques are not limiting, exclusive, or exhaustive.

For any orbiting sensor, resolution and SNR improve as range is decreased. Satellites could be flown in lower-altitude orbits, or enjoy an increase in orbital lifetime with no change in fuel to mass ratios, if the satellite design incorporated the following two changes to reduce aerodynamic drag: 1. satellites should always fly with minimum cross-sectional area in the direction of motion; and 2. to reduce aerodynamic drag, satellites should use an aerodynamic shape with a smooth surface. These actions minimize the aerodynamic cross-sectional area and the aerodynamic resistance coefficient. Minimizing the cross-sectional area in the direction of motion and minimizing the friction coefficient, while maintaining telescope pointing control, can be achieved by encasing the spacecraft in an aerodynamic fairing, with the imaging system aligned within the fairing. The satellite should use a flat scanning mirror, or a more sophisticated mirror design to minimize optical motion and smear effects, angled at approximately 45° to the optical system axis to image the planet through an oversized aperture in the fairing sidewall, rotating the scanning mirror about the optical axis to scan in the cross-scan direction, and rotating about the cross-scan axis to image in the forward and back scan directions.

Imaging off-axis with a scanning mirror has many advantages over rotating the entire spacecraft to point the telescope system, using the entire satellite as a scanning platform. The scanning mirror is much smaller, lighter, and stiffer than the spacecraft, so the scan mirror can be rotated more rapidly, accurately, precisely, and at lower cost in energy and momentum than rotating the entire spacecraft. This reduces parasitic cost, volume, mass, and power required to build reaction wheels or Control Motion Gyros (CMGs) to rotate the spacecraft. Second, this allows the spacecraft to be built aerodynamically, flying along track in its minimum area configuration, allowing the spacecraft to fly lower, improving sensor resolution and SNR performance. Third, the scanning mirror can incorporate optical technology to reduce or eliminate optical, geometrical, and motion-induced image distortions and image smear, to reduce or eliminate the effects of pointing jitter and error on image resolution and pointing accuracy, or to compensate for wavefront sources of error.

The third technique to apply to sensor design to improve collection performance, is to utilize the entire area of the imaging plane inside the sensor to collect photons, to take advantage of the "throughput advantage". For pushbroom scanning imaging systems, there is often a single array with large width in the cross-scan direction perpendicular to the scan direction, but very few detectors in the along-track direction parallel to the scanning motion. For GeoEye-1 and WorldView-2 Satellites, for example, the Panchromatic high-resolution bands have arrays made of smaller Sensor Chip Assemblies (SCAs) having a total of approximately 37,000 detector elements in cross scan direction representing individual channels, but have only 64 detector elements in the along track direction for Time Delay Integration. The imaged area on the focal plane is roughly circularly symmetric, because the optics are roughly circularly symmetric, so the along track direction could also be covered with 37,000 detectors rather than the 64 or so detectors actually used. In comparison to detector arrays of roughly 37,000 by 37,000 detector elements, current designs with 37,000×64 detector elements utilize only ~1/580 of the measurable focal plane area by filling them with detector elements. As a result, only 1/580 of all photons focused at the focal plane are recorded by detectors, and the rest are a nuisance that causes problems as "stray light". A small fraction of this additional area is covered by additional detector arrays for multispectral imagery, but overall less than 1/5 of one percent of well-focused photons are actually collected by detectors. This end-to-end photon efficiency of just 0.2% should be reported as the primary sensor system efficiency rather than the quantum efficiency of the detectors, because 99.8% of photons were lost without measurement; this inefficiency might have been remedied prior to this submission if the metrics reporting efficiency represented overall efficiency more accurately.

The very low efficiency is caused by the very low percentage of focal plane area covered by active detectors, and the efficiency could be improved by adding many more detector arrays to cover the area in the imaging plane of the sensor, mostly in the along-track direction on either side of the telescope's central ray. One of the most vexing reasons that additional arrays are not placed in the along track direction is because these additional image arrays would greatly increase the collected data rate of the satellite, and the other is that these additional array would have additional geometric errors, specifically horizontal error due to height uncertainties and errors in image formation, from parallax-induced collection angle differences in the arrays. However, the embodiments described herein can easily correct the data rate increase by increasing the degree of image compression through dynamically variable compression and co-adding types of data compression. The embodiments of this disclosure can also be used to correct the geometric error, by deriving from multiple images absolute altitude and horizontal positions accurate within less than 1 meter, one sigma (0.68 p). The embodiments described herein enables precise geolocation and co-registration of imagery with error of less than 0.01 pixels, for imagery collected within the same focal plane, and this allows multiple image lines or frames to be co-added for signal and SNR improvement without necessarily needing to increase data rate.

Improving the area of collected photons from less than 0.2% to near 100% may provide an improvement in measured photon signal by as much as the ratio of area collected, or a 580-fold improvement for the Worldview-2 and Geo-Eye-1 satellites. The signal improvement may increase and improve Signal to Noise Ratio (SNR) by as much as the signal improvement factor, 580 fold in the examples provided, for detector-noise limited signal where there is too little signal, particularly low-light conditions, when signal integration conditions permit. For photon-noise-limited conditions, the SNR is improved by as much as the square root of the signal improvement, or 24-fold for the examples provided. The improvement in SNR enables the collection of more area per unit time with the same sensor: area collection rate is improved by either the factor of Signal or SNR improvement, depending on circumstances, at identical image quality in terms of diffraction-limited resolution and SNR. Thus sensors with 580-fold larger detector area can, if unencumbered by other limitations, collect either 580-fold more area per unit time or 24-fold more area per unit time.

Cost per satellite should be calculated as cost per satellite per year of use, including the lifetime of the spacecraft system in the cost for operating the constellation over time. Spacecraft lifetime might be limited by drag limiting orbital lifetime or obsolescence.

The embodiments and features described herein provide new information on surface orientation for facets in measured scenes, and this may allow new material identification algorithms using the bi-directional reflectance distribution function properties (BRDF) of materials, in both unpolarized, and fully polarized, measurements. However, there are few laboratory measurements of material BRDF, and even fewer laboratory measurements of polarized BRDF. As a result, it may be useful to measure the polarized or unpolarized BRDF of known materials from aircraft or space based measurements, to be used as truth measurements for identifying materials in scenes where ground truth is not available. The current use of Lambertian reflectance properties in the Empirical Line Method (ELM) for identifying materials provides a model for using empirical measurements of BRDF for materials in a known situation with known material ID, and extending those known BRDF properties of materials to infer the BRDF and material identification for unknown materials. This new technique should be called Empirical BRDF for material ID.

Of course, those skilled in the art appreciate that the above-described embodiments are merely exemplary and that the present disclosure includes various additional and alternative methods in accordance with the teachings and disclosure set forth herein. Moreover, the disclosed embodiments may be used in additional fields, including but not limited to, remote sensing, space imaging, aerospace imaging, medical imaging, image compression, data compression image processing, data processing, image analysis, data analysis, image restoration, image enhancement, information extraction, tomographic mapping, 3-D imaging, DEM, DSM, Point Cloud, Multi-ray EO, spacecraft processing, ground processing, image exploitation, radiometric analysis, spectroradiometric analysis, multi-dimensional analysis, BRDF, BSDF, material analysis, supervised and unsupervised classification Those of ordinary skill in the art also understand the various processes and methods described herein may be implemented by various computer programs and computer-readable media including executable instructions. The computer programs and computer-readable media, when executed, may implement any of the various processes, methods, or combinations thereof disclosed herein. In this regard, the various embodiments disclosed herein may use existing commercial and academic algorithms and software technology for, inter alia, co-registering images, extracting DSMs, and enhancing resolution and SNR with large numbers of images.

Accordingly, the present disclosure provides various systems, servers, methods, media, and programs for automating rigorous change detection, extracting better information from multiple collections of targets over time and at multiple angles, rigorously georegistering images to high accuracy, creating georeferenced DSMs, using bundle adjustment for image co-registration and commercial imagery for its geo-reference accuracy. Although the present application has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects.

For example, various embodiments of the present disclosure may designed be as an on-board processor to reduce communication needs of KSS designed satellite systems, implemented as a ground processing system by one national agency, or implemented as a data analysis system to automate image interpretation at the National Geospatial-Intelligence Agency (NGA). They may also improve computerized axial tomography (CAT) scan resolution to correct jitter and rotation resolution limitations, be used as a backup to GPS for vehicle position to 1-m accuracy or better, if GPS is jammed, automate manufacturing process inspection at higher fidelity, generate 3-D scenes from real images for use in 3-D video games and 3-D movies, creating a synthetic reality. In the 3-D scenes, the background imagery will look more realistic and much less like a cartoon. Using 3-D imagery for backgrounds may also reduce processor load from creating and rotating 3-D scenes for backgrounds, allow more processing power for 3-D characters, and embed characters in scenes created from the users local area, or any area they choose.

Although the present application has been described with reference to particular means, materials and embodiments, the disclosure is not intended to be limited to the particulars disclosed; rather the disclosure extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for analyzing and improving accuracies of two-dimensional images and for forming three-dimensional images from the two-dimensional images, the system comprising:
   a processor; and
   a memory that includes a plurality of two-dimensional images and instructions, the plurality of two-dimensional images each including a same target area and being acquired at same or different times and at different collection angles, the instructions configured to, when executed by the processor, cause the processor to execute operations comprising;
      correlating a plurality of target features in the target area of each of the two-dimensional images;
      determining, independently for each of the plurality of two-dimensional images and based on image pointing parameters, a three-dimensional geolocation position for each of the plurality of target features;
      calculating a weighted average or a least squares fitting of the three-dimensional geolocation position for each of the plurality of target features using the plurality of two-dimensional images;
      adjusting, variably across each of the plurality of two-dimensional images, the image pointing parameters by providing an adjustment of the image pointing parameters to minimize a geolocation difference between the three-dimensional geolocation position of each of the plurality of target features in each of the plurality of two-dimensional images and the weighted average or the least squares fitting of the three-dimensional geolocation position of each of the plurality of target features across the plurality of two-dimensional images; and
      projecting each of the plurality of two-dimensional images onto a georeferenced three-dimensional surface model of the target area based on results of the adjusting to form georeferenced three-dimensional images from the plurality of two-dimensional images,
   wherein the three-dimensional geolocation position of each of the plurality of target features in each of the plurality of two-dimensional images comprises three mutually orthogonal coordinates, and
   in the calculating of the weighted average, a weight factor of each of the plurality of two-dimensional images contribution to each of the three mutually orthogonal coordinates is one divided by an image error, in each coordinate, squared and divided by a sum of one divided by squared errors for all of the plurality of two-dimensional images, in each coordinate.

2. The system according to claim 1, wherein the image pointing parameters of each of the plurality of two-dimensional images is adjusted independently over different sections of the target area.

3. The system according to claim 1, wherein the image pointing parameters are further configured to be adjusted, variably across each of the plurality of two-dimensional images, by providing a least squares adjustment of the image pointing parameters to minimize geolocation differences between a three-dimensional geolocation position of one or more ground control points in each of the plurality of two-dimensional images and a predetermined three-dimensional geolocation position of the one or more ground control points.

4. The system according to claim 1, wherein the image pointing parameters are further configured to be adjusted, variably across each of the plurality of two-dimensional images, by using ground control points which are not located in the target area for processing in the target area.

5. The system according to claim 4, wherein the image pointing parameters are configured to be adjusted, variably across each of the plurality of two-dimensional images, by extending the predetermined ground control points into the target area using triangulation methods.

6. The system according to claim 4, wherein the image pointing parameters are configured to be adjusted, variably across each of the plurality of two-dimensional images, by collecting strips of imagery from the predetermined ground control points to the target area, depending on further segregating errors into bias errors and other errors, which are removed or reduced, by subtraction of the bias errors from one or more ground control points.

7. The system according to claim 1, wherein the image pointing parameters comprise polynomial coefficients.

8. The system according to claim 1, wherein the operations further comprise:
   identifying, during at least one of the determining and the adjusting, regions in any of the plurality of two-dimensional images in which a difference between the three-dimensional geolocation position of one of the plurality of target features and the weighted average satisfies a predetermined condition; and
   excluding, during at least one of the calculating and the projecting, the regions of any of the plurality of two-dimensional images in which the predetermined condition is satisfied from at least one of the weighted average and the georeferenced three-dimensional surface model to exclude an anomalous difference.

9. The system according to claim 1, wherein the operations further comprise:
   receiving at least one additional two-dimensional image being of a lower geometric accuracy than the plurality of two-dimensional images;
   determining whether a surface topography of the georeferenced three-dimensional images has changed; and
   assigning an error weighting of zero to the georeferenced three-dimensional images when the surface topography has not changed, and field angle mapping the second two-dimensional image onto the georeferenced three-dimensional surface model to georectify the second two-dimensional image to a substantially same accuracy as the georeferenced three-dimensional surface model.

10. The system according to claim 1, wherein the operations further comprise:
    co-registering each of the georeferenced three-dimensional images formed from the plurality of two-dimensional images to the georeferenced digital surface model base layer, correlating the plurality of target features from each of the plurality of two-dimensional images based on predetermined criteria, criteria calculated from images and image statistics, or a posteriori considerations, to provide a georeferenced image stack of the georeferenced three-dimensional images, co-registered in three-dimensions.

11. The system according to claim 10, wherein the operations further comprise:

computing a change between essentially identical areas in each of the georeferenced three-dimensional images in the georeferenced image stack;

measuring an uncertainty of the change between the identical areas of the georeferenced three-dimensional images in the georeference image stack in association with the change;

parsing the identical areas of the georeferenced three-dimensional images for significant areas in which a ratio of the change to the uncertainty satisfies the predetermined criteria, the criteria calculated from the images and image statistics, or the a posteriori considerations; and one or more of processing, transmitting, and storing information on only the significant areas in which the ratio of the change to the uncertainty satisfies the predetermined criteria, the criteria calculated from the images and image statistics, or the a posteriori considerations.

12. The system according to claim 10, wherein the operations further comprise:

computing a change between areas of a current three-dimensional image and essentially identical areas of the georeferenced three-dimensional images in the georeferenced image stack;

measuring an uncertainty of the change between the areas of the current three-dimensional image and the identical areas of the georeferenced three-dimensional images in the georeference image stack;

parsing the areas of the current three-dimensional image for significant areas in which a ratio of the change to the uncertainty satisfies the predetermined criteria, the criteria calculated from the images and image statistics, or the a posteriori considerations;

one or more of processing, transmitting, and storing information on only the significant areas in which the ratio of the change to the uncertainty satisfies the predetermined criteria, the criteria calculated from the images and image statistics, or the a posteriori considerations; and variably compressing data of the current three-dimensional image for each of the areas in accordance with a ratio of the change and the uncertainty for each of the areas.

13. The system according to claim 12, wherein:

the data of the current three-dimensional image for each of the areas is prioritized for variable compression in accordance with the ratio of the change to the uncertainty for each of the areas, the data is variably compressed in accordance with a degree of compression needed by the system, and the variable compression is a dynamically-controlled system where a compression ratio is controlled to be greater than or equal to a ratio a data rate from a sensor and data storage to an available communication rate, for each spacecraft communication channel to optimally process, communicate, and store information with a highest significance in a prioritized order, so that communication channels can downlink data directly from a satellite to Users in a field that is highly significant in prioritized order.

14. The system according to claim 13, wherein the variable compression system is applied onboard a spacecraft, aircraft, ships, or other portable sensor system platform and provides variable and dynamic compression that reduces a downlink communication rate needed to communicate any particular level of information flow, and enables sensor system designs to realize a throughput advantage wherein the sensor detector plane is designed to incorporate larger numbers of detector arrays and elements designed to increase a system photon efficiency of photons collected by a telescope that are measured by detectors; and increasing system photon efficiency increases a sensor resolution, a signal-to-noise ratio, an area collection rate, and reduces a cost per unit area collected by the sensor system by either a ratio of an increase in the number of detectors, a square-root of the ratio of the increase in the number of the detectors, or a value in between, representing two or three orders of magnitude improvement in the cost per unit area and an area collection rate capacity.

15. The system according to claim 10, wherein the operations further comprise:

computing a change between areas of a current three-dimensional image and essentially identical areas of the georeferenced three-dimensional images in the georeferenced image stack;

variably compressing data of the current three-dimensional image for the areas in accordance with one of: a difference between the change of each of the areas and an average change of the areas; and a ratio of the change of each of the areas to a statistical or calculated measure of a measured variability of the areas.

16. The system according to claim 1, further comprising:

a variable and dynamically controlled data compression onboard sensor system platform that improves a data rate at which sensor systems collect measurement information, enables new sensor designs to take advantage of a throughput advantage in focal plane designs, wherein onboard detector arrays are increased in size to cover an entire image plane receiving signal, increasing the system photon efficiency by two or three orders of magnitude.

17. The system according to claim 1, wherein each of the plurality of two-dimensional images comprises a stereo pair of images, and the three-dimensional geolocation position of the target feature in each of the plurality of two-dimensional images is determined for each stereo pair of images by measuring three orthogonal reference coordinates of the target feature.

18. The system according to claim 1, wherein the three-dimensional geolocation position is determined using the image pointing parameters without tie points or ground control points.

19. The system according to claim 1, further comprising:

a satellite in which the processor and the memory are provided, wherein an angular resolution of the plurality of two-dimensional images is in a scale on the order of nanoradians.

20. A method for forming three-dimensional images from two-dimensional images, the method comprising:

storing, in a memory, a plurality of two-dimensional images, the plurality of two-dimensional images each including a same target area and being acquired at different times and at different collection angles;

identifying a plurality of target features in the target area of each of the plurality of two-dimensional images;

determining, independently for each of the plurality of two-dimensional images and based on image pointing parameters, a three-dimensional geolocation position for each of the plurality of target features;

calculating, with a processor, a weighted average of the three-dimensional geolocation position for each of the plurality of target features using the plurality of two-dimensional images;

adjusting, variably across each of the plurality of two-dimensional images, the image pointing parameters by providing a least squares adjustment of the image pointing parameters to minimize a geolocation difference between the three-dimensional geolocation position of each of the plurality of target features in each of the plurality of two-dimensional images and the weighted average of the three-dimensional geolocation position of each of the plurality of target features across the plurality of two-dimensional images; and projecting each of the plurality of two-dimensional images onto a georeferenced three-dimensional surface model of the target area based on results of the adjusting to form georeferenced and coregistered three-dimensional images from the plurality of two-dimensional image, wherein the three-dimensional geolocation position of each of the plurality of target features in each of the plurality of two-dimensional images comprises three mutually orthogonal coordinates, and in the calculating of the weighted average, a weight factor of each of the plurality of two-dimensional images contribution to each of the three mutually orthogonal coordinates is one divided by an image error, in each coordinate, squared and divided by a sum of one divided by squared errors for all of the plurality of two-dimensional images, in each coordinate.

21. A non-transitory computer readable medium including an executable set of instructions for forming three-dimensional images from two-dimensional images that, when executed by a processor, causes the processor to execute operations comprising:

storing a plurality of two-dimensional images, the plurality of two-dimensional images each including a same target area and being acquired at different times and at different collection angles;

identifying a plurality of target features in the target area of each of the plurality of two-dimensional images;

determining, independently for each of the plurality of two-dimensional images and based on image pointing parameters, a three-dimensional geolocation position for each of the plurality of target features;

calculating a weighted average of the three-dimensional geolocation position for each of the plurality of target features using the plurality of two-dimensional images;

adjusting, variably across each of the plurality of two-dimensional images, the image pointing parameters by providing a least squares adjustment of the image pointing parameters to minimize a geolocation difference between the three-dimensional geolocation position of each of the plurality of target features in each of the plurality of two-dimensional images and the weighted average of the three-dimensional geolocation position of each of the plurality of target features across the plurality of two-dimensional images; and projecting each of the plurality of two-dimensional images onto a georeferenced three-dimensional surface model of the target area based on results of the adjusting to form georeferenced three-dimensional images from the plurality of two-dimensional images, wherein the three-dimensional geolocation position of each of the plurality of target features in each of the plurality of two-dimensional images comprises three mutually orthogonal coordinates, and in the calculating of the weighted average, a weight factor of each of the plurality of two-dimensional images contribution to each of the three mutually orthogonal coordinates is one divided by an image error, in each coordinate, squared and divided by a sum of one divided by squared errors for all of the plurality of two-dimensional images, in each coordinate.

\* \* \* \* \*